US010817502B2

(12) United States Patent
Talagala et al.

(10) Patent No.: US 10,817,502 B2
(45) Date of Patent: Oct. 27, 2020

(54) PERSISTENT MEMORY MANAGEMENT

(71) Applicant: Fusion-io, Inc., Salt Lake City, UT (US)

(72) Inventors: Nisha Talagala, Livermore, CA (US); Swaminathan Sundararaman, San Jose, CA (US); David Flynn, Sandy, UT (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/207,093

(22) Filed: Mar. 12, 2014

(65) Prior Publication Data

US 2014/0195480 A1 Jul. 10, 2014

Related U.S. Application Data

(63) Continuation-in-part of application No. 13/836,826, filed on Mar. 15, 2013, and a continuation-in-part of
(Continued)

(51) Int. Cl.
*G06F 12/00* (2006.01)
*G06F 16/23* (2019.01)
(Continued)

(52) U.S. Cl.
CPC ...... *G06F 16/2365* (2019.01); *G06F 11/1441* (2013.01); *G06F 12/0804* (2013.01);
(Continued)

(58) Field of Classification Search
CPC .......... G06F 12/123; G06F 5/14; G06F 7/785; G06F 1/30; G06F 1/3206
See application file for complete search history.

(56) References Cited

U.S. PATENT DOCUMENTS 4,980,861 A 12/1990 Herdt et al.
5,193,184 A 3/1993 Belsan et al.
(Continued)

FOREIGN PATENT DOCUMENTS

CN 1771495 5/2006
CN 102193846 A 9/2011
(Continued)

OTHER PUBLICATIONS

"SCSI Object-Based Storage Device Commands (OSD)", ANSI, Jul. 30, 2004, pp. 187, Information Technology, Revision 10, Reference No. ISO/IEC 14776-391.
(Continued)

*Primary Examiner* — William B Partridge
*Assistant Examiner* — Eric T Loonan
(74) *Attorney, Agent, or Firm* — Kunzler Bean & Adamson, PC

(57) ABSTRACT

Apparatuses, systems, methods, and computer program products are disclosed for persistent memory management. Persistent memory management may include providing a persistent data structure stored at least partially in volatile memory configured to ensure persistence of the data structure in a non-volatile memory medium. Persistent memory management may include replicating a persistent data structure in volatile memory buffers of at least two non-volatile storage devices. Persistent memory management may include preserving a snapshot copy of data in association with completion of a barrier operation for the data. Persistent memory management may include determining which interface of a plurality of supported interfaces is to be used to flush data from a processor complex.

22 Claims, 18 Drawing Sheets

Related U.S. Application Data application No. 13/838,070, filed on Mar. 15, 2013, and a continuation-in-part of application No. 13/694,000, filed on Dec. 4, 2012, now Pat. No. 9,047,178, which is a continuation-in-part of application No. 13/324,942, filed on Dec. 13, 2011, now Pat. No. 8,527,693.

(60) Provisional application No. 61/864,514, filed on Aug. 9, 2013, provisional application No. 61/878,031, filed on Sep. 15, 2013, provisional application No. 61/583,133, filed on Jan. 4, 2012, provisional application No. 61/637,257, filed on Apr. 23, 2012, provisional application No. 61/661,742, filed on Jun. 19, 2012, provisional application No. 61/691,221, filed on Aug. 20, 2012, provisional application No. 61/705,058, filed on Sep. 24, 2012, provisional application No. 61/422,635, filed on Dec. 13, 2010.

(51) Int. Cl.
*G06F 12/0804* (2016.01)
*G06F 11/14* (2006.01)
*G06F 12/02* (2006.01)
*G06F 11/20* (2006.01)
*G06F 11/16* (2006.01)

(52) U.S. Cl.
CPC .......... *G06F 11/1666* (2013.01); *G06F 11/20* (2013.01); *G06F 12/0238* (2013.01); *G06F 2212/202* (2013.01)

(56) References Cited

U.S. PATENT DOCUMENTS

| | | | |
|---|---|---|---|
| 5,261,068 | A | 11/1993 | Gaskins et al. |
| 5,325,509 | A | 6/1994 | Lautzenheiser |
| 5,404,485 | A | 4/1995 | Ban |
| 5,438,671 | A | 8/1995 | Miles |
| 5,479,630 | A | 12/1995 | Killian |
| 5,502,833 | A * | 3/1996 | Byrn .................. G06F 12/0875 710/240 |
| 5,504,882 | A | 4/1996 | Chai |
| 5,535,399 | A | 7/1996 | Blitz et al. |
| 5,548,757 | A | 8/1996 | Matsuyama et al. |
| 5,553,261 | A | 9/1996 | Hasbun et al. |
| 5,590,304 | A * | 12/1996 | Adkisson ............ G06F 13/1642 711/100 |
| 5,594,883 | A | 1/1997 | Pricer |
| 5,598,370 | A | 1/1997 | Nijima et al. |
| 5,638,289 | A | 6/1997 | Yamada et al. |
| 5,651,133 | A | 7/1997 | Burkes |
| 5,682,497 | A | 10/1997 | Robinson |
| 5,682,499 | A | 10/1997 | Bakke et al. |
| 5,701,434 | A | 12/1997 | Nakagawa |
| 5,721,874 | A | 2/1998 | Carnevale et al. |
| 5,742,787 | A | 4/1998 | Talreja |
| 5,754,563 | A | 5/1998 | White |
| 5,799,140 | A | 8/1998 | Nijima et al. |
| 5,799,200 | A | 8/1998 | Brant et al. |
| 5,802,602 | A | 9/1998 | Rahman et al. |
| 5,805,501 | A | 9/1998 | Shiau et al. |
| 5,812,457 | A | 9/1998 | Arase |
| 5,845,329 | A | 12/1998 | Onishi et al. |
| 5,893,086 | A | 4/1999 | Schmuck et al. |
| 5,915,124 | A | 6/1999 | Morris, III |
| 5,960,462 | A | 9/1999 | Solomon et al. |
| 6,000,019 | A | 12/1999 | Dykstal et al. |
| 6,006,323 | A * | 12/1999 | Ma ..................... G06F 9/30101 712/202 |
| 6,014,724 | A | 1/2000 | Jennett |
| 6,125,072 | A | 9/2000 | Wu |
| 6,128,630 | A | 10/2000 | Shackelford |
| 6,148,377 | A | 11/2000 | Carter et al. |
| 6,170,039 | B1 | 1/2001 | Kishida |
| 6,170,047 | B1 | 1/2001 | Dye |
| 6,173,381 | B1 | 1/2001 | Dye |
| 6,181,630 | B1 * | 1/2001 | Caulkins ............. G06F 11/1441 365/183 |
| 6,185,654 | B1 | 2/2001 | Van Doren |
| 6,205,521 | B1 | 3/2001 | Schumann |
| 6,236,593 | B1 | 5/2001 | Hong et al. |
| 6,240,040 | B1 | 5/2001 | Akaogi et al. |
| 6,256,642 | B1 | 7/2001 | Krueger et al. |
| 6,278,633 | B1 | 8/2001 | Wong et al. |
| 6,295,571 | B1 | 9/2001 | Scardamalia et al. |
| 6,295,581 | B1 | 9/2001 | DeRoo |
| 6,298,354 | B1 * | 10/2001 | Saulpaugh ........ G06F 17/30607 |
| 6,330,688 | B1 | 12/2001 | Brown |
| 6,336,174 | B1 | 1/2002 | Li et al. |
| 6,356,986 | B1 | 3/2002 | Solomon et al. |
| 6,370,631 | B1 | 4/2002 | Dye |
| 6,385,688 | B1 | 5/2002 | Mills |
| 6,385,710 | B1 | 5/2002 | Goldman et al. |
| 6,404,647 | B1 | 6/2002 | Minne |
| 6,412,080 | B1 | 6/2002 | Fleming et al. |
| 6,418,478 | B1 | 7/2002 | Ignatius et al. |
| 6,467,011 | B2 | 10/2002 | Scardamalia et al. |
| 6,470,238 | B1 | 10/2002 | Nizar et al. |
| 6,507,911 | B1 | 1/2003 | Langford |
| 6,515,909 | B1 | 2/2003 | Wooldridge |
| 6,515,928 | B2 | 2/2003 | Sato et al. |
| 6,523,102 | B1 | 2/2003 | Dye et al. |
| 6,552,955 | B1 | 4/2003 | Miki |
| 6,564,285 | B1 | 5/2003 | Mills |
| 6,587,915 | B1 | 7/2003 | Kim |
| 6,601,211 | B1 | 7/2003 | Norman |
| 6,608,793 | B2 | 8/2003 | Park et al. |
| 6,625,685 | B1 | 9/2003 | Cho et al. |
| 6,629,112 | B1 | 9/2003 | Shank |
| 6,633,950 | B1 | 10/2003 | Brown et al. |
| 6,633,956 | B1 | 10/2003 | Mitani |
| 6,643,181 | B2 | 11/2003 | Sofer et al. |
| 6,655,758 | B2 | 12/2003 | Pasotti et al. |
| 6,658,438 | B1 | 12/2003 | Moore et al. |
| 6,671,757 | B1 | 12/2003 | Multer et al. |
| 6,694,453 | B1 | 2/2004 | Shukla et al. |
| 6,715,027 | B2 | 3/2004 | Kim et al. |
| 6,715,046 | B1 | 3/2004 | Shoham et al. |
| 6,735,546 | B2 | 5/2004 | Scheuerlein |
| 6,751,155 | B2 | 6/2004 | Gorobets |
| 6,754,774 | B2 | 6/2004 | Gruner et al. |
| 6,760,806 | B2 | 7/2004 | Jeon |
| 6,775,185 | B2 | 8/2004 | Fujisawa et al. |
| 6,779,088 | B1 | 8/2004 | Benveniste et al. |
| 6,785,785 | B2 | 8/2004 | Piccirillo et al. |
| 6,683,810 | B2 | 10/2004 | Sakamoto |
| 6,807,097 | B2 | 10/2004 | Takano et al. |
| 6,845,053 | B2 | 1/2005 | Chevallier |
| 6,849,480 | B1 | 2/2005 | Low et al. |
| 6,865,657 | B1 | 3/2005 | Traversat et al. |
| 6,871,257 | B2 | 3/2005 | Conley et al. |
| 6,877,076 | B1 | 4/2005 | Cho et al. |
| 6,880,049 | B2 | 4/2005 | Gruner et al. |
| 6,883,079 | B1 | 4/2005 | Priborsky |
| 6,887,058 | B2 | 5/2005 | Fujiwara |
| 6,892,298 | B2 | 5/2005 | West |
| 6,938,133 | B2 | 8/2005 | Johnson et al. |
| 6,957,158 | B1 | 10/2005 | Hancock et al. |
| 6,959,369 | B1 | 10/2005 | Ashton et al. |
| 6,973,551 | B1 | 12/2005 | Walton |
| 6,977,847 | B2 | 12/2005 | Lasser et al. |
| 6,981,070 | B1 | 12/2005 | Luk et al. |
| 6,990,547 | B2 | 1/2006 | Ulrich et al. |
| 6,996,676 | B2 | 2/2006 | Megiddo |
| 7,010,652 | B2 | 3/2006 | Piccirillo et al. |
| 7,042,664 | B2 | 5/2006 | Gill et al. |
| 7,043,599 | B1 | 5/2006 | Ware et al. |
| 7,050,337 | B2 | 5/2006 | Iwase et al. |
| 7,057,936 | B2 | 6/2006 | Yaegashi et al. |
| 7,058,769 | B1 | 6/2006 | Danilak |
| 7,064,994 | B1 | 7/2006 | Wu |

(56) References Cited

U.S. PATENT DOCUMENTS

| | | | |
|---|---|---|---|
| 7,089,391 B2 | 8/2006 | Geiger et al. | |
| 7,096,321 B2 | 8/2006 | Modha | |
| 7,127,507 B1 * | 10/2006 | Clark | H04L 43/045 |
| | | | 709/224 |
| 7,167,944 B1 | 1/2007 | Estakhri | |
| 7,167,953 B2 | 1/2007 | Megiddo et al. | |
| 7,173,852 B2 | 2/2007 | Gorobets | |
| 7,177,197 B2 | 2/2007 | Cernea | |
| 7,181,572 B2 | 2/2007 | Walmsley | |
| 7,185,162 B1 | 2/2007 | Snyder | |
| 7,194,577 B2 | 3/2007 | Johnson et al. | |
| 7,194,740 B1 | 3/2007 | Frank et al. | |
| 7,219,238 B2 | 5/2007 | Saito et al. | |
| 7,227,777 B2 | 6/2007 | Roohparvar | |
| 7,243,203 B2 | 7/2007 | Scheuerlein | |
| 7,246,179 B2 | 7/2007 | Camara et al. | |
| 7,257,129 B2 | 8/2007 | Lee et al. | |
| 7,257,690 B1 | 8/2007 | Baird | |
| 7,263,591 B2 | 8/2007 | Estakhri et al. | |
| 7,275,135 B2 | 9/2007 | Coulson | |
| 7,305,520 B2 | 12/2007 | Voight et al. | |
| 7,310,711 B2 | 12/2007 | New et al. | |
| 7,328,307 B2 | 2/2008 | Hoogterp | |
| 7,340,558 B2 | 3/2008 | Lee et al. | |
| 7,340,566 B2 | 3/2008 | Voth | |
| 7,340,581 B2 | 3/2008 | Gorobets et al. | |
| 7,380,081 B2 | 5/2008 | Ji et al. | |
| 7,392,429 B2 * | 6/2008 | Frank | G06F 1/30 |
| | | | 714/22 |
| 7,398,348 B2 | 7/2008 | Moore et al. | |
| 7,400,537 B2 | 7/2008 | Hemink et al. | |
| 7,403,424 B2 | 7/2008 | Hemink et al. | |
| 7,424,593 B2 | 9/2008 | Estakhri et al. | |
| 7,441,090 B2 | 10/2008 | Estakhri et al. | |
| 7,450,420 B2 | 11/2008 | Sinclair et al. | |
| 7,451,344 B1 | 11/2008 | Rothberg | |
| 7,457,166 B2 | 11/2008 | Hemink et al. | |
| 7,460,432 B2 | 12/2008 | Warner | |
| 7,463,521 B2 | 12/2008 | Li | |
| 7,463,532 B2 | 12/2008 | Tran et al. | |
| 7,464,240 B2 | 12/2008 | Caulkins et al. | |
| 7,480,766 B2 | 1/2009 | Gorobets | |
| 7,487,320 B2 | 2/2009 | Bansal et al. | |
| 7,495,954 B2 | 2/2009 | Ito | |
| 7,499,317 B2 | 3/2009 | Ito | |
| 7,499,338 B2 | 3/2009 | Ito | |
| 7,522,457 B2 | 4/2009 | Hemink et al. | |
| 7,532,537 B2 | 5/2009 | Solomon et al. | |
| 7,535,766 B2 | 5/2009 | Ito | |
| 7,548,464 B2 | 6/2009 | Kim | |
| 7,552,271 B2 | 6/2009 | Sinclair et al. | |
| 7,599,967 B2 | 10/2009 | Girkar et al. | |
| 7,619,912 B2 | 11/2009 | Bhakta et al. | |
| 7,630,255 B2 | 12/2009 | Yang | |
| 7,631,138 B2 | 12/2009 | Gonzalez et al. | |
| 7,644,239 B2 | 1/2010 | Ergan et al. | |
| 7,652,922 B2 | 1/2010 | Kim | |
| 7,653,836 B1 | 1/2010 | Chatterjee | |
| 7,694,191 B1 | 4/2010 | Bono et al. | |
| 7,725,628 B1 | 5/2010 | Phan et al. | |
| 7,743,210 B1 | 6/2010 | Jernigan, IV et al. | |
| 7,752,360 B2 | 7/2010 | Galles | |
| 7,761,625 B2 | 7/2010 | Karamcheti et al. | |
| 7,773,521 B2 | 8/2010 | Zhang et al. | |
| 7,777,652 B2 | 8/2010 | Lee et al. | |
| 7,778,092 B2 | 8/2010 | Klein | |
| 7,793,061 B1 | 9/2010 | Gupta et al. | |
| 7,818,525 B1 | 10/2010 | Frost et al. | |
| 7,856,528 B1 | 12/2010 | Frost et al. | |
| 7,873,782 B2 | 1/2011 | Terry | |
| 7,881,150 B2 | 2/2011 | Solomon et al. | |
| 7,898,867 B2 | 3/2011 | Hazama et al. | |
| 7,903,468 B2 | 3/2011 | Litsyn et al. | |
| 7,908,501 B2 | 3/2011 | Kim et al. | |
| 7,930,326 B2 | 4/2011 | Doucette et al. | |
| 7,944,762 B2 | 5/2011 | Gorobets | |
| 7,970,770 B2 | 6/2011 | Edwards | |
| 7,978,541 B2 | 7/2011 | Sutardja | |
| 8,001,334 B2 | 8/2011 | Lee | |
| 8,001,434 B1 | 8/2011 | Lee et al. | |
| 8,010,738 B1 | 8/2011 | Chilton et al. | |
| 8,010,758 B1 | 8/2011 | Bezbaruah et al. | |
| 8,046,551 B1 | 10/2011 | Sahin | |
| 8,055,922 B2 | 11/2011 | Brittain et al. | |
| 8,074,041 B2 | 12/2011 | Clark | |
| 8,081,536 B1 | 12/2011 | Solomon et al. | |
| 8,130,551 B2 | 3/2012 | Oowada et al. | |
| 8,250,295 B2 | 8/2012 | Amidi et al. | |
| 8,289,801 B2 | 10/2012 | Smith et al. | |
| 8,301,833 B1 | 10/2012 | Chen et al. | |
| 8,359,501 B1 | 1/2013 | Lee et al. | |
| 8,364,888 B2 | 1/2013 | Melik-Martirosian et al. | |
| 8,397,013 B1 | 3/2013 | Rosenband et al. | |
| 8,423,710 B1 | 4/2013 | Gole | |
| 8,429,436 B2 | 4/2013 | Fillingim et al. | |
| 8,516,185 B2 | 8/2013 | Lee et al. | |
| 8,516,187 B2 | 8/2013 | Chen et al. | |
| 8,527,693 B2 | 9/2013 | Flynn et al. | |
| 8,549,230 B1 | 10/2013 | Chatterjee et al. | |
| 9,047,178 B2 | 6/2015 | Talagala et al. | |
| 9,208,071 B2 | 12/2015 | Talagala et al. | |
| 9,218,278 B2 | 12/2015 | Talagala et al. | |
| 9,223,662 B2 | 12/2015 | Flynn et al. | |
| 9,305,610 B2 | 4/2016 | Smith et al. | |
| 9,489,305 B2 * | 11/2016 | Patsilaras | G06F 12/0802 |
| 9,767,017 B2 | 9/2017 | Talagala et al. | |
| 9,772,938 B2 | 9/2017 | Talagala et al. | |
| 2002/0066047 A1 | 5/2002 | Olarig et al. | |
| 2002/0069318 A1 | 6/2002 | Chow et al. | |
| 2002/0091903 A1 * | 7/2002 | Mizuno | G06F 3/0605 |
| | | | 711/154 |
| 2002/0103819 A1 | 8/2002 | Duvillier et al. | |
| 2002/0133743 A1 | 9/2002 | Oldfield et al. | |
| 2002/0138686 A1 | 11/2002 | Yang et al. | |
| 2002/0181134 A1 | 12/2002 | Bunker et al. | |
| 2002/0199056 A1 | 12/2002 | Ayukawa et al. | |
| 2003/0028704 A1 | 2/2003 | Mukaida et al. | |
| 2003/0028726 A1 | 2/2003 | Gaertner et al. | |
| 2003/0061296 A1 | 3/2003 | Craddock et al. | |
| 2003/0115405 A1 | 6/2003 | Funyu et al. | |
| 2003/0126475 A1 | 7/2003 | Bodas | |
| 2003/0145230 A1 | 7/2003 | Chiu et al. | |
| 2003/0163630 A1 | 8/2003 | Aasheim et al. | |
| 2003/0163663 A1 | 8/2003 | Aasheim et al. | |
| 2003/0198084 A1 | 10/2003 | Fujisawa et al. | |
| 2003/0210601 A1 | 11/2003 | Lin et al. | |
| 2004/0003002 A1 | 1/2004 | Adelmann | |
| 2004/0064647 A1 | 4/2004 | DeWhitt et al. | |
| 2004/0103238 A1 | 5/2004 | Avraham et al. | |
| 2004/0148360 A1 | 7/2004 | Mehra et al. | |
| 2004/0177054 A1 | 9/2004 | Stern et al. | |
| 2004/0186946 A1 | 9/2004 | Lee | |
| 2004/0225719 A1 | 11/2004 | Kisley et al. | |
| 2004/0268359 A1 | 12/2004 | Hanes | |
| 2005/0002263 A1 | 1/2005 | Iwase et al. | |
| 2005/0015539 A1 | 1/2005 | Horii et al. | |
| 2005/0018527 A1 | 1/2005 | Gorobets | |
| 2005/0027951 A1 | 2/2005 | Piccirillo et al. | |
| 2005/0050191 A1 * | 3/2005 | Hubis | H04L 67/1097 |
| | | | 709/223 |
| 2005/0141313 A1 | 6/2005 | Gorobets | |
| 2005/0144361 A1 | 6/2005 | Gonzales et al. | |
| 2005/0172099 A1 | 8/2005 | Lowe | |
| 2005/0193166 A1 | 9/2005 | Johnson et al. | |
| 2005/0210323 A1 | 9/2005 | Batchelor et al. | |
| 2005/0216653 A1 | 9/2005 | Aasheim et al. | |
| 2005/0240713 A1 | 10/2005 | Wu | |
| 2005/0246510 A1 | 11/2005 | Retnamma et al. | |
| 2005/0246558 A1 | 11/2005 | Ku | |
| 2005/0257017 A1 | 11/2005 | Yagi | |
| 2005/0257213 A1 | 11/2005 | Chu et al. | |
| 2005/0262150 A1 | 11/2005 | Krishnaswamy | |
| 2005/0267882 A1 | 12/2005 | Auperlee et al. | |
| 2005/0270927 A1 | 12/2005 | Hayashi | |

(56) References Cited

U.S. PATENT DOCUMENTS

| | | |
|---|---|---|
| 2005/0273476 A1 | 12/2005 | Wertheimer |
| 2006/0004955 A1 | 1/2006 | Ware et al. |
| 2006/0020744 A1 | 1/2006 | Sinclair |
| 2006/0026221 A1 | 2/2006 | Chen et al. |
| 2006/0059326 A1 | 3/2006 | Aasheim et al. |
| 2006/0064556 A1 | 3/2006 | Aasheim et al. |
| 2006/0069870 A1 | 3/2006 | Nicholson et al. |
| 2006/0074877 A1 | 4/2006 | Kuersch et al. |
| 2006/0075057 A1 | 4/2006 | Gildea et al. |
| 2006/0085471 A1 | 4/2006 | Rajan et al. |
| 2006/0095659 A1 | 5/2006 | New et al. |
| 2006/0106990 A1 | 5/2006 | Benhase et al. |
| 2006/0117056 A1 | 6/2006 | Havewala et al. |
| 2006/0136464 A1 | 6/2006 | Rossmann |
| 2006/0136779 A1 | 6/2006 | Lee et al. |
| 2006/0139069 A1 | 6/2006 | Frank et al. |
| 2006/0149893 A1 | 7/2006 | Barfuss et al. |
| 2006/0149916 A1 | 7/2006 | Nase |
| 2006/0179263 A1 | 8/2006 | Song et al. |
| 2006/0184722 A1 | 8/2006 | Sinclair |
| 2006/0184736 A1 | 8/2006 | Benhase et al. |
| 2006/0190552 A1 | 8/2006 | Henze et al. |
| 2006/0212644 A1 | 9/2006 | Acton et al. |
| 2006/0224634 A1 | 10/2006 | Hahn et al. |
| 2006/0230295 A1 | 10/2006 | Schumacher et al. |
| 2006/0248387 A1 | 11/2006 | Nicholson et al. |
| 2006/0265624 A1 | 11/2006 | Moshayedi |
| 2006/0265635 A1 | 11/2006 | Hummler |
| 2006/0265636 A1 | 11/2006 | Hummler |
| 2006/0280048 A1 | 12/2006 | Jung et al. |
| 2006/0294300 A1 | 12/2006 | Lubbers |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0083530 A1 | 4/2007 | Lakshminath et al. |
| 2007/0086260 A1 | 4/2007 | Sinclair |
| 2007/0088666 A1 | 4/2007 | Saito |
| 2007/0118713 A1 | 5/2007 | Guterman |
| 2007/0143560 A1 | 6/2007 | Gorobets |
| 2007/0143566 A1 | 6/2007 | Gorobets |
| 2007/0147356 A1 | 6/2007 | Gorobets |
| 2007/0156998 A1 | 7/2007 | Gorobets |
| 2007/0168641 A1 | 7/2007 | Hummel et al. |
| 2007/0168698 A1 | 7/2007 | Coulson et al. |
| 2007/0174574 A1 | 7/2007 | Kano |
| 2007/0179995 A1 | 8/2007 | Prahlad et al. |
| 2007/0198770 A1 | 8/2007 | Horii et al. |
| 2007/0204270 A1 | 8/2007 | Dong-Kun |
| 2007/0208790 A1 | 9/2007 | Reuter et al. |
| 2007/0220227 A1 | 9/2007 | Long |
| 2007/0230253 A1 | 10/2007 | Kim |
| 2007/0233937 A1 | 10/2007 | Coulson et al. |
| 2007/0233938 A1 | 10/2007 | Cho et al. |
| 2007/0234021 A1 | 10/2007 | Ruberg et al. |
| 2007/0239728 A1 | 10/2007 | Smits |
| 2007/0239926 A1 | 10/2007 | Gyl et al. |
| 2007/0245076 A1 | 10/2007 | Chang et al. |
| 2007/0245094 A1 | 10/2007 | Lee et al. |
| 2007/0260608 A1 | 11/2007 | Hertzberg et al. |
| 2007/0260813 A1 | 11/2007 | Lin |
| 2007/0260821 A1 | 11/2007 | Zeller et al. |
| 2007/0266037 A1 | 11/2007 | Terry |
| 2007/0274150 A1 | 11/2007 | Gorobets |
| 2007/0276994 A1 | 11/2007 | Caulkins et al. |
| 2007/0300008 A1 | 12/2007 | Rogers et al. |
| 2008/0010395 A1 | 1/2008 | Mylly et al. |
| 2008/0016295 A1 | 1/2008 | Yim et al. |
| 2008/0025126 A1 | 1/2008 | Jewell et al. |
| 2008/0052477 A1 | 2/2008 | Lee |
| 2008/0052483 A1 | 2/2008 | Rangarajan et al. |
| 2008/0059820 A1 | 3/2008 | Vaden et al. |
| 2008/0080243 A1 | 4/2008 | Edahiro et al. |
| 2008/0104344 A1 | 5/2008 | Shimozono et al. |
| 2008/0117686 A1 | 5/2008 | Yamada |
| 2008/0126507 A1 | 5/2008 | Wilkinson |
| 2008/0126686 A1 | 5/2008 | Sokolov et al. |
| 2008/0140737 A1 | 6/2008 | Garst et al. |
| 2008/0141043 A1 | 6/2008 | Flynn |
| 2008/0162590 A1 | 7/2008 | Kundu et al. |
| 2008/0228992 A1 | 9/2008 | Dumitru et al. |
| 2008/0243966 A1 | 10/2008 | Croisettier |
| 2008/0256316 A1 | 10/2008 | Evanchik et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0266973 A1 | 10/2008 | Sekar et al. |
| 2008/0282031 A1 | 11/2008 | Tanoue |
| 2008/0301475 A1 | 12/2008 | Felter et al. |
| 2008/0320323 A1 | 12/2008 | Brittain et al. |
| 2009/0031072 A1 | 1/2009 | Sartore |
| 2009/0031098 A1 | 1/2009 | Sartore |
| 2009/0037778 A1 | 2/2009 | Resnick |
| 2009/0091979 A1 | 4/2009 | Shalvi |
| 2009/0091996 A1 | 4/2009 | Chen et al. |
| 2009/0094676 A1 | 4/2009 | Burugula et al. |
| 2009/0106479 A1 | 4/2009 | Okin et al. |
| 2009/0125700 A1 | 5/2009 | Kisel |
| 2009/0136144 A1 | 5/2009 | Gwak |
| 2009/0144818 A1 | 6/2009 | Kumar et al. |
| 2009/0150599 A1 | 6/2009 | Bennett |
| 2009/0150605 A1 | 6/2009 | Flynn et al. |
| 2009/0150621 A1 | 6/2009 | Lee |
| 2009/0157989 A1 | 6/2009 | Karamcheti et al. |
| 2009/0172253 A1 | 7/2009 | Rothman et al. |
| 2009/0193183 A1 | 7/2009 | Kudo et al. |
| 2009/0204649 A1 | 8/2009 | Wong et al. |
| 2009/0207649 A1 | 8/2009 | Wong et al. |
| 2009/0239468 A1 | 9/2009 | Xiaojie et al. |
| 2009/0248763 A1 | 10/2009 | Rajan |
| 2009/0276654 A1 | 11/2009 | Butterworth |
| 2009/0287887 A1 | 11/2009 | Matsuki |
| 2009/0292861 A1 | 11/2009 | Kanevsky et al. |
| 2009/0300312 A1 | 12/2009 | Handschuh et al. |
| 2010/0005228 A1 | 1/2010 | Fukutomi |
| 2010/0005259 A1 | 1/2010 | Prahlad et al. |
| 2010/0023682 A1 | 1/2010 | Lee et al. |
| 2010/0049913 A1 | 2/2010 | Alon et al. |
| 2010/0082529 A1 | 4/2010 | Mace et al. |
| 2010/0095059 A1 | 4/2010 | Kisley et al. |
| 2010/0102999 A1 | 4/2010 | Lee et al. |
| 2010/0106754 A1 | 4/2010 | Condit et al. |
| 2010/0106917 A1 | 4/2010 | Ruberg et al. |
| 2010/0110748 A1 | 5/2010 | Best |
| 2010/0122017 A1 | 5/2010 | Toyama |
| 2010/0124123 A1 | 5/2010 | Lee |
| 2010/0131826 A1 | 5/2010 | Shalvi et al. |
| 2010/0145915 A1 | 6/2010 | Min et al. |
| 2010/0146187 A1 | 6/2010 | Grimsrud et al. |
| 2010/0153680 A1 | 6/2010 | Baum et al. |
| 2010/0191898 A1 | 7/2010 | Kim et al. |
| 2010/0199020 A1 | 8/2010 | Lin et al. |
| 2010/0205335 A1 | 8/2010 | Phan et al. |
| 2010/0211737 A1 | 8/2010 | Flynn |
| 2010/0217924 A1 | 8/2010 | Panabaker et al. |
| 2010/0228912 A1 | 9/2010 | Huang et al. |
| 2010/0228936 A1 | 9/2010 | Wright et al. |
| 2010/0235831 A1 | 9/2010 | Dittmer |
| 2010/0250831 A1 | 9/2010 | O'Brien et al. |
| 2010/0257304 A1 | 10/2010 | Rajan et al. |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |

(56) References Cited

U.S. PATENT DOCUMENTS

| | | | |
|---|---|---|---|
| 2010/0262773 | A1 | 10/2010 | Borchers et al. |
| 2010/0262894 | A1 | 10/2010 | Swing et al. |
| 2010/0262979 | A1 | 10/2010 | Borchers et al. |
| 2010/0268974 | A1 | 10/2010 | Floyd et al. |
| 2010/0287347 | A1 | 11/2010 | Cameron et al. |
| 2010/0332716 | A1 | 12/2010 | Sheaffer et al. |
| 2010/0332871 | A1 | 12/2010 | Allalouf et al. |
| 2010/0332897 | A1 | 12/2010 | Wilson |
| 2011/0004722 | A1 | 1/2011 | Jeddeloh |
| 2011/0035562 | A1 | 2/2011 | Gaither |
| 2011/0208911 | A1 | 8/2011 | Taguchi et al. |
| 2011/0225364 | A1 | 9/2011 | Edwards |
| 2012/0030408 | A1 | 2/2012 | Flynn et al. |
| 2012/0096217 | A1 | 4/2012 | Son et al. |
| 2012/0151118 | A1 | 6/2012 | Flynn |
| 2012/0239860 | A1 | 9/2012 | Atkisson et al. |
| 2012/0239868 | A1 | 9/2012 | Ryan et al. |
| 2012/0254515 | A1 | 10/2012 | Melik-Martirosian et al. |
| 2014/0143505 | A1* | 5/2014 | Sim ............... G06F 12/0804 711/143 |
| 2014/0365707 | A1 | 12/2014 | Talagala |

FOREIGN PATENT DOCUMENTS

| | | |
|---|---|---|
| CN | 102567146 A | 7/2012 |
| CN | 105612503 B | 10/2018 |
| EP | 0747822 | 12/1996 |
| GB | 0123416 | 9/2001 |
| JP | 10320270 | 12/1998 |
| KR | 20000026300 | 5/2000 |
| KR | 20010034476 | 4/2001 |
| KR | 20050024278 | 3/2005 |
| KR | 20060107728 | 10/2006 |
| KR | 10-2004-0047584 | 3/2010 |
| TW | 200825696 | 6/2008 |
| WO | 0131512 | 5/2001 |
| WO | 0201365 | 1/2002 |
| WO | 2004077219 | 9/2004 |
| WO | 2004077219 A2 | 9/2004 |
| WO | 2004077219 A2 | 9/2004 |
| WO | 2004099989 | 11/2004 |
| WO | 2005103878 | 11/2005 |
| WO | 2006062511 | 6/2006 |
| WO | 2006065626 | 6/2006 |
| WO | 2008130799 | 3/2008 |
| WO | 2008070799 | 6/2008 |
| WO | 2008138799 A1 | 10/2008 |
| WO | 2010053756 | 5/2010 |
| WO | 2011106394 | 9/2011 |
| WO | 2012050934 | 4/2012 |
| WO | 2012082792 | 6/2012 |

OTHER PUBLICATIONS

U.S. Appl. No. 11/952,098, Office Action, dated Jan. 7, 2011.
U.S. Appl. No. 11/952,098, Office Action, dated Oct. 8, 2013.
U.S. Appl. No. 11/952,098, Office Action, dated Sep. 18, 2012.
U.S. Appl. No. 11/952,098, Office Action, dated Jan. 13, 2012.
U.S. Appl. No. 12/878,981, Notice of Allowance, dated Aug. 28, 2012.
U.S. Appl. No. 13/174,449, Office Action, dated Sep. 6, 2011.
U.S. Appl. No. 13/174,449, Office Action, dated Sep. 11, 2012.
U.S. Appl. No. 11/952,113, Office Action, dated Dec. 15, 2010.
U.S. Appl. No. 60/625,495, filed Nov. 6, 2004.
U.S. Appl. No. 6/718,768, filed Aug. 20, 2005.
U.S. Appl. No. 60/797,127, filed May 3, 2006.
"BiTMICRO Introduces E-Disk PMC Flash Disk Module", BiTMICRO, May 18, 2004, pp. 2, Military & Aerospace Electronics East 2004, http://www.bitmicro.com/press_news_releases_20040518_prt.php.
"Introduction to Samsung's Linux Flash File System-RFS", Samsung Electronics, Nov. 2006, pp. 6, Application Note, Version 1.0.
Application No. PCT/US2008/059048, International Search Report and Written Opinion, dated Aug. 25, 2008.
Application No. PCT/US2007/086687, International Preliminary Report on Patentability, dated Mar. 18, 2009.
Lottiaux, Renaud, OpenMosix, OpenSSI and Kerrighed: A Comparative Study, Inria, Nov. 2004, pp. 23, Institut National De Recherche en Informatique et en Automatique.
U.S. Appl. No. 14/011,395, Final Office Action, dated Jun. 26, 2014.
U.S. Appl. No. 13/694,000, Notice of Allowance, dated Feb. 4, 2015.
U.S. Appl. No. 13/836,826, Office Action, dated Feb. 24, 2015.
Application No. 10816108.4, Examination Report, dated Feb. 4, 2014.
U.S. Appl. No. 14/011,395, Final Office Action, dated May 18, 2015.
U.S. Appl. No. 14/042,189, Office Action, dated Jun. 4, 2015.
Application No. 201180059862.6, Office Action dated Apr. 1, 2015.
Application No. 201080050702.0, Office Action, dated Feb. 20, 2014.
U.S. Appl. No. 12/878,987, Notice of Allowance, dated Mar. 21, 2013.
U.S. Appl. No. 12/878,987, Office Action, dated Oct. 18, 2012.
Application No. EP11813216, Search Report, dated Nov. 7, 2013.
U.S. Appl. No. 13/372,430, Office Action, dated Apr. 21, 2014.
Application No. 201080050702.0, Office Action, dated Sep. 19, 2014.
U.S. Appl. No. 13/372,430, Advisory Action, dated Aug. 6, 2014.
U.S. Appl. No. 13/372,430, Office Action, dated Nov. 7, 2013.
U.S. Appl. No. 13/834,955, Office Action, dated Apr. 4, 2014.
Macko, Peter, "Tracking Back References in Write-Anywhere File System", 8th USENIX Conference on File and Storage Technologies, Feb. 23-26, 2010, pp. 15, San Jose, California, US.
Application No. PCT/US2011/025885, International Search Report and Written Opinion, dated Sep. 28, 2011.
Application No. PCT/US2011/036539, International preliminary Report on Patentability, dated Nov. 13, 2012.
Application No. PCT/US2011/045801, International Search Report, dated Apr. 6, 2012.
Application No. PCT/US2011/065927, International Search Report, dated Aug. 28, 2012.
Application No. PCT/US2012/024927, International Search Report, dated Oct. 12, 2012.
Application No. PCT/US2012/024927, Written Opinion, dated Oct. 12, 2012.
Am29DL322D/323D/324D Data Sheet, Spansion, Jul. 2003, pp. 57, Publication No. 21534 Revision D, Amendment +7, Issue Date Oct. 7, 2004.
U.S. Appl. No. 13/834,955, Final Office Action, dated Sep. 8, 2014.
Application No. PCT/US2007/025049, International Search Report, dated May 14, 2008.
Application No. PCT/US2007/025049, International Preliminary Report on Patentability, dated Mar. 11, 2009.
Application No. PCT/US2009/063938, International Search Report, dated Jun. 23, 2010.
U.S. Appl. No. 13/015,458, Office Action, dated Sep. 7, 2012.
Application No. 10-2012-0080003, Office Action, dated May 30, 2014.
Application No. PCT/US2011/053792, International Search Report and Written Opinion, dated May 4, 2012.
Application No. PCT/US2011/053792, International Preliminary Report on Patentability, dated Apr. 11, 2013.
U.S. Appl. No. 13/248,006, Notice of Allowance, dated Nov. 8, 2013.
Application No. 11848174.6, Examination Report, dated Jun. 30, 2015.
U.S. Appl. No. 13/836,826, Notice of Allowance, dated Jul. 30, 2015.
U.S. Appl. No. 13/838,070, Notice of Allowance, dated Aug. 26, 2015.
U.S. Appl. No. 14/011,395, Office Action, dated Oct. 31, 2014.
U.S. Appl. No. 14/011,395, Notice of Allowance, dated Aug. 19, 2015.
Application No. PCT/US2011/045801, International Preliminary Report on Patentability, dated Apr. 6, 2012.

(56) References Cited

OTHER PUBLICATIONS

Application No. PCT/US2012/024927, International Preliminary Report on Patentability, dated Aug. 13, 2013.
Application No. PCT/US2014/048129, International Search Report and Written Opinion, dated Nov. 7, 2014.
Megiddo, Nimrod, "ARC: A Self-Tuning, Low Overhead Replacement Cache", 2nd USENIX Conference on File and Storage Technologies, Mar. 31-Apr. 2, 2003, pp. 17, San Francisco, California, US.
"Internet Backbone and Colocation Provider", Hurricane Electric Internet Services, downloaded Sep. 28, 2011, pp. 1, Fremont, California, US.
Application No. PCT/US2007/086702, International Search Report and Written Opinion, dated Nov. 4, 2009.
Suh, Kang-Deog, "A 3.3 V 32 Mb NAND Flash Memory with Incremental Step Pulse Programming Scheme", IEEE Journal of Solid-State Circuits, Nov. 30, 1995, pp. 8, No. 11, New York, US.
"Actel Fusion FPGAs Supporting Intelligent Peripheral Management Interface (IPMI) Applications", ACTEL, Oct. 1, 2006, pp. 17, http://www.actel.com/documents/Fusion_IPMI_AN.pdf.
AgigaRAM Company review, downloaded Feb. 17, 2010, p. 1.
Hutsell, Woody, "An In-Depth Look at the RamSan-500 Cached Flash Solid State Disk", Texas Memory Systems, Mar. 2008, pp. 16.
"Method for Fault Tolerance on Nonvolatile Storage", PriorArtDatabase, 2005, pp. 6, IPCOM000042269D, http://ip.com, Feb. 2005.
Ari, Ismail, "Performance Boosting and Workload Isolation in Storage Area Networks with SanCache", Hewlett Packard Laboratories, May 2006, pp. 11, Proceedings of the 23rd IEEE/14th NASA Goddard Conference on Mass Storage Systems and Technologies.
"ASPMC-660 Rugged IDE Flash Drive PMC Module", ASINE, downloaded Nov. 8, 2009, pp. 3, http://www.asinegroup.com/products/aspmc660.html.
Condit, Jeremy, "Better I/O Through Byte-Addressable, Persistent Memory", Microsoft Research, UCLA, Oct. 11-14, 2009, pp. 14.
Brandon, Daniel, Jr., "Sparse Matrices in CS Education" Journal of Computing Sciences in Colleges, May 2009, pp. 6, vol. 24, Issue 5.
Coburn, Joel, "NV-Heaps: Making Persistennt Objects Fast and Safe with Next-Generation, Non-Volatile Memories", Mar. 5, 2011, pp. 13, ACM 978-1-4503-0266-1/11/0.
Dan, Raz, "Implementing MLC NAND Flash for Cost-Effective, High-Capacity Memory", M-Systems, Sep. 2003, pp. 13, White Paper, 91-SR-014-02-8L, Rev. 1.1.
Malventano, Allyn, "DDRdrive Hits the Ground Running-PCI-E RAM-based SSD", PC Perspective, May 4, 2009, pp. 2, http://www.pcper.com/article.php?aid=704.
"NAND Flash Memories and Programming NAND Flash Memories Using ELNEC Device Programmers", ELNEC, Mar. 1, 2007, pp. 44, Application Note.
Wright, Charles P., "Extending ACID Semantics to the File System", ACM Transactions on Storage, May 2007, pp. 40, vol. 3, No. 2.
"File Level Caching", ADABAS Caching Facility, May 11, 2004, pp. 9, PCF0002,1-4244-0753.
"Finding the Perfect Memory", AGIGATech, Sep. 3, 2009, pp. 15, Agiga Tech White Paper.
Rose, Mike, "FPGA PCIe Bandwidth", University of San Diego, Jun. 9, 2010, pp. 7.
Gal, Eran, "A Transactional Flash File System for Microcontrollers", USENIX Annual Technical Conference, Apr. 10, 2009, pp. 16.
Garfinkel, Simson L., "One Big File is Not Enough: A Critical Evaluation of the Dominant Free-Space Sanitization Technique", 6th Workshop on Privacy Enhancing Technologies, Jun. 1, 2006, pp. 31, Cambridge, United Kingdom.
Shrout, Ryan, "Gigabyte iRAM Solid State SATA Storage Review", PC Perspective, Apr. 5, 2006, pp. 2, http://www.pcper.com/article.php?aid=224&type=expert.
Shrout, Ryan, "Gigabyte iRAM Solid State SATA Storage Review", PC Perspective, Apr. 5, 2006, pp. 4, http://www.pcper.com/article.php?aid=224&type=expert&type=expert&pid=3.
Gutmann, Peter, "Secure Deletion of Data from Magnetic and Solid-State Memory", Usenix, Jul. 1, 1996, pp. 18, San Jose, California, US.
Leventhal, Adam, "Flash Storage Memory", Communications of the ACM, Jul. 2008, pp. 5, vol. 51, No. 7.
Mesnier, Mike, "Object-Based Storage", IEEE Communications, Aug. 2003, pp. 7.
Morgenstern, David, "Is There a Flash Memory RAID in Your Future?", Ziff Davis Enterprise Holdings Inc., Nov. 8, 2006, pp. 4, http://www.eweek.com.
Mellor, Chris, "New RAM Shunts Data Into Flash in Power Cuts", Oct. 19, 2011, pp. 3, http://www.channelregister.co.uk/2011/10/19/viking_hybrid_dram_nand/.
Ajanovic, Jasmin, "PCI Express* (PCIe*) 3.0 Accelerator Features", Intel Corporation, Aug. 2008, pp. 10.
Application No. PCT/US2010/048320, International Search Report and Written Opinion, dated Apr. 28, 2011.
Application No. PCT/US2010/048321, International Search Report and Written Opinion, dated Apr. 28, 2011.
"Pivot3 Raige Storage Cluster", Pivot3, Jun. 2007, pp. 17, Technology Review, White Paper.
Plank, James S., "A Tutorial on Reed-Solomon Coding for Fault Tolerance in RAID-like System", Department of Computer Science, University of Tennessee, Sep. 1997, pp. 19.
Porter, Donald E., "Operating System Transactions", ACM, Oct. 1, 2009, pp. 20, 978-1-60558-752-3/09/10.
"Problem: Non-Volatile RAMs Today", AGIGATech, downloaded Feb. 17, 2010, pp. 11, San Diego, California, US.
Arpaci-Duseau, Andrea C., "Removing the Costs of Indirection in Flash-based SSDs with Nameless Writes", University of Wisconsin-Madison, Microsoft Research, Jun. 2010, pp. 5.
Rosenblum, Mendel, "The Design and Implementation of a Log-Structured File System", ACM Transactions on Computer Systems, Feb. 1992, pp. 27, vol. 10, Issue 1.
Sears, Russell C., "Stasis: Flexible Transactional Storage", OSDI '06: 7th USENIX Symposium on Operating Systems Design and Implementation, Nov. 6, 2006, pp. 176.
Seltzer, Margo Ilene, "File System Performance and Transaction Support", University of California at Berkeley, Jan. 1, 1992, pp. 131.
Seltzer, Margo I., "Transaction Support in a Log-Structured File System", Harvard University Division of Applied Sciences, Jan. 1, 1993, pp. 8.
Seltzer, Margo, "Transaction Support in Read Optimized and write Optimized File Systems", Proceedings of the 16th VLDB Conference, Jan. 1, 1990, pp. 12, Brisbane, Australia.
"Data Management Software (DMS) for AMD Simultaneous Read/Write Flash Memory Devices", Spansion, Jul. 7, 2003, pp. 10.
Spillane, Richard P., "Enabling Transactional File Access via Lightweight Kernel Extensions", Stony Rook University, IBM T. J. Watson Research Center, Feb. 25, 2009, pp. 23.
Tal, Arie, "NAND vs. NOR Flash Technology", M-Systems, downloaded Nov. 22, 2010, www.2electronicproducts.com/PrintArticle.aspx?ArticleURL=FEBMSY1.feb2002,html.
Van Hensbergen, Eric, "Dynamic Policy Disk Caching for Storage Networking", IBM Research Division, Nov. 2006, p. 13, RC24123 (W0611-189).
Application No. 11848174.6, Search Report, dated Apr. 2, 2014.
Application No. 11848174.6, Office Action, dated Apr. 22, 2014.
Application No. PCT/US2011/064728, International Search Report and Written Opinion, dated Jul. 31, 2012.
U.S. Appl. No. 13/324,942, Notice of Allowance, dated May 2, 2013.
U.S. Appl. No. 14/011,395, Office Action, dated Jan. 16, 2014.
NAND Flash 101: An Introduction to NAND Flash and How to Design It in to Your Next Product, Micron Technology, Inc., downloaded May 10, 2010, pp. 28, TN-29-19, http://www.micron.com/~/media/Documents/Products/Technical%20Note/NAND%20Flash/145tn2919_nand_101.
Magenheimer, Dan, "(Take 2): Transcendent Memory ("tmem") for Linux", LWN Merchandise, Jul. 7, 2009, http://lwn.net/Articles/340409/.

(56) References Cited

OTHER PUBLICATIONS

Application No. 200780050983.8, Office Action, dated May 18, 2011.
Application No. PCT/US2007/025048, International Search Report and Written Opinion, dated May 27, 2008.
Application No. PCT/US2007/025048, International Preliminary Report on Patentability, dated Jun. 18, 2009.
Application No. 07865334.2, Office Action, dated Nov. 17, 2010.
Application No. 07865334.2, Examination Report, dated Jan. 30, 2012.
Application No. PCT/US2007/086687, International Search Report and Written Opinion, dated Sep. 5, 2008.
U.S. Appl. No. 11/952,101, Office Action, dated Jan. 6, 2011.
Application No. PCT/US2011/025885, International Preliminary Report on Patentability, dated Sep. 7, 2012.
U.S. Appl. No. 13/015,458, Notice of Allowance, dated Sep. 19, 2012.
Application No. 12176826.1, Search Report, dated Dec. 10, 2012.
U.S. Appl. No. 13/189,402, Notice of Allowance, dated Nov. 15, 2012.
Application No. PCT/US2007/086688, International Preliminary Report on Patentability, dated Mar. 16, 2009.
Application No. PCT/US2007/086688, International Search Report and Written Opinion, dated Apr. 28, 2008.
Application No. PCT/US2011/053795, International Search Report and Written Opinion, dated May 4, 2012.
U.S. Appl. No. 11/952,109, Office Action, dated Nov. 29, 2011.
U.S. Appl. No. 11/952,109, Office Action, dated May 1, 2012.
U.S. Appl. No. 11/952,109, Office Action, dated Mar. 17, 2011.
U.S. Appl. No. 11/952,109, Office Action, dated Jul. 1, 2011.
Application No. 200780050970.0, Office Action, dated Oct. 28, 2010.
Application No. 200780050970.0, Office Action, dated Jun. 29, 2011.
Application No. 200780050970.0, Office Action, dated Jan. 5, 2012.
Application No. PCT/US2007/086691, International Preliminary Report on Patentability, dated Feb. 16, 2009.
Application No. PCT/US2007/086691, International Search Report and Written Opinion, dated May 8, 2008.
U.S. Appl. No. 11/952,113, Office Action, dated Mar. 6, 2012.
Application No. 200780051020.X, Office Action, dated Nov. 11, 2010.
Application No. 200780051020.X, Office Action, dated Jul. 6, 2011.
Application No. 200780051020.X, Office Action, dated Nov. 7, 2011.
Application No. 07865345.8, Office Action, dated Nov. 17, 2010.
Application No. 07865345.8, Office Action, dated Jan. 30, 2012.
Application No. PCT/US2007/086701, International Preliminary Report on Patentability, dated Mar. 16, 2009.
Application No. PCT/US2007/086701, International Search Report and Written Opinion, dated Jun. 5, 2008.
Application No. PCT/US2007/086702, International Preliminary Report on Patentability, dated Nov. 19, 2009.
Guerra, Jorge, "Software Persistent Memory", Florida International University, downloaded Jul. 11, 2013, pp. 13.
Volos, Haris, "Mnemosyne: Lightweight Persistent Memory", ASPLOS 2011, Mar. 5-11, 2011, pp. 13, Newport Beach, California, US.
Coburn, Joel, "From Aries to Mars: Reengineering Transaction Management for Next-Generation, Solid-State Drives", University of California, downloaded Jul. 11, 2013, pp. 17, San Diego, California, US.
Application No. PCT/US2014/048129, International Preliminary Report on Patentability, dated Feb. 18, 2016.
EP Application No. 11 848 174.6 Examination Report dated Mar. 16, 2016.
U.S. Appl. No. 14/042,189, Final Office Action, dated Sep. 25, 2015.
U.S. Appl. No. 14/465,631 Office Action dated May 31, 2016.
U.S. Appl. No. 14/042,189 Office Action dated Jun. 30, 2016.
Korean Patent Application No. 10-2012-7009151 Notice of Allowance dated Sep. 21, 2016.
U.S. Appl. No. 14/465,631 Final Office Action dated Sep. 26, 2016.
U.S. Appl. No. 14/207,002 Non-Final Rejection dated Aug. 2, 2016.
Korean Patent Application No. 10-2012-7009151 Preliminary Rejection, dated Apr. 21, 2016.
U.S. Appl. No. 14/042,189 Final Rejection dated Dec. 1, 2016.
U.S. Appl. No. 14/465,631 Non-Final Rejection dated Feb. 7, 2017.
U.S. Appl. No. 14/207,002, Final Office Action, dated May 5, 2017.
U.S. Appl. No. 14/042,189, Notice of Allowance, dated May 30, 2017.
U.S. Appl. No. 14/465,631, Notice of Allowance, dated May 17, 2017.
CN Application No. 201480055747.5 Office Action dated Dec. 15, 2017.
U.S. Appl. No. 14/207,002 Advisory Action dated Sep. 8, 2017.
U.S. Appl. No. 14/207,002 Office Action dated Jan. 3, 2018.
CN Application No. 201480055747.5 Notice of Allowance dated Jul. 11, 2018.
U.S. Appl. No. 14/207,002 Final Office Action dated Aug. 8, 2018.
U.S. Appl. No. 14/207,002 Advisory Action dated Dec. 12, 2018.
U.S. Appl. No. 14/207,002 Office Action dated Jun. 14, 2019.
U.S. Appl. No. 14/207,002, Final Office Action, dated Dec. 31, 2019.

\* cited by examiner

PERSISTENT MEMORY MANAGEMENT

CROSS-REFERENCES TO RELATED APPLICATIONS

This application claims the benefit of U.S. Provisional Patent Application No. 61/864,514 entitled "PERSISTENT DATA STRUCTURES" and filed on Aug. 9, 2013 for Nisha Talagala, et al., of U.S. Provisional Patent Application No. 61/878,031 entitled "PERSISTENT MEMORY MANAGEMENT" and filed on Sep. 15, 2013 for Nisha Talagala, et al., is a continuation-in-part of U.S. patent application Ser. No. 13/836,826 entitled "APPARATUS, SYSTEM, AND METHOD FOR ACCESSING AUTO-COMMIT MEMORY" and filed on Mar. 15, 2013 for Nisha Talagala, et al., is a continuation-in-part of U.S. patent application Ser. No. 13/838,070 entitled "APPARATUS, SYSTEM, AND METHOD FOR AUTO-COMMIT MEMORY MANAGEMENT" and filed on Mar. 15, 2013 for Nisha Talagala, et al., and is a continuation-in-part of U.S. patent application Ser. No. 13/694,000 entitled "APPARATUS, SYSTEM, AND METHOD FOR AUTO-COMMIT MEMORY MANAGEMENT" and filed on Dec. 4, 2012 for Nisha Talagala, et al., which claims the benefit of U.S. Provisional Patent Application No. 61/583,133 entitled "APPARATUS, SYSTEM, AND METHOD FOR AUTO-COMMIT MEMORY" and filed on Jan. 4, 2012 for David Flynn, et al., of U.S. Provisional Patent Application No. 61/637,257 entitled "APPARATUS, SYSTEM, AND METHOD FOR AUTO-COMMIT MEMORY" and filed on Apr. 23, 2012 for David Flynn, et al., of U.S. Provisional Patent Application No. 61/661,742 entitled "APPARATUS, SYSTEM, AND METHOD FOR AUTO-COMMIT MEMORY" and filed on Jun. 19, 2012 for Nisha Talagala, et al., of U.S. Provisional Patent Application No. 61/691,221 entitled "APPARATUS, SYSTEM, AND METHOD FOR AUTO-COMMIT MEMORY" and filed on Aug. 20, 2012 for Nisha Talagala, et al., of U.S. Provisional Patent Application No. 61/705,058 entitled "APPARATUS, SYSTEM, AND METHOD FOR SNAPSHOTS IN A STORAGE DEVICE" and filed on Sep. 24, 2012 for Nisha Talagala, et al., and is a continuation-in-part of U.S. patent application Ser. No. 13/324,942 entitled "APPARATUS, SYSTEM, AND METHOD FOR AUTO-COMMIT MEMORY" and filed on Dec. 13, 2011 for David Flynn, et al., which claims the benefit of U.S. Provisional Patent Application No. 61/422,635 entitled "APPARATUS, SYSTEM, AND METHOD FOR AUTO-COMMIT MEMORY" and filed on Dec. 13, 2010 for David Flynn, et al., each of which are incorporated herein by reference.

TECHNICAL FIELD

This disclosure relates to providing persistence for data stored in a volatile memory and more particularly to managing a persistent memory.

BACKGROUND

Data structures are often used by applications to organize and track data as the applications execute. The data structures are usually volatile and are simply re-declared each time an application runs. Because of their traditionally volatile nature, little care is taken to ensure that data structures are protected and not inadvertently overwritten.

For example, an erroneous write using the wrong pointer may overwrite a data structure or portion of a data structure in volatile memory. However, because the data structure is volatile anyway, an application may do little or nothing to protect integrity of the data structure.

Additionally, applications may benefit from the data of a data structure during a subsequent execution. If a volatile data structure is lost, especially due to a power failure or improper shutdown, the execution state or other data of an application may also be lost.

Further, processor caches are designed to cache data primarily for volatile memory, using a volatile memory namespace. Because the data and the namespace are not generally persistent, processor caches typically destage or flush data to the underlying memory lazily, at an arbitrary time and in an arbitrary order.

In these weakly ordered systems, data can trickle down from a processor cache to the underlying memory with no guarantee of operation order. Without strict ordering of data in operation order, it can be difficult for a memory mapped device to provide data persistence, especially if a host device experiences a power failure or other restart event.

To prevent such situations, a client may use backups of data to prevent data loss, to rollback failed data transactions, to access data from multiple locations, or the like. Creating a backup of data can be a time and resource intensive process, as large portions of data are copied for the backup. A backup process can prevent or slow other access to the data while the backup is being made.

Additionally, backups of data are often made at busy, high-use times. For example, prior to a large transaction on data, a storage client may first create a backup of the data in case the transaction fails. Performing backups of data during busy, high-use times may magnify the negative effects the backup process has on other access to the data.

SUMMARY

Apparatuses, systems, methods, and computer program products for persistent memory management are presented. Various embodiments of a method are presented. In certain embodiments, the method includes writing data for a first end of a data structure to a volatile memory module. A volatile memory module, in one embodiment, is configured to ensure that data is preserved in a non-volatile memory medium in response to a trigger. The method, in certain embodiments, includes storing at least a portion of a data structure in a non-volatile memory medium. In a further embodiment, the method includes loading data of a second end of a data structure from a non-volatile memory medium into volatile memory for access by a client.

Various embodiments of an apparatus are presented. In one embodiment, a persistent data structure module is configured to store at least a portion of a data structure in a first volatile memory buffer within an isolation zone of a first non-volatile storage device. A replication module, in certain embodiments, is configured to copy data of a data structure to a second volatile memory buffer within an isolation zone of a second non-volatile storage device so that both first and second non-volatile storage devices ensure persistence of the data structure.

Other embodiments of an apparatus are presented. In one embodiment, a hardware controller for a volatile memory associated with a non-volatile storage medium includes a barrier completion module and a checkpoint module. A barrier completion module, in certain embodiments, is configured to determine completion of a barrier operation for a first page of a volatile memory. In a further embodiment, a checkpoint module is configured to preserve a snapshot copy of data of a first page in response to a barrier completion module determining completion of a barrier operation.

Further embodiments of an apparatus are presented. In one embodiment, an interface module is configured to determine which of a memory interface and a peripheral interface is to be used to flush data from a processor complex. A memory flush module, in certain embodiments, is configured to issue a memory serializing instruction that flushes data from a processor complex using a memory interface in response to an interface module determining that the memory interface is to be used to flush the data. In a further embodiment, a peripheral flush module is configured to issue a peripheral serializing instruction that flushes data from a processor complex using a peripheral interface in response to an interface module determining that the peripheral interface is to be used to flush the data.

BRIEF DESCRIPTION OF THE DRAWINGS

In order that the advantages of this disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
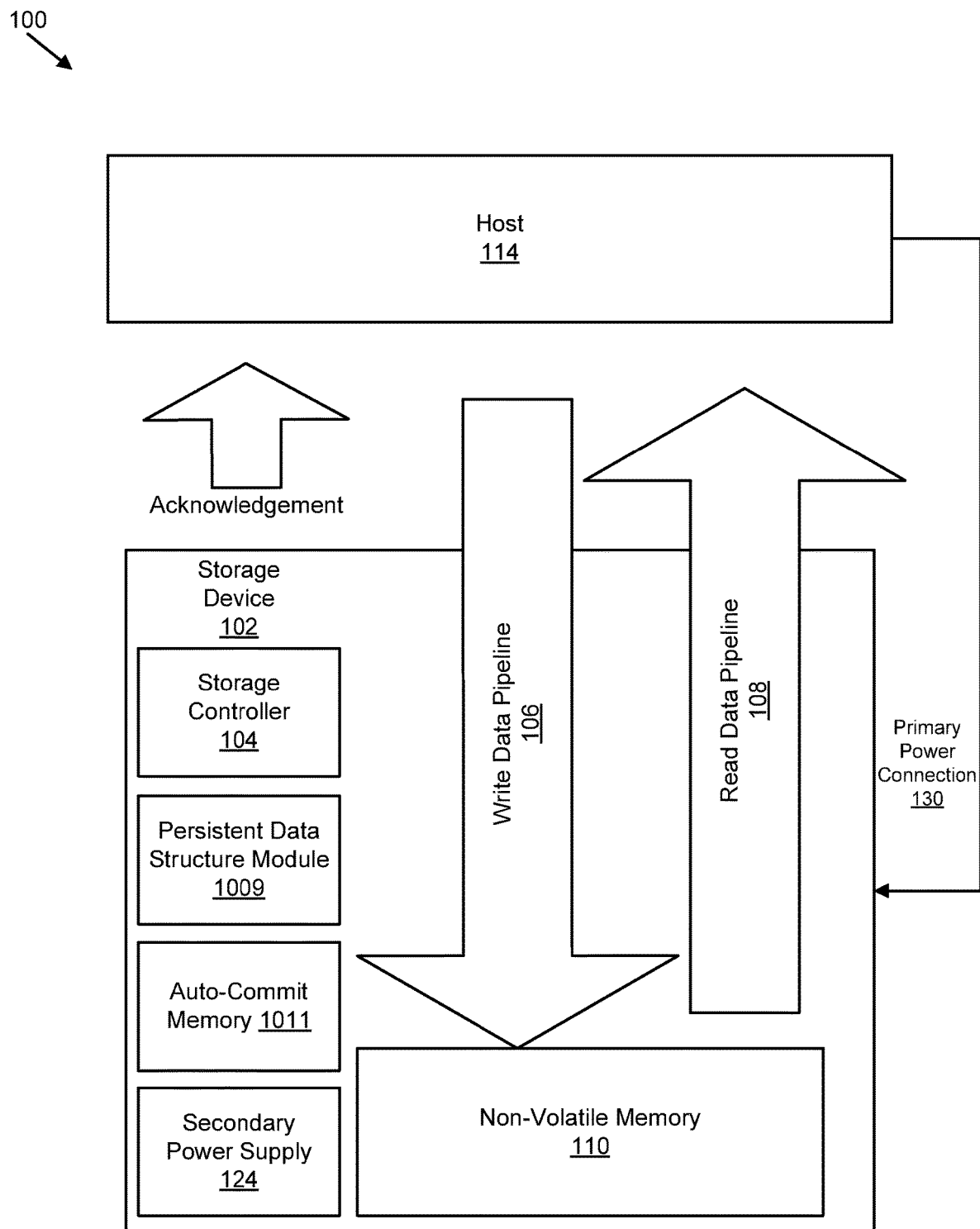
FIG. 1 is a schematic block diagram illustrating one embodiment of a system for persistent memory management.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure. These features and advantages of the present invention will become more fully apparent from the following description and appended claims, or may be learned by the practice of the disclosure as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for preserving a data structure. In certain embodiments, the system 100 preserves data and/or provides power management even in the event of a power failure, power reduction, or other power loss. In the depicted embodiment, the system 100 includes a host computing device 114 and a storage device 102. The host 114 may be a computer such as a server, laptop, desktop, or other computing device. The host 114 may include components such as memory, processors, buses, and other components.

The host 114 stores data in the storage device 102 and communicates data with the storage device 102 via a communications connection (not shown). The storage device 102 may be internal to the host 114 or external to the host 114. The communications connection may be a bus, a network, or other manner of connection allowing the transfer of data between the host 114 and the storage device 102. In one embodiment, the storage device 102 is connected to the host 114 by a PCI connection such as PCI express (PCI-e). The storage device 102 may be a card that plugs into a PCI-e connection on the host 114.

The storage device 102 also has a primary power connection 130 that connects the storage device 102 with a primary power source that provides the storage device 102 with the power that it needs to perform data storage operations such as reads, writes, erases, or the like. The storage device 102, under normal operating conditions, receives the necessary power from the primary power source over the primary power connection 130. In certain embodiments, such as the embodiment shown in FIG. 1, the primary power connection 130 connects the storage device 102 to the host 114, and the host 114 acts as the primary power source that supplies the storage device 102 with power. In certain embodiments, the primary power connection 130 and the communications connection discussed above are part of the same physical connection between the host 114 and the storage device 102. For example, the storage device 102 may receive power over a PCI connection.

In other embodiments, the storage device 102 may connect to an external power supply via the primary power connection 130. For example, the primary power connection 130 may connect the storage device 102 with a primary power source that is a power converter (often called a power brick). Those in the art will appreciate that there are various ways by which a storage device 102 may receive power, and the variety of devices that can act as the primary power source for the storage device 102.

The storage device 102 provides non-volatile storage, memory, and/or recording media 110 for the host 114. FIG. 1 depicts the storage device 102 comprising a write data pipeline 106, a read data pipeline 108, non-volatile memory 110, a storage controller 104, a persistent data structure module 1009, an auto-commit memory 1011, and a secondary power supply 124. The storage device 102 may contain additional components that are not shown in order to provide a simpler view of the storage device 102. Further, while the depicted components are part of the storage device 102, in other embodiments, at least a portion of one or more of the storage controller 104, the persistent data structure module 1009, the auto-commit memory 1011, or the like may be located on the host 114, as computer executable code, a device driver, an operating system, or the like.

The non-volatile memory 110 stores data such that the data is retained even when the storage device 102 is not powered. Examples of non-volatile memory 110 include flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magneto-resistive RAM (MRAM), dynamic RAM (DRAM), phase change RAM (PCM or PRAM), or other non-volatile solid-state storage media. In other embodiments, the non-volatile memory 110 may comprise magnetic media, optical media, or other types of non-volatile storage media. For example, in those embodiments, the non-volatile storage device 102 may comprise a hard disk drive, an optical storage drive, or the like.

While the non-volatile memory 110 is referred to herein as "memory media," in various embodiments, the non-volatile memory 110 may more generally comprise a nonvolatile recording media capable of recording data, the non-volatile recording media may be referred to as a non-volatile memory media, a non-volatile storage media, or the like. Further, the non-volatile storage device 102, in various embodiments, may comprise a non-volatile recording device, a non-volatile memory device, a non-volatile storage device, or the like.

The storage device 102 also includes a storage controller 104 that coordinates the storage and retrieval of data in the non-volatile memory 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below with regard to FIG. 3. The write data pipeline 106 may perform certain operations on data as the data is transferred from the host 114 into the non-volatile memory 110. These operations may include, for example, error correction code (ECC) generation, encryption, compression, and others. The read data pipeline 108 may perform similar and potentially inverse operations on data that is being read out of non-volatile memory 110 and sent to the host 114.

The storage device 102 also includes a secondary power supply 124 that provides power in the event of a complete or partial power disruption resulting in the storage device 102 not receiving enough electrical power over the primary power connection 130. A power disruption is any event that unexpectedly causes the storage device 102 to stop receiving power over the primary power connection 130, or causes a significant reduction in the power received by the storage device 102 over the primary power connection 130. A significant reduction in power, in one embodiment, includes the power falling below a predefined threshold. The predefined threshold, in a further embodiment, is selected to allow for normal fluctuations in the level of power from the primary power connection 130. For example, the power to a building where the host 114 and the storage device 102 may go out. A user action (such as improperly shutting down the host 114 providing power to the storage device 102), a failure in the primary power connection 130, or a failure in the primary power supply may cause the storage device 102 to stop receiving power. Numerous, varied power disruptions may cause unexpected power loss for the storage device 102.

The secondary power supply 124 may include one or more batteries, one or more capacitors, a bank of capacitors, a separate connection to a power supply, or the like. In one embodiment, the secondary power supply 124 provides power to the storage device 102 for at least a power hold-up time during a power disruption or other reduction in power from the primary power connection 130. The secondary power supply 124, in a further embodiment, provides a power hold-up time long enough to enable the storage device 102 to flush data that is not in non-volatile memory 110 into the non-volatile memory 110. As a result, the storage device 102 can preserve the data that is not permanently stored in the storage device 102 before the lack of power causes the storage device 102 to stop functioning. In certain implementations, the secondary power supply 124 may comprise the smallest capacitors possible that are capable of providing a predefined power hold-up time to preserve space, reduce cost, and simplify the storage device 102. In one embodiment, one or more banks of capacitors are used to implement the secondary power supply 124 as capacitors are generally more reliable, require less maintenance, and have a longer life than other options for providing secondary power.

In one embodiment, the secondary power supply 124 is part of an electrical circuit that automatically provides power to the storage device 102 upon a partial or complete loss of power from the primary power connection 130. Similarly, the system 100 may be configured to automatically accept or receive electric power from the secondary power supply 124 during a partial or complete power loss. For example, in one embodiment, the secondary power supply 124 may be electrically coupled to the storage device 102 in parallel with the primary power connection 130, so that the primary power connection 130 charges the secondary power supply 124 during normal operation and the secondary power supply 124 automatically provides power to the storage device 102 in response to a power loss. In one embodiment, the system 100 further includes a diode or other reverse current protection between the secondary power supply 124 and the primary power connection 130, to prevent current from the secondary power supply 124 from reaching the primary power connection 130. In another embodiment, the auto-commit memory 1011 may enable or connect the secondary power supply 124 to the storage device 102 using a switch or the like in response to reduced power from the primary power connection 130.

An example of data that is not yet in the non-volatile memory 110 may include data that may be held in volatile memory as the data moves through the write data pipeline 106. If data in the write data pipeline 106 is lost during a power outage (i.e., not written to non-volatile memory 110 or otherwise permanently stored), corruption and data loss may result.

In certain embodiments, the storage device 102 sends an acknowledgement to the host 114 at some point after the storage device 102 receives data to be stored in the non-volatile memory 110. The write data pipeline 106, or a sub-component thereof, may generate the acknowledgement. It is advantageous for the storage device 102 to send the acknowledgement as soon as possible after receiving the data.

In certain embodiments, the write data pipeline 106 sends the acknowledgement before data is actually stored in the non-volatile memory 110. For example, the write data pipeline 106 may send the acknowledgement while the data is still in transit through the write data pipeline 106 to the non-volatile memory 110. In such embodiments, it is highly desirable that the storage device 102 flush all data for which the storage controller 104 has sent an acknowledgement to the non-volatile memory 110 before the secondary power supply 124 loses sufficient power in order to prevent data corruption and maintain the integrity of the acknowledgement sent.

In addition, in certain embodiments, some data within the write data pipeline 106 may be corrupted as a result of the power disruption. A power disruption may include a power failure as well as unexpected changes in power levels supplied. The unexpected changes in power levels may place data that is in the storage device 102, but not yet in non-volatile memory 110, at risk. Data corruption may begin to occur before the auto-commit memory 1011 is even aware (or notified) that there has been a disruption in power.

For example, the PCI-e specification indicates that, in the event that a power disruption is signaled, data should be assumed corrupted and not stored in certain circumstances. Similar potential corruption may occur for storage devices 102 connected to hosts 114 using other connection types, such as PCI, serial advanced technology attachment (serial ATA or SATA), parallel ATA (PATA), small computer system interface (SCSI), IEEE 1394 (FireWire), Fiber Channel, universal serial bus (USB), PCIe-AS, or the like. A complication may arise when a power disruption occurs (meaning that data received from that point to the present time may be presumed corrupt), a period of time passes, the disruption is sensed and signaled, and the auto-commit memory 1011 receives the signal and becomes aware of the power disruption. The lag between the power disruption occurring and the auto-commit memory 1011 discovering the power disruption can allow corrupt data to enter the write data pipeline 106. In certain embodiments, this corrupt data should be identified and not stored to the non-volatile memory 110. Alternately, this corrupt data can be stored in the non-volatile memory 110 and marked as corrupt as described below. For simplicity of description, identifying corrupt data and not storing the data to the non-volatile memory 110 will be primarily used to describe the functions and features herein. Furthermore, the host 114 should be aware that this data was not stored, or alternatively data for which integrity is a question is not acknowledged until data integrity can be verified. As a result, corrupt data should not be acknowledged.

The storage device 102 also includes the auto-commit memory 1011. In certain embodiments, the auto-commit memory 1011 is in communication with, managed by, or at least partially integrated with the storage controller 104. The auto-commit memory 1011 may, for instance, cooperate with a software driver and/or firmware for the storage device 102. In one embodiment, at least a portion of the auto-commit memory 1011 is implemented on the storage device 102, so that the auto-commit memory 1011 continues to function during a partial or complete power loss using power from the secondary power supply 124, even if the host 114 is no longer functioning.

In one embodiment, the auto-commit memory 1011 initiates a power loss mode in the storage device 102 in response to a reduction in power from the primary power connection 130. During the power loss mode, the auto-commit memory 1011, in one embodiment flushes data that is in the storage device 102 that is not yet stored in non-volatile memory 110 into the non-volatile memory 110. In particular embodiments, the auto-commit memory 1011 flushes the data that has been acknowledged and is in the storage device 102 that is not yet stored in non-volatile memory 110 into the non-volatile memory 110. In certain embodiments, described below, the auto-commit memory 1011 may adjust execution of data operations on the storage device 102 to ensure that essential operations complete before the secondary power supply 124 loses sufficient power to complete the essential operations, i.e. during the power hold-up time that the secondary power supply 124 provides.

In certain embodiments, the essential operations comprise those operations for data that has been acknowledged as having been stored, such as acknowledged write operations. In other embodiments, the essential operations comprise those operations for data that has been acknowledged as having been stored and erased. In other embodiments, the essential operations comprise those operations for data that have been acknowledged as having been stored, read, and erased. The auto-commit memory 1011 may also terminate non-essential operations to ensure that those non-essential operations do not consume power unnecessarily and/or do not block essential operations from executing; for example, the auto-commit memory 1011 may terminate erase operations, read operations, unacknowledged write operations, and the like.

In one embodiment, terminating non-essential operations preserves power from the secondary power supply 124, allowing the secondary power supply 124 to provide the power hold-up time. In a further embodiment, the auto-commit memory 1011 quiesces or otherwise shuts down operation of one or more subcomponents of the storage device 102 during the power loss mode to conserve power from the secondary power supply 124. For example, in various embodiments, the auto-commit memory 1011 may quiesce operation of the read data pipeline 108, a read direct memory access (DMA) engine, and/or other subcomponents of the storage device 102 that are associated with non-essential operations.

The auto-commit memory 1011 may also be responsible for determining what data was corrupted by the power disruption, preventing the corrupt data from being stored in non-volatile memory 110, and ensuring that the host 114 is aware that the corrupted data was never actually stored on the storage device 102. This prevents corruption of data in the storage device 102 resulting from the power disruption.

In one embodiment, the system 100 includes a plurality of storage devices 102. The auto-commit memory 1011, in one embodiment, manages power loss modes for each storage device 102 in the plurality of storage devices 102, providing a system-wide power loss mode for the plurality of storage devices 102. In a further embodiment, each storage device 102 in the plurality of storage devices 102 includes a separate auto-commit memory 1011 that manages a separate power loss mode for each individual storage device 102. The auto-commit memory 1011, in one embodiment, may quiesce or otherwise shut down one or more storage devices 102 of the plurality of storage devices 102 to conserve power from the secondary power supply 124 for executing essential operations on one or more other storage devices 102.

In one embodiment, the system 100 includes one or more adapters for providing electrical connections between the host 114 and the plurality of storage devices 102. An adapter, in various embodiments, may include a slot or port that receives a single storage device 102, an expansion card or daughter card that receives two or more storage devices 102, or the like. For example, in one embodiment, the plurality of storage devices 102 may each be coupled to separate ports or slots of the host 114. In another example embodiment, one or more adapters, such as daughter cards or the like, may be electrically coupled to the host 114 (i.e. connected to one or more slots or ports of the host 114) and the one or more adapters may each provide connections for two or more storage devices 102.

In one embodiment, the system 100 includes a circuit board, such as a motherboard or the like, that receives two or more adapters, such as daughter cards or the like, and each adapter receives two or more storage devices 102. In a further embodiment, the adapters are coupled to the circuit board using PCI-e slots of the circuit board and the storage devices 102 are coupled to the adapters using PCI-e slots of the adapters. In another embodiment, the storage devices 102 each comprise a dual in-line memory module (DIMM) of non-volatile solid-state storage, such as Flash memory, or the like. In one embodiment, the circuit board, the adapters, and the storage devices 102 may be external to the host 114, and may include a separate primary power connection 130. For example, the circuit board, the adapters, and the storage devices 102 may be housed in an external enclosure with a power supply unit (PSU) and may be in communication with the host 114 using an external bus such as eSATA, eSATAp, SCSI, FireWire, Fiber Channel, USB, PCIe-AS, or the like. In another embodiment, the circuit board may be a motherboard of the host 114, and the adapters and the storage devices 102 may be internal storage of the host 114.

In view of this disclosure, one of skill in the art will recognize many configurations of adapters and storage devices 102 for use in the system 100. For example, each adapter may receive two storage devices 102, four storage devices 102, or any number of storage devices. Similarly, the system 100 may include one adapter, two adapters, three adapters, four adapters, or any supported number of adapters. In one example embodiment, the system 100 includes two adapters and each adapter receives four storage devices 102, for a total of eight storage devices 102.

In one embodiment, the secondary power supply 124 provides electric power to each of a plurality of storage devices 102. For example, the secondary power supply 124 may be disposed in a circuit on a main circuit board or motherboard and may provide power to several adapters. In a further embodiment, the system 100 includes a plurality of secondary power supplies that each provide electric power to a subset of a plurality of storage devices 102. For example, in one embodiment, each adapter may include a secondary power supply 124 for storage devices 102 of the adapter. In a further embodiment, each storage device 102 may include a secondary power supply 124 for the storage device 102. In view of this disclosure, one of skill in the art will recognize different arrangements of secondary power supplies 124 for providing power to a plurality of storage devices 102.

The systems, methods, and apparatus described above may be leveraged to implement an auto-commit memory capable of implementing memory semantic write operations (e.g., persistent writes) at CPU memory write granularity and speed. By guaranteeing that certain commit actions for the write operations will occur, even in the case of a power failure or other restart event, in certain embodiments, volatile memory such as DRAM, SRAM, BRAM, or the like, may be used as, considered, or represented as non-volatile.

The auto-commit memory described herein, may be configured to ensure or guarantee that data is preserved or persisted, even while the data is stored in a volatile auto-commit memory buffer. The volatile auto-commit memory buffers, elements, modules, or devices described herein, may be armed or associated with auto-commit metadata defining a commit action for the auto-commit memory module 1011 to perform in response to a trigger. A trigger, a commit trigger, a trigger event, a commit event, or the like for the auto-commit memory module 1011, as used herein, may comprise an occurrence, a system state, a condition, or the like, in response to which the auto-commit memory module 1011 is configured to perform one or more commit actions, such as flushing or preserving data from a volatile memory to the non-volatile memory medium 110. The auto-commit memory module 1011, in certain embodiments, may flush, stream, copy, transfer, or destage data from an auto-commit memory buffer without regard to any single specific trigger event. For example, destaging data from an auto-commit memory buffer to a non-volatile memory medium 110 is described below with regard to the destage module 1908 of FIG. 10.

In certain embodiments, a trigger for the auto-commit memory module 1011 may comprise a non-failure, non-power-loss, and/or non-restart event during routine runtime of the system 100, such as an auto-commit memory buffer becoming full, receiving a destage request, or the like. In other embodiments, a trigger may comprise a failure condition, a power-loss condition, or other restart event. A restart event, as used herein, comprises an intentional or unintentional loss of power to at least a portion of the host computing device and/or a non-volatile storage device. A restart event may comprise a system reboot, reset, or shutdown event; a power fault, power loss, or power failure event; or another interruption or reduction of power. By guaranteeing certain commit actions, the auto-commit memory may allow storage clients to resume execution states, even after a restart event, may allow the storage clients to persist different independent data sets, or the like.

As used herein, the term "memory semantic operations," or more generally, "memory operations," refers to operations having a granularity, synchronicity, and access semantics of volatile memory accesses, using manipulatable memory pointers, or the like. Memory semantic operations may include, but are not limited to: load, store, peek, poke, write, read, set, clear, and so on. Memory semantic operations may operate at a CPU-level of granularity (e.g., single bytes, words, cache lines, or the like), and may be synchronous (e.g., the CPU waits for the operation to complete). In certain embodiments, providing access at a larger sized granularity, such as cache lines, may increase access rates, provide more efficient write combining, or the like than smaller sized granularity access.

The ACM 1011 may be available to computing devices and/or applications (both local and remote) using one or more of a variety of memory mapping technologies, including, but not limited to, memory mapped I/O (MMIO), port I/O, port-mapped IO (PMIO), Memory mapped file I/O, and the like. For example, the ACM 1011 may be available to computing devices and/or applications (both local and remote) using a PCI-e Base Address Register (BAR), or other suitable mechanism. ACM 1011 may also be directly accessible via a memory bus of a CPU, using an interface such as a double data rate (DDR) memory interface, HyperTransport, QuickPath Interconnect (QPI), or the like. Accordingly, the ACM 1011 may be accessible using memory access semantics, such as CPU load/store, direct memory access (DMA), $3^{rd}$ party DMA, remote DMA (RDMA), atomic test and set, and so on. The direct, memory semantic access to the ACM 1011 disclosed herein allows many of the system and/or virtualization layer calls typically required to implement committed operations to be bypassed, (e.g., call backs via asynchronous Input/Output interfaces may be bypassed). In some embodiments, an ACM 1011 may be mapped to one or more virtual ranges (e.g., virtual BAR ranges, virtual memory addresses, or the like). The virtual mapping may allow multiple computing devices and/or applications to share a single ACM address range 1021 (e.g., access the same ACM simultaneously, within different virtual address ranges). An ACM 1011 may be mapped into an address range of a physical memory address space addressable by a CPU so that the CPU may use load/store instructions to read and write data directly to the ACM 1011 using memory semantic accesses. A CPU, in a further embodiment, may map the physically mapped ACM 1011 into a virtual memory address space, making the ACM 1011 available to user-space processes or the like as virtual memory.

The ACM 1011 may be pre-configured to commit its contents upon detection of a restart condition (or other pre-determined triggering event) and, as such, operations performed on the ACM 1011 may be viewed as being "instantly committed." For example, an application may perform a "write-commit" operation on the ACM 1011 using memory semantic writes that operate at CPU memory granularity and speed, without the need for separate corresponding "commit" commands, which may significantly increase the performance of applications affected by write-commit latencies. As used herein, a write-commit operation is an operation in which an application writes data to a memory location (e.g., using a memory semantic access), and then issues a subsequent commit command to commit the operation (e.g., to persistent storage or other commit mechanism).

Applications whose performance is based on write-commit latency, the time delay between the initial memory write and the subsequent persistent commit operation, typically attempt to reduce this latency by leveraging a virtual memory system (e.g., using a memory backed file). In this case, the application performs high-performance memory semantic write operations in system RAM, but, in order to commit the operations, must perform subsequent "commit" commands to persist each write operation to the backing file (or other persistent storage). Accordingly, each write-commit operation may comprise its own separate commit command. For example, in a database logging application, each log transaction must be written and committed before a next transaction is logged. Similarly, messaging systems (e.g., store and forward systems) must write and commit each incoming message, before receipt of the message can be acknowledged. The write-commit latency, therefore, comprises a relatively fast memory semantic write followed by a much slower operation to commit the data to persistent storage. Write-commit latency may include several factors including, access times to persistent storage, system call overhead (e.g., translations between RAM addresses, backing store LBA, etc.), and so on. Examples of applications that may benefit from reduced write-commit latency include, but are not limited to: database logging applications, file system logging, messaging applications (e.g., store and forward), semaphore primitives, and so on.

The systems, apparatus, and methods for persistent data structures using auto-commit memory disclosed herein may be used to significantly increase the performance of write-commit latency bound applications by providing direct access to a memory region at any suitable level of addressing granularity including byte level, page level, cache-line level, or other memory region level, that is guaranteed to be committed in the event of a system failure or other restart event, without the application issuing a commit command. Accordingly, the write-commit latency of an application may be reduced to the latency of a memory semantic access (a single write over a system bus).

The persistent data structure module 1009, in certain embodiments, may use or cooperate with the auto-commit memory 1011, as described herein, to provide persistent data structures to clients (e.g., an operating system, virtual operating platform, guest operating system, application, database system, process, thread, entity, utility, user, or the like) with many of the benefits and speed of volatile memory and the persistence of the non-volatile memory medium 110.

A data structure, as used herein, comprises an organized arrangement, group, or set of data. A data structure may be organized according to a predefined pattern or schema, may comprise metadata such as pointers, sequence numbers, labels, identifiers, or the like to facilitate organization of and access to the included data. Data structures may include, but are not limited to, a log (e.g., a sequential log, a transaction log, an application log), a queue (e.g., a first-in-first-out or FIFO queue, a buffer, a priority queue), a stack (e.g. a last-in-first-out or LIFO stack, a priority stack), a tree (e.g., a binary tree, B− tree, B+ tree, B* tree, ternary tree, K-ary tree, space-partitioning tree, decision tree), a linked-list (e.g., singly linked list, doubly linked list, self-organizing list, doubly connected edge list), a hash (e.g., a hash list, hash table, hash tree, hash array), an array (e.g., a table, map, bit array, bit field, bitmap, matrix, sparse array), a heap (e.g., a binary heap, binomial heap, Fibonacci heap, ternary heap, D-ary heap), a graph (e.g., directed graph, directed acyclic graph, binary decision diagram, graph-structured stack, multigraph, hypergraph, adjacency list), or the like.

One example of a data structure is a transaction log or TLOG. A transaction log (e.g., a transaction journal, a database log, a binary log, an audit trail, a sequential log, an application log), in certain embodiments, includes sequential, historical, or chronological entries, such as a history or list of updates made to a database or database table, transactions executed by a database or other application, or the like. A transaction log may include enough information regarding each transaction to either rollback or undo the transaction, or to redo or reapply the transaction. In addition to or instead of being stored sequentially or chronologically, in certain embodiments, a transaction log may include sequence information for each entry or transaction, such as a timestamp, a sequence number, a link to a previous or next entry, or the like. A transaction log may also include other types of metadata, such as a transaction identifier (e.g., a reference to a database transaction that generated the log record), a type (e.g., a label describing the type of database log record), or the like. While a persistent transaction log is primarily described herein with regard to the persistent data structure module 1009, the description is equally applicable to other types of data structures, such as the example data structures listed above.

The persistent data structure module 1009 may provide an interface, such as an application programming interface (API), shared library, hardware interface, a communications bus, one or more IO control (IOCTL) commands, or the like, over which a client may create, update, delete, or otherwise access one or more types of persistent data structures. A data structure, as used herein, is persistent if the data structure remains accessible to a client in some form after a restart event, which may be ensured or guaranteed by the auto-commit memory 1011, as described herein. The persistent data structure module 1009 may associate a persistent logical identifier with a persistent data structure, which a client may use to access the persistent data structure both before and after a restart event. For example, the persistent data structure module 1009 may cooperate with a file system module 1558 as described below with regard to FIG. 6 to provide access to a persistent data structure as a file system file with a filename, a filename and an offset, or the like. In other embodiments, a persistent logical identifier may comprise a logical unit number (LUN) identifier (ID) from a LUN namespace, a LUN ID and an offset, a logical identifier for a persistent memory namespace for the ACM 1011 as described below, a logical block address (LBA) or LBA range from a namespace of the non-volatile memory device 102, or another persistent logical identifier.

To make efficient use of the ACM 1011, which may have a smaller storage capacity than the non-volatile memory medium 110, and to provide the access speed of volatile memory and the persistence of the non-volatile memory medium 110, as a client writes data to a data structure (e.g., in the foreground) at an input rate, the persistent data structure module 1009 may cooperate with the ACM 1011 to destage, copy, transfer, migrate, and/or move data from ACM buffers of the ACM 1011 to the non-volatile memory medium 110 (e.g., in the background) at a transfer rate that matches or exceeds the input rate over time, so that the data does not overrun the one or more ACM buffers allocated to the data structure. The persistent data structure module 1009, in one embodiment, may block, delay, throttle, govern, or otherwise limit the input rate at which a client writes data to a data structure. In this manner, the persistent data structure module 1009 may mask or hide the ACM 1011 and/or non-volatile memory medium 110 from a client such that the client perceives the access speed and benefits of the ACM 1011 and the persistence of the non-volatile memory medium 110, without being aware of the complexities of the tiered architecture that the persistent data structure module 1009 uses to provide these benefits.

The persistent data structure module 1009, in certain embodiments, may enforce one or more rules for a data structure. For example, each different type of data structure may be defined or structured by a set of one or more rules, restrictions, definitions, or the like. The rules may define one or more allowed or acceptable data operations for a data structure. For a transaction log, the rules may include that entries must be sequential, that data entries may not be overwritten or updated once written, or the like. Different types of data structures may have different rules. For example, a queue may have a strict FIFO rule, a stack may have a strict LIFO rule, a tree may have a rule defining a strict order or hierarchy for data entries or nodes, a data structure may have a rule requiring certain data types or required fields or entries, or the like. In certain embodiments, by providing an interface that enforces one or more rules for a data structure, the persistent data structure module 1009 may prevent an application or other client from inadvertently or accidentally overwriting or otherwise violating the integrity of a persistent data structure, ensuring that the persistent data structure satisfies the data structure's strict definition, or the like. Because the persistent data structure module 1009 provides data structures that are non-volatile or persistent, errors in data structure integrity (e.g., an overwritten data structure, an improper entry in a data structure, or the like) would otherwise persist after a restart event or reboot, and would not be cleared or reset as would errors in a volatile data structure.

The persistent data structure module 1009, in certain embodiment, may provide an interface or library that integrates with and/or provides an operating system, a file system, one or more applications or other clients, or the like access to the hardware capabilities of the ACM 1011 and/or the non-volatile memory medium 110 in a substantially transparent manner, thereby providing persistent data structures accessible via a library, a filename or other persistent logical identifier, or the like. Because the persistent data structure module 1009 manages the tiered hierarchy of the ACM 1011, the non-volatile memory medium 110 (e.g., the storage management layer described below), a file system (e.g., the file system module 1558 described below), in one embodiment, the persistent data structure module 1009 may provide the benefits of the ACM 1011 for persistent data structures, even with a small amount of volatile memory for the ACM 1011 (e.g., ACM buffers) relative to storage capacity of the non-volatile memory medium 110.

In certain embodiments, the persistent data structure module 1009 may provide substantially transparent integration of persistent data structures with a file system. For example, a client may access a persistent data structure using file system semantics, as a file with a filename, using a filename and an offset, or the like, while the persistent data structure module 1009 manages the transfer of data of the data structure between the ACM buffers (e.g., volatile memory, volatile memory buffers, volatile memory modules, volatile memory elements, volatile memory pages) of the ACM 1011 and the non-volatile memory medium 110, enforces one or more rules for the data structure (e.g., prevents a file for a data structure from being overwritten, ensures a file for a data structure is append-only, ensures entries of a file for a data structure are sequential, or the like), so that the client is spared such responsibilities. In this manner, an application or other client may receive the benefits of the persistent data structure module 1009 and/or the ACM 1011 for persistent data structures while using a standard library, file system I/O, or other interface.

Figure 2:
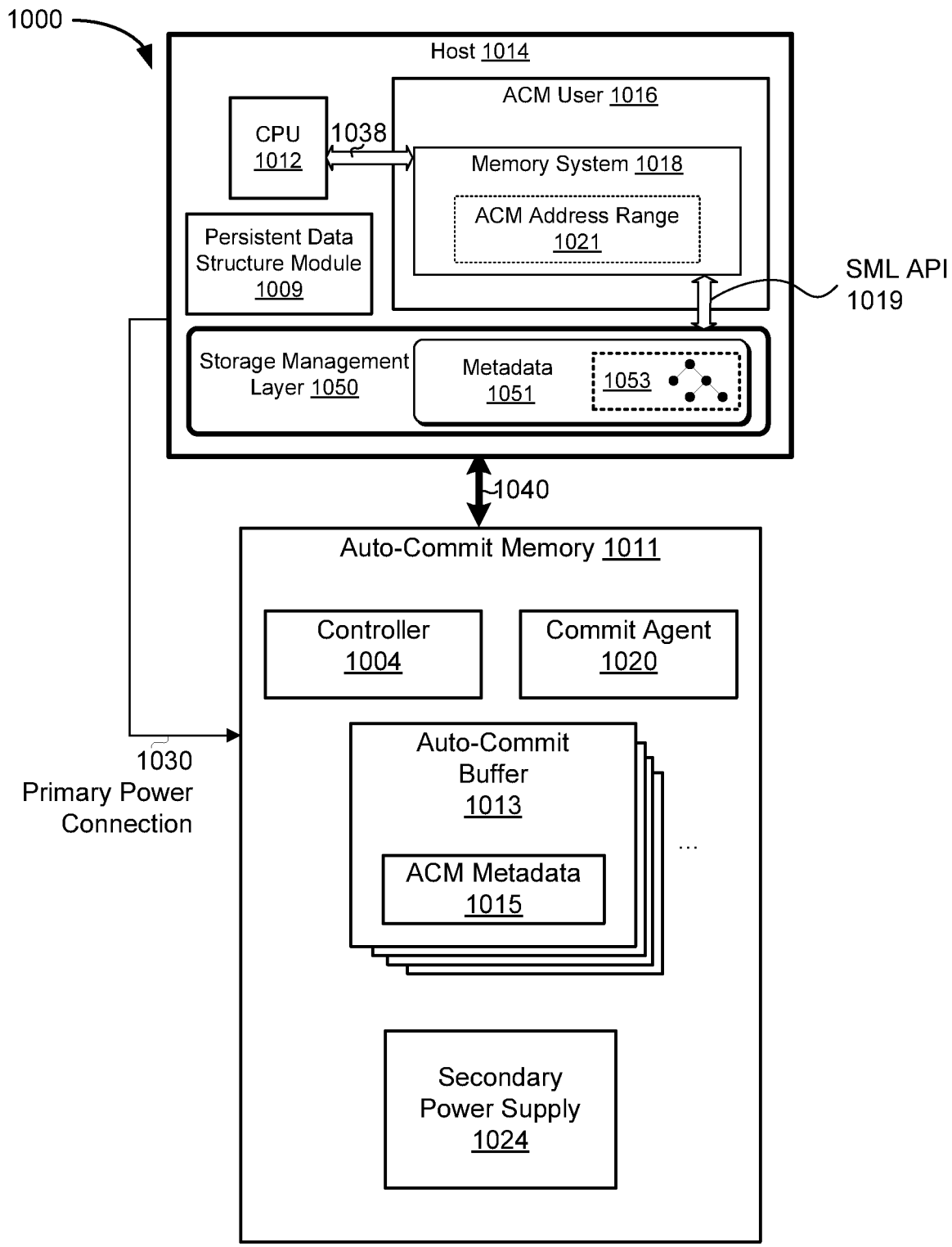
FIG. 2 is a block diagram illustrating another embodiment of a system for persistent memory management.

FIG. 2 is a block diagram of a system 1000 comprising one embodiment of a persistent data structure module 1009 and an auto-commit memory (ACM) 1011. As used herein, an auto-commit memory comprises low-latency, high reliability memory media, exposed to the persistent data structure module 1009 and/or other ACM users for direct memory semantic access, at a memory semantic access and address granularity level of at least byte level, combined with logic and components together configured to restore the same state of data stored in the ACM 1011 that existed prior to the restart event and the same level of memory semantic access to data stored in the auto-commit memory after a restart event. In certain embodiments, the ACM 1011 guarantees that data stored in the ACM 1011 will be accessible after a restart event. The ACM 1011, in one embodiment, comprises a volatile memory media coupled to a controller, logic, and other components that commit data to a non-volatile storage medium when necessary or when directed by an ACM user. In a further embodiment, the ACM 1011 may include a natively non-volatile storage medium such as phase change memory (PCM or PRAM), and a triggered commit action may process data on the non-volatile storage medium in response to a restart event such that the data remains available to an owner of the data after the restart event.

Accordingly, when data is written to the ACM 1011, it may not initially be "committed" per se (is not necessarily stored on a persistent memory media and/or state); rather, a pre-configured process is setup to preserve the ACM data and its state, if a restart event occurs while the ACM data is stored in the ACM 1011. The pre-configuring of this restart survival process is referred to herein as "arming." The ACM 1011 may be capable of performing the pre-configured commit action autonomously and with a high degree of assurance, despite the system 1000 experiencing failure conditions or another restart event. As such, an entity that stores data on the ACM 1011 may consider the data to be "instantaneously committed" or safe from loss or corruption, at least as safe as if the data were stored in a non-volatile storage device such as a hard disk drive, tape storage media, or the like.

In embodiments where the ACM 1011 comprises a volatile memory media, the ACM 1011 may make the volatile memory media appear as a non-volatile memory, may present the volatile memory as a non-volatile medium, or the like, because the ACM 1011 preserves data, such as ACM data and/or ACM metadata 1015, across system restart events. The ACM 1011 may allow a volatile memory media to be used as a non-volatile memory media by determining that a trigger event, such as a restart or failure condition, has occurred, copying the contents of the volatile memory media to a non-volatile memory media during a hold-up time after the trigger event, and copying the contents back into the volatile memory media from the non-volatile memory media after the trigger event is over, power has been restored, the restart event has completed, or the like.

In one embodiment, the ACM 1011 is at least byte addressable. A memory media of the ACM 1011, in certain embodiments, may be natively byte addressable, directly providing the ACM 1011 with byte addressability. In another embodiment, a memory media of the ACM 1011 is not natively byte addressable, but a volatile memory media of the ACM 1011 is natively byte addressable, and the ACM 1011 writes or commits the contents of the byte addressable volatile memory media to the non-byte addressable memory media of the ACM 1011 in response to a trigger event, so that the volatile memory media renders the ACM 1011 byte addressable.

The ACM 1011 may be accessible to one or more computing devices, such as the host 1014. As used herein a computing device (such as the host 1014) refers to a computing device capable of accessing an ACM. The host 1014 may be a computing device that houses the ACM 1011 as a peripheral; the ACM 1011 may be attached to a system bus 1040 of the host 1014; the ACM 1011 may be in communication with the host 1014 over a data network; and/or the ACM 1011 may otherwise be in communication with the host 1014. The host 1014, in certain embodiments, may access the ACM 1011 hosted by another computing device. The access may be implemented using any suitable communication mechanism, including, but not limited to: CPU programmed IO (CPIO), port-mapped IO (PMIO), memory-mapped IO (MMIO), a Block interface, a PCI-e bus, Infiniband, RDMA, or the like. The host 1014 may comprise one or more ACM users 1016. As used herein, an ACM user 1016 refers to any operating system (OS), virtual operating platform (e.g., an OS with a hypervisor), a guest OS, application, process, thread, entity, utility, user, or the like, that is configured to access the ACM 1011.

The ACM 1011 may be physically located at one or more levels of the host 1014. In one embodiment, the ACM 1011 may be connected to a PCI-e bus and may be accessible to the host 1014 with MMIO. In another embodiment, the ACM 1011 may be directly accessible to a CPU of the host 1014 via a memory controller. For example, the ACM 1011 may be directly attached to and/or directly (e.g., Quick Path Interconnect (QPI)) in communication with a CPU of the host 1014 or the like. Volatile media of the ACM 1011 and non-volatile backing media of the ACM 1011, in certain embodiments, may not be physically co-located within the same apparatus, but may be in communication over a communications bus, a data network, or the like. In other embodiments, as described below, hardware components of the ACM 1011 may be tightly coupled, and integrated in a single physical hardware apparatus. Volatile memory media and/or non-volatile memory media of the ACM 1011, in one embodiment, may be integrated with, or may otherwise cooperate with, a CPU cache hierarchy of the host 1014, to take advantage of CPU caching technologies such as write combining or the like.

One or more ACM buffers 1013, in certain embodiments, may be mapped into an address range of a physical memory address space addressable by a CPU, a kernel, or the like of the host device 1014, such as the memory system 1018 described below. For example, one or more ACM buffers 1013 may be mapped as directly attached physical memory, as MMIO addressable physical memory over a PCI-e bus, or otherwise mapped as one or more pages of physical memory. At least a portion of the physically mapped ACM buffers 1013, in a further embodiment, may be mapped into a virtual memory address space, accessible to user-space processes or the like as virtual memory.

Allowing ACM users 1016 to directly address the ACM buffers 1013, in certain embodiments, bypasses one or more layers of the traditional operating system memory stack of the host device 1014, providing direct load/store operation access to kernel-space and/or user-space applications. An operating system, using a kernel module, an application programming interface, the storage management layer (SML) 1050 described below, or the like, in one embodiment, maps and unmaps ACM buffers 1013 to and from the memory system 1018 for one or more ACM users 1016, and the ACM users 1016 may directly access an ACM buffer 1013 once the operating system maps the ACM buffer 1013 into the memory system 1018. In a further embodiment, the operating system may also service system flush calls for the ACM buffers 1013, or the like.

The storage management module 1050 and/or the SML API 1019 described below, in certain embodiments, provide an interface for ACM users 1016, an operating system, and/or other entities to request certain ACM functions, such as a map function, an unmap function, a flush function, and/or other ACM functions. To perform a flush operation in response to a flush request, the ACM 1011 may perform a commit action for each ACM buffer 1013 associated with the flush request. Each ACM buffer 1013 is committed as indicated by the ACM metadata 1015 of the associated ACM buffer 1013. A flush function, in various embodiments, may be specific to one or more ACM buffers 1013, system-wide for all ACM buffers 1013, or the like. In one embodiment, a CPU, an operating system, or the like for the host 1014 may request an ACM flush operation in response to, or as part of a CPU cache flush, a system-wide data flush for the host 1014, or another general flush operation.

An ACM user 1016, an operating system, or the like may request a flush operation to maintain data consistency prior to performing a maintenance operation, such as a data snapshot or a backup, to commit ACM data prior to reallocating an ACM buffer 1013, to prepare for a scheduled restart event, or for other circumstances where flushing data from an ACM buffer 1013 may be beneficial. An ACM user 1016, an operating system, or the like, in certain embodiments, may request that the ACM 1011 map and/or unmap one or more ACM buffers 1013 to perform memory management for the ACM buffers 1013; to reallocate the ACM buffers 1013 between applications or processes; to allocate ACM buffers 1013 for new data, applications, or processes; to transfer use of the ACM buffers 1013 to a different host 1014 (in shared ACM 1011 embodiments); or to otherwise manipulate the memory mapping of the ACM buffers 1013. In another embodiment, the storage management module 1050 may dynamically allocate, map, and/or unmap ACM buffers 1013 using a resource management agent as described below.

Since the ACM 1011 is guaranteed to auto-commit the data stored thereon in the event of a trigger event, the host 1014 (or ACM user 1016) may view data written to the ACM 1011 as being instantaneously "committed" or non-volatile, as the host 1014 or ACM user 1016 may access the data both before and after the trigger event. Advantageously, while the restart event may cause the ACM user 1016 to be re-started or re-initialized the data stored in the ACM 1011 is in the same state/condition after the restart event as it was before the restart event. The host 1014 may, therefore, write to the ACM 1011 using memory write semantics (and at CPU speeds and granularity), without the need for explicit commit commands by relying on the pre-configured trigger of the ACM 1011 to commit the data in the event of a restart (or other trigger event).

The ACM 1011 may comprise a plurality of auto-commit buffers 1013, each comprising respective ACM metadata 1015. As discussed below, the ACM metadata 1015 may include data to facilitate committing of ACM data in response to a triggering event for the auto-commit buffer 1013, such as a logical identifier for data in the ACM buffer 1013, an identifier of a commit agent 1020, instructions for a commit process or other processing procedure, security data, or the like. The auto-commit buffers 1013 may be of any suitable size, from a single sector, page, byte, or the like, to a virtual or logical page size (e.g., 80 to 400 kb). The size of the auto-commit buffers 1013 may be adapted according to the storage capacity of the underlying non-volatile storage media 110, 1110, 1510, and or hold-up time available from the secondary power supply 1024.

As described above, in various embodiments, the ACM buffers 1013 may comprise volatile memory backed by the non-volatile memory media 110, 1110, 1510 or may comprise natively non-volatile memory media. Volatile memory, volatile memory buffers, volatile memory modules, volatile memory elements, or the like, as used herein, may refer to just the volatile memory media of the ACM buffers 1013 (e.g., chips, dies, DIMMs, or the like of volatile memory) or to the ACM 1011 as a whole, including one or more of the ACM buffers 1013, the storage controller 104, 1004, 1104 or other logic, and/or the secondary power supply 124, 1024, 1324. The ACM buffer 1013 may comprise independent memory media (e.g., chips, dies, DIMMs, or the like of volatile memory) or may be integrated with the storage controller 104, 1004, 1104. For example, in embodiments where the storage controller 104, 1004, 1104 comprises a field programmable gate array (FPGA) or other programmable logic, one or more of the ACM buffers 1013 may comprise dedicated RAM or other volatile memory of the programmable logic, may comprise logic gates of the programmable logic configured as volatile memory, or the like.

In one embodiment, the ACM 1011 may advertise or present to the host 1014, to ACM users 1016, or the like, a storage capacity of the ACM buffers 1013 that is larger than an actual storage capacity of memory of the ACM buffers 1013. To provide the larger storage capacity, the ACM 1011 may dynamically map and unmap ACM buffers 1013 to the memory system 1018 and to the non-volatile backing memory of the ACM 1011, such as the non-volatile memory 110 described above. For example, the ACM 1011 may provide virtual address ranges for the ACM buffers 1013, and demand page data and/or ACM buffers 1013 to the non-volatile memory 110 as ACM buffer 1013 accesses necessitate. In another embodiment, for ACM buffers 1013 that are armed to commit to one or more predefined LBAs of the non-volatile memory 110, the ACM 1011 may dynamically move the ACM data and ACM metadata 1015 from the ACM buffers 1013 to the associated LBAs of the non-volatile memory 110, freeing storage capacity of the ACM buffers 1013 to provide a larger storage capacity. The ACM 1011 may further return the ACM data and ACM metadata 1015 back to one or more ACM buffers 1013 as ACM buffers become available, certain addresses outside the data of currently loaded ACM buffers 1013 is requested, or the like, managing storage capacity of the ACM buffers 1013.

The ACM 1011 is pre-configured or "armed" to implement one or more "triggered commit actions" in response to a restart condition (or other, pre-determined condition). As used herein, a restart condition or event may include, but is not limited to a software or hardware shutdown/restart of a host 1014, a failure in a host 1014 computing device, a failure of a component of the host 1014 (e.g., failure of the bus 1040), a software fault (e.g., an fault in software running on the host 1014 or other computing device), a loss of the primary power connection 1030, an invalid shutdown, or another event that may cause the loss of data stored in a volatile memory.

In one embodiment, a restart event comprises the act of the host 1014 commencing processing after an event that can cause the loss of data stored within a volatile memory of the host 1014 or a component in the host 1014. The host 1014 may commence/resume processing once the restart condition or event has finished, a primary power source is available, and the like.

The ACM 1011 is configured to detect that a restart event/condition has occurred and/or respond to a restart event by initiating a recovery stage. During a recovery stage, the ACM 1011 may restore the data of the ACM 1011 to the state prior to the restart event. Alternatively, or in addition, during the recovery stage, the ACM 1011 may complete processing of ACM data or ACM metadata 1015 needed to satisfy a guarantee that data in the ACM 1011 is available to ACM users after the restart event. Alternatively, or in addition, during the recovery stage, the ACM 1011 may complete processing of ACM data or ACM metadata 1015 needed to satisfy a guarantee that data in the ACM 1011 is committed after the restart event. As used herein, "commit" means data in the ACM 1011 is protected from loss or corruption even after the restart event and is persisted as required per the arming information associated with the data. In certain embodiments, the recovery stage includes processing ACM data and ACM metadata 1015 such that the ACM data is persisted, even though the restart event occurred.

As used herein, a triggered commit action is a pre-configured commit action that is armed to be performed by the ACM 1011 in response to a triggering event (e.g., a restart event, a flush command, or other pre-determined event). In certain embodiments, the triggered commit action persists at least enough ACM data and/or ACM metadata 1015 to make data of the ACM 1011 available after a system restart, to satisfy a guarantee of the ACM 1011 that the data will be accessible to an ACM user after a restart event, in certain embodiments, this guarantee is satisfied, at least in part, by committing and/or persisting data of the ACM 1011 to non-volatile memory media. A triggered commit action may be completed before, during, and/or after a restart event. For example, the ACM 1011 may write ACM data and ACM metadata 1015 to a predefined temporary location in the non-volatile memory 110 during a hold-up time after a restart event, and may copy the ACM data back into the ACM buffers 1013, to an intended location in the non-volatile memory 110, or perform other processing once the restart event is complete.

A triggered commit action may be "armed" when the ACM 1011 is requested and/or a particular ACM buffer 1013 is allocated for use by a host 1014. In some embodiments, an ACM 1011 may be configured to implement a triggered commit action in response to other, non-restart conditions. For example, an operation directed to a particular logical address (e.g., a poke), may trigger the ACM 1011, a flush operation may trigger the ACM 1011, or the like. This type of triggering may be used to commit the data of the ACM 1011 during normal operation (e.g., non-restart or non-failure conditions).

The arming may occur when an auto-commit buffer 1013 is mapped into the memory system 1018 of the host 1014. Alternatively, arming may occur as a separate operation. As used herein, arming an auto-commit buffer 1013 comprises performing the necessary configuration steps needed to complete the triggered action when the action is triggered. Arming may include, for example, providing the ACM metadata 1015 to the ACM 1011 or the like. In certain embodiments, arming further includes performing the necessary configuration steps needed to complete a minimal set of steps for the triggered action, such that the triggered action is capable of completing after a trigger event. In certain embodiments, arming further includes verifying the arming data (e.g., verifying that the contents of the auto-commit buffer 1013, or portion thereof, can be committed as specified in the ACM metadata 1015) and verifying that the ACM 1011 is capable and configured to properly perform the triggered action without error or interruption.

The verification may ensure that once armed, the ACM 1011 can implement the triggered commit action when required. If the ACM metadata 1015 cannot be verified (e.g., the logical identifier or other ACM metadata 1015 is invalid, corrupt, unavailable, or the like), the arming operation may fail; memory semantic operations on the auto-commit buffer 1013 may not be allowed unit the auto-commit buffer 1013 is successfully armed with valid ACM metadata 1015. For example, an auto-commit buffer 1013 that is backed by a hard disk having a one-to-one mapping between LBA and physical address, may fail to arm if the LBA provided for the arming operation does not map to a valid (and operational) physical address on the disk. Verification in this case may comprise querying the disk to determine whether the LBA has a valid, corresponding physical address and/or using the physical address as the ACM metadata 1015 of the auto-commit buffer 1013.

The armed triggered commit actions are implemented in response to the ACM 1011 (or other entity) detecting and/or receiving notification of a triggering event, such as a restart condition. In some embodiments, an armed commit action is a commit action that can be performed by the ACM 1011, and that requires no further communication with the host 1014 or other devices external to the "isolation zone" of the ACM 1011 (discussed below). Accordingly, the ACM 1011 may be configured to implement triggered commit actions autonomously of the host 1014 and/or other components thereof. The ACM 1011 may guarantee that triggered commit actions can be committed without errors and/or despite external error conditions. Accordingly, in some embodiments, the triggered commit actions of the ACM 1011 do not comprise and/or require potentially error-introducing logic, computations, and/or calculations. In some embodiments, a triggered commit action comprises committing data stored on the volatile ACM 1011 to a persistent storage location. In other embodiments, a triggered commit action may comprise additional processing of committed data, before, during, and/or after a triggering event, as described below. The ACM 1011 may implement pre-configured triggered commit actions autonomously; the ACM 1011 may be capable of implementing triggered commit actions despite failure or restart conditions in the host 1014, loss of primary power, or the like. The ACM 1011 can implement triggered commit actions independently due to arming the ACM 1011 as described above.

The ACM metadata 1015 for an ACM buffer 1013, in certain embodiments, identifies the data of the ACM buffer 1013. For example, the ACM metadata 1015 may identify an owner of the data, may describe the data itself, or the like.

In one embodiment, an ACM buffer 1013 may have multiple levels of ACM metadata 1015, for processing by multiple entities or the like. The ACM metadata 1015 may include multiple nested headers that may be unpackaged upon restart, and used by various entities or commit agents 1020 to determine how to process the associated ACM data to fulfill the triggered commit action as described above. For example, the ACM metadata 1015 may include block metadata, file metadata, application level metadata, process execution point or callback metadata, and/or other levels of metadata. Each level of metadata may be associated with a different commit agent 1020, or the like. In certain embodiments, the ACM metadata 1015 may include security data, such as a signature for an owner of the associated ACM data, a pre-shared key, a nonce, or the like, which the ACM 1011 may use during recovery to verify that a commit agent 1020, an ACM user 1016, or the like is authorized to access committed ACM metadata 1015 and/or associated ACM data. In this manner, the ACM 1011 may prevent ownership spoofing or other unauthorized access. In one embodiment, the ACM 1011 does not release ACM metadata 1015 and/or associated ACM data until a requesting commit agent 1020, ACM user 1016, or the like provides valid authentication, such as a matching signature or the like.

One or more commit agents 1020, such as the commit management apparatus 1122 described below with regard to FIG. 3, in certain embodiments, process ACM data based on the associated ACM metadata 1015 to execute a triggered commit action. A commit agent 1020, in various embodiments, may comprise software, such as a device driver, a kernel module, the storage management module 1050, a thread, a user space application, or the like, and/or hardware, such as the controller 1004 described below, that is configured to interpret ACM metadata 1015 and to process the associated ACM data according to the ACM metadata 1015. In embodiments with multiple commit agents 1020, the ACM metadata 1015 may identify one or more commit agents 1020 to process the associated ACM data. The ACM metadata 1015 may identify a commit agent 1020, in various embodiments, by identifying a program/function of the commit agent 1020 to invoke (e.g., a file path of the program), by including computer executable code of the commit agent 1020 (e.g., binary code or scripts), by including a unique identifier indicating which of a set of registered commit agents 1020 to use, and/or by otherwise indicating a commit agent 1020 associated with committed ACM metadata 1015. The ACM metadata 1015, in certain embodiments, may be a functor or envelope which contains the information, such as function pointer and bound parameters for a commit agent 1020, to commit the ACM data upon restart recovery.

In one embodiment, a primary commit agent 1020 processes ACM metadata 1015, and hands-off or transfers ACM metadata 1015 and/or ACM data to one or more secondary commit agents 1020 identified by the ACM metadata 1015. A primary commit agent 1020, in one embodiment, may be integrated with the ACM 1011, the controller 1004, or the like. An ACM user 1016 or other third party, in certain embodiments, may provide a secondary commit agent 1020 for ACM data that the ACM user 1016 or other third party owns, and the primary commit agent 1020 may cooperate with the provided secondary commit agent 1020 to process the ACM data. The one or more commit agents 1020 for ACM data, in one embodiment, ensure and/or guarantee that the ACM data remains accessible to an owner of the ACM data after a restart event. As described above with regard to triggered commit actions, a commit agent 1020 may process ACM metadata 1015 and associated ACM data to perform one or more triggered commit actions before, during, and/or after a trigger event, such as a failure or other restart event.

In one embodiment, a commit agent 1020, in cooperation with the ACM 1011 or the like, may store the ACM metadata 1015 in a persistent or non-volatile location in response to a restart or other trigger event. The commit agent 1020 may store the ACM metadata 1015 at a known location, may store pointers to the ACM metadata 1015 at a known location, may provide the ACM metadata 1015 to an external agent or data store, or the like so that the commit agent 1020 may process the ACM metadata 1015 and associated ACM data once the restart or other trigger event has completed. The known location may include one or more predefined logical block addresses or physical addresses of the non-volatile memory 110, a predefined file, or the like. In certain embodiments, hardware of the ACM 1011 is configured to cooperate to write the ACM metadata 1015 and/or pointers to the ACM metadata 1015 at a known location. In one embodiment, the known location may be a temporary location that stores the ACM data and ACM metadata 1015 until the host 1014 has recovered from a restart event and the commit agent 1020 may continue to process the ACM data and ACM metadata 1015. In another embodiment, the location may be a persistent location associated with the ACM metadata 1015.

In response to completion of a restart event or other trigger event, during recovery, in one embodiment, a commit agent 1020 may locate and retrieve the ACM metadata 1015 from the non-volatile memory 110, from a predefined location or the like. The commit agent 1020, in response to locating and retrieving the ACM metadata 1015, locates the ACM data associated with the retrieved ACM metadata 1015. The commit agent 1020, in certain embodiments, may locate the ACM data in a substantially similar manner as the commit agent 1020 locates the ACM metadata 1015, retrieving ACM data from a predefined location, retrieving pointers to the ACM data from a predefined location, receiving the ACM data from an external agent or data store, or the like. In one embodiment, the ACM metadata 1015 identifies the associated ACM data and the commit agent 1020 uses the ACM metadata 1015 to locate and retrieve the associated ACM data. For example, the commit agent 1020 may use a predefined mapping to associate ACM data with ACM metadata 1015 (e.g., the Nth piece of ACM data may be associated with the Nth piece of ACM metadata 1015 or the like), the ACM metadata 1015 may include a pointer or index for the associated ACM data, or another predefined relationship may exist between committed ACM metadata 1015 and associated ACM data. In another embodiment, an external agent may indicate to the commit agent 1020 where associated ACM data is located.

In response to locating and retrieving the ACM metadata 1015 and associated ACM data, the commit agent 1020 interprets the ACM metadata 1015 and processes the associated ACM data based on the ACM metadata 1015. For example, in one embodiment, the ACM metadata 1015 may identify a block storage volume and LBA(s) where the commit agent 1020 is to write the ACM data upon recovery. In another embodiment, the ACM metadata 1015 may identify an offset within a file within a file system where the commit agent 1020 is to write the ACM data upon recovery. In a further embodiment, the ACM metadata 1015 may identify an application specific persistent object where the commit agent 1020 is to place the ACM data upon recovery, such as a database record or the like. The ACM metadata 1015, in an additional embodiment, may indicate a procedure for the commit agent 1020 to call to process the ACM data, such as a delayed procedure call or the like. In an embodiment where the ACM 1011 advertises or presents volatile ACM buffers 1013 as non-volatile memory, the ACM metadata 1013 may identify an ACM buffer 1013 where the commit agent 1020 is to write the ACM data upon recovery.

In certain embodiments, the ACM metadata 1015 may identify one or more secondary commit agents 1020 to further process the ACM metadata 1015 and/or associated ACM data. A secondary commit agent 1020 may process ACM metadata 1015 and associated ACM data in a substantially similar manner to the commit agent 1020 described above. Each commit agent 1020 may process ACM data in accordance with a different level or subset of the ACM metadata 1015, or the like. The ACM metadata 1015 may identify a secondary commit agent 1020, in various embodiments, by identifying a program/function of the secondary commit agent 1020 to invoke (e.g., a file path of the program), by including computer executable code of the secondary commit agent 1020, by including a unique identifier indicating which of a set of registered secondary commit agents 1020 to use, and/or by otherwise indicating a secondary commit agent 1020 associated with committed ACM metadata 1015.

In one embodiment, a secondary commit agent 1020 processes a remaining portion of the ACM metadata 1015 and/or of the ACM data after a previous commit agent 1020 has processed the ACM metadata 1015 and/or the ACM data. In a further embodiment, the ACM metadata 1015 may identify another non-volatile medium separate from the ACM 1011 for the secondary commit agent 1020 to persist the ACM data even after a host experiences a restart event. By committing the ACM metadata 1015 and the associated ACM data from the ACM buffers 1013 in response to a trigger event, such as a failure or other restart condition, and processing the ACM metadata 1015 and the associated ACM data once the trigger event has completed or recovered, the ACM 1011 may guarantee persistence of the ACM data and/or performance of the triggered commit action(s) defined by the ACM metadata 1015.

The ACM 1011 is communicatively coupled to a host 1014, which, like the host 114 described above, may comprise operating systems, virtual machines, applications, a processor complex 1012, a central processing unit 1012 (CPU), and the like. In the FIG. 2 example, these entities are referred to generally as ACM users 1016. Accordingly, as used herein, an ACM user may refer to an operating system, a virtual machine operating system (e.g., hypervisor), an application, a library, a CPU fetch-execute algorithm, or other program or process. The ACM 1011 may be communicatively coupled to the host 1014 (as well as the ACM users 1016) via a bus 1040, such as a system bus, a processor's memory exchange bus, or the like (e.g., HyperTransport, QuickPath Interconnect (QPI), PCI bus, PCI-e bus, or the like). In some embodiments, the bus 1040 comprises the primary power connection 1030 (e.g., the non-volatile storage device 1102 may be powered through the bus 1040). Although some embodiments described herein comprise solid-state storage devices, such as certain embodiments of the non-volatile storage device 1102, the disclosure is not limited in this regard, and could be adapted to use any suitable recording/memory/storage device 1102 and/or recording/memory/storage media 1110.

The ACM 1011 may be tightly coupled to the device used to perform the triggered commit actions. For example, the ACM 1011 may be implemented on the same device, peripheral, card, or within the same "isolation zone" as the controller 1004 and/or secondary power source 1024. The tight coupling of the ACM 1011 to the components used to implement the triggered commit actions defines an "isolation zone," which may provide an acceptable level of assurance (based on industry standards or other metric) that the ACM 1011 is capable of implementing the triggered auto-commit actions in the event of a restart condition. In the FIG. 2 example, the isolation zone of the ACM 1011 is provided by the tight coupling of the ACM 1011 with the autonomous controller 1004 and secondary power supply 1024 (discussed below).

The controller 1004 may comprise an I/O controller, such as a network controller (e.g., a network interface controller), storage controller, dedicated restart condition controller, or the like. The controller 1004 may comprise firmware, hardware, a combination of firmware and hardware, or the like. In the FIG. 2 example, the controller 1004 comprises a storage controller, such as the storage controller 104 and/or non-volatile storage device controller described above. The controller 1004 may be configured to operate independently of the host 1014. As such, the controller 1004 may be used to implement the triggered commit action(s) of the ACM 1011 despite the restart conditions discussed above, such as failures in the host 1014 (and/or ACM users 1016) and/or loss of the primary power connection 1030.

The ACM 1011 is powered by a primary power connection 1030, which, like the primary power connection 130 described above, may be provided by a system bus (bus 1040), external power supply, the host 1014, or the like. In certain embodiments, the ACM 1011 also includes and/or is coupled to a secondary power source 1024. The secondary power source 1024 may power the ACM 1011 in the event of a failure to the primary power connection 1030. The secondary power source 1024 may be capable of providing at least enough power to enable the ACM 1011 and/or controller 1004 to autonomously implement at least a portion of a pre-configured triggered commit action(s) when the primary power connection 1030 has failed. The ACM 1011, in one embodiment, commits or persists at least enough data (e.g., ACM data and ACM metadata 1015) while receiving power from the secondary power source 1024, to allow access to the data once the primary power connection 1030 has been restored. In certain embodiments, as described above, the ACM 1011 may perform at least a portion of the pre-configured triggered commit action(s) after the primary power connection 1030 has been restored, using one or more commit agents 1020 or the like.

The ACM 1011 may comprise volatile memory storage. In the FIG. 2 example, the ACM 1011 includes one or more auto-commit buffers 1013. The auto-commit buffers 1013 may be implemented using a volatile Random Access Memory (RAM). In some embodiments, the auto-commit buffers 1013 may be embodied as independent components of the ACM 1011 (e.g., in separate RAM modules). Alternatively, the auto-commit buffers 1013 may be implemented on embedded volatile memory (e.g., BRAM) available within the controller 1004, a processor complex 1012, an FPGA, or other component of the ACM 1011.

Each of the auto-commit buffers 1013 may be pre-configured (armed) with a respective triggered commit action. In some embodiments, each auto-commit buffer 1013 may comprise its own, respective ACM metadata 1015. The ACM metadata 1015, in some embodiments, identifies how and/or where the data stored on the auto-commit buffer 1013 is to be committed. In some examples, the ACM metadata 1015 may comprise a logical identifier (e.g., an object identifier, logical block address (LBA), file name, or the like) associated with the data in the auto-commit buffer 1013. The logical identifier may be predefined. In one embodiment, when an auto-commit buffer 1013 is committed, the data therein may be committed with the ACM metadata 1015 (e.g., the data may be stored at a physical storage location corresponding to the logical identifier and/or in association with the logical identifier). To facilitate committing of ACM data during a hold-up time after a restart event, the ACM 1011 may write ACM data and ACM metadata 1015 in a single atomic operation, such as a single page write or the like. To permit writing of ACM and ACM metadata 1015 in a single atomic operation, the ACM buffers 1013 may be sized to correspond to a single write unit for a non-volatile storage media that is used by the ACM 1011. In some embodiments, the ACM metadata 1015 may comprise a network address, an LBA, or another identifier of a commit location for the data.

In a further embodiment, a logical identifier may associate data of an auto-commit buffer 1013 with an owner of the data, so that the data and the owner maintain the ownership relationship after a restart event. For example, the logical identifier may identify an application, an application type, a process ID, an ACM user 1016, or another entity of a host device 1014, so that the ACM data is persistently associated with the identified entity. In one embodiment, a logical identifier may be a member of an existing namespace, such as a file system namespace, a user namespace, a process namespace, or the like. In other embodiments, a logical identifier may be a member of a new or separate namespace, such as an ACM namespace. For example, a globally unique identifier namespace, as is typically used in distributed systems for identifying communicating entities, may be used as an ACM namespace for logical identifiers. The ACM 1011 may process committed ACM data according to a logical identifier for the data once a restart event has completed. For example, the ACM 1011 may commit the ACM data to a logical identifier associated with a temporary location in response to a restart event, and may write the ACM data to a persistent location identified by another logical identifier during recovery after the restart event.

As described above, the ACM 1011 may be tightly coupled with the components used to implement the triggered commit actions (e.g., the ACM 1011 is implemented within an "isolation zone"), which ensures that the data on the ACM 1011 will be committed in the event of a restart condition. As used herein, a "tight coupling" refers to a configuration wherein the components used to implement the triggered commit actions of the ACM 1011 are within the same "isolation zone," or two or more distinct trusted "isolation zones," and are configured to operate despite external failure or restart conditions, such as the loss of power, invalid shutdown, host 1014 failures, or the like. FIG. 2 illustrates a tight coupling between the ACM 1011, the auto-commit buffers 1013, the controller 1004, which is configured to operate independently of the host 1014, and the secondary power source 1024, which is configured to power the controller 1004 and the ACM 1011 (including the auto-commit buffers 1013) while the triggered commit actions are completed. Examples of a tight coupling include but are not limited to including the controller 1004, the secondary power source 1024, and the auto-commit buffers 1013 on a single printed circuit board (PCB), within a separate peripheral in electronic communication with the host 1014, and the like. In other embodiments, the ACM 1011 may be tightly coupled to other a different set of components (e.g., redundant host devices, redundant communication buses, redundant controllers, alternative power supplies, and so on).

The ACM 1011 may be accessible by the host 1014 and/or ACM users 1016 running thereon. Access to the ACM 1011 may be provided using memory access semantics, such as CPU load/store commands, DMA commands, 3rd party DMA commands, RDMA commands, atomic test and set commands, manipulatable memory pointers, and so on. In some embodiments, memory semantic access to the ACM 1011 is implemented over the bus 1040 (e.g., using a PCI-e BAR as described below).

In a memory semantic paradigm, ACM users 1016 running on the host 1014 may access the ACM 1011 via a memory system 1018 of the host 1014. The memory system 1018 may comprise a memory management unit, virtual memory system, virtual memory manager, virtual memory subsystem (or similar memory address space) implemented by an operating system, a virtualization system (e.g., hypervisor), an application, or the like. A portion of the ACM 1011 (e.g., one or more auto-commit buffers 1013) may be mapped into the memory system 1018, such that memory semantic operations implemented within the mapped memory address range (ACM address range 1021) are performed on the ACM 1011.

The storage management module 1050, in certain embodiments, allocates and/or arbitrates the storage capacity of the ACM 1011 between multiple ACM users 1016, using a resource management agent or the like. The resource management agent of the storage management module 1050 may comprise a kernel module provided to an operating system of the host device 1014, a device driver, a thread, a user space application, or the like. In one embodiment, the resource management agent determines how much storage capacity of the ACM buffers 1013 to allocate to an ACM user 1016 and how long the allocation is to last. Because, in certain embodiments, the ACM 1011 commits or persists data across restart events, the resource management agent may allocate storage capacity of ACM buffers 1013 across restart events.

The resource management agent may assign different ACM buffers 1013 to different ACM users 1016, such as different kernel and/or user space applications. The resource management agent may allocate ACM buffers 1013 to different usage types, may map ACM buffers 1013 to different non-volatile memory 110 locations for destaging, or the like. In one embodiment, the resource management agent may allocate the ACM buffers 1013 based on commit agents 1020 associated with the ACM buffers 1013 by the ACM metadata 1015 or the like. For example, a master commit agent 1020 may maintain an allocation map in ACM metadata 1015 identifying allocation information for ACM buffers 1013 of the ACM 1011 and identifying, in one embodiment, one or more secondary commit agents 1020, and the master commit agent 1020 may allocate a portion of the ACM buffers 1013 to each of the secondary commit agents 1020. In another embodiment, commit agents 1020 may register with the resource management agent, may request resources such as ACM buffers 1013 from the resource management agent, or the like. The resource management agent may use a predefined memory management policy, such as a memory pressure policy or the like, to allocate and arbitrate ACM buffer 1013 storage capacity between ACM users 1016.

In some embodiments, establishing an association between an ACM address range 1021 within the memory system 1018 and the ACM 1011 may comprise pre-configuring (arming) the corresponding auto-commit buffer(s) 1013 with a triggered commit action. As described above, this pre-configuration may comprise associating the auto-commit buffer 1013 with a logical identifier or other metadata, which may be stored in the ACM metadata 1015 of the buffer 1013. As described above, the ACM 1011 may be configured to commit the buffer data to the specified logical identifier in the event of a restart condition, or to perform other processing in accordance with the ACM metadata 1015.

Memory semantic access to the ACM 1011 may be implemented using any suitable address and/or device association mechanism. In some embodiments, memory semantic access is implemented by mapping one or more auto-commit buffers 1013 of the ACM 1011 into the memory system 1018 of the host 1014. In some embodiments, this mapping may be implemented using the bus 1040. For example, the bus 1040 may comprise a PCI-e (or similar) communication bus, and the mapping may comprise associating a Base Address Register (BAR) of an auto-commit buffer 1013 of the ACM 1011 on the bus 1040 with the ACM address range 1021 in the memory system 1018 (e.g., the host 1014 mapping a BAR into the memory system 1018).

The association may be implemented by an ACM user 1016 (e.g., by a virtual memory system of an operating system or the like), through an API of a storage layer, such as the storage management layer (SML) 1050. The storage management module 1050 may be configured to provide access to the auto-commit memory 1011 to ACM users 1016. The storage management layer 1050 may comprise a driver, kernel-level application, user-level application, library, or the like. One example of an SML is the Virtual Storage Layer® of Fusion-io, Inc. of Salt Lake City, Utah. The storage management module 1050 may provide a SML API 1019 comprising, inter alia, an API for mapping portions of the auto-commit memory 1011 into the memory system 1018 of the host 1014, for unmapping portions of the auto-commit memory 1011 from the memory system 1018 of the host 1014, for flushing the ACM buffers 1013, for accessing and managing persistent data structures using the persistent data structure module 1009, or the like. The storage management module 1050 may be configured to maintain metadata 1051, which may include a forward index 1053 comprising associations between logical identifiers of a logical address space and physical storage locations on the auto-commit memory 1011 and/or persistent storage media. In some embodiments, ACM 1011 may be associated with one or more virtual ranges that map to different address ranges of a BAR (or other addressing mechanism). The virtual ranges may be accessed (e.g., mapped) by different ACM users 1016. Mapping or exposing a PCI-e ACM BAR to the host memory 1018 may be enabled on demand by way of a SML API 1019 call.

The SML API 1019 may comprise interfaces for mapping an auto-commit buffer 1013 into the memory system 1018. In some embodiments, the SML API 1019 may extend existing memory management interfaces, such as malloc, calloc, or the like, to map auto-commit buffers 1013 into the virtual memory range of ACM user applications 1016 (e.g., a malloc call through the SML API 1019 may map one or more auto-commit buffers 1013 into the memory system 1018). Alternatively, or in addition, the SML API 1019 may comprise one or more explicit auto-commit mapping functions, such as "ACM_alloc," "ACM_free," or the like. Mapping an auto-commit buffer 1013 may further comprise configuring a memory system 1018 of the host to ensure that memory operations are implemented directly on the auto-commit buffer 1013 (e.g., prevent caching memory operations within a mapped ACM address range 1021).

The association between the ACM address range 1021 within the host memory system 1018 and the ACM 1011 may be such that memory semantic operations performed within a mapped ACM address range 1021 are implemented directly on the ACM 1011 (without intervening system RAM, or other intermediate memory, in a typical write commit operation, additional layers of system calls, or the like). For example, a memory semantic write operation implemented within the ACM address range 1021 may cause data to be written to the ACM 1011 (on one or more of the auto-commit buffers 1013). Accordingly, in some embodiments, mapping the ACM address range 1021 may comprise disabling caching of memory operations within the ACM address range 1021, such that memory operations are performed on an ACM 1011 and are not cached by the host (e.g., cached in a CPU cache, in host volatile memory, or the like). Disabling caching within the ACM address range 1021 may comprise setting a "non-cacheable" flag attribute associated with the ACM range 1021, when the ACM range 1021 is defined.

As discussed above, establishing an association between the host memory system 1018 and the ACM 1011 may comprise "arming" the ACM 1011 to implement a predetermined triggered commit action. The arming may comprise providing the ACM 1011 with a logical identifier (e.g., a logical block address, a file name, a network address, a stripe or mirroring pattern, or the like). The ACM 1011 may use the logical identifier to arm the triggered commit action. For example, the ACM 1011 may be triggered to commit data to a persistent storage medium using the logical identifier (e.g., the data may be stored at a physical address corresponding to the logical identifier and/or the logical identifier may be stored with the data in a log-based data structure). Arming the ACM 1011 allows the host 1014 to view subsequent operations performed within the ACM address range 1021 (and on the ACM 1011) as being "instantly committed," enabling memory semantic write granularity (e.g., byte level operations) and speed with instant commit semantics.

Memory semantic writes such as a "store" operation for a CPU are typically synchronous operations such that the CPU completes the operation before handling a subsequent operation. Accordingly, memory semantic write operations performed in the ACM memory range 1021 can be viewed as "instantly committed," obviating the need for a corresponding "commit" operation in the write-commit operation, which may significantly increase the performance of ACM users 1016 affected by write-commit latency. The memory semantic operations performed within the ACM memory range 1021 may be synchronous. Accordingly, ACM 1011 may be configured to prevent the memory semantic operations from blocking (e.g., waiting for an acknowledgement from other layers, such as the bus 1040, or the like). Moreover, the association between ACM address range 1021 and the ACM 1011 allow memory semantic operations to bypass system calls (e.g., separate write and commit commands and their corresponding system calls) that are typically included in write-commit operations.

Data transfer between the host 1014 and the ACM 1011 may be implemented using any suitable data transfer mechanism including, but not limited to: the host 1014 performing processor JO operations (PIO) with the ACM 1011 via the bus 1040; the ACM 1011 (or other device) providing one or more DMA engines or agents (data movers) to transfer data between the host 1014 and the ACM 1011; the host 1014 performing processor cache write/flush operations; or the like.

As discussed above, an ACM may be configured to automatically perform a pre-configured triggered commit action in response to detecting certain conditions (e.g., restart or failure conditions). In some embodiments, the triggered commit action may comprise committing data stored on the ACM 1014 to a persistent storage media. Accordingly, in some embodiments, an ACM, such as the ACM 1011 described above, may be comprise persistent storage media. FIG. 3 is a block diagram of a system 1100 depicting an embodiment of a persistent data structure module 1009 and an ACM 1111 configured to implement triggered commit actions, which may include committing data structures to a persistent, solid-state, and/or non-volatile storage.

Figure 3:
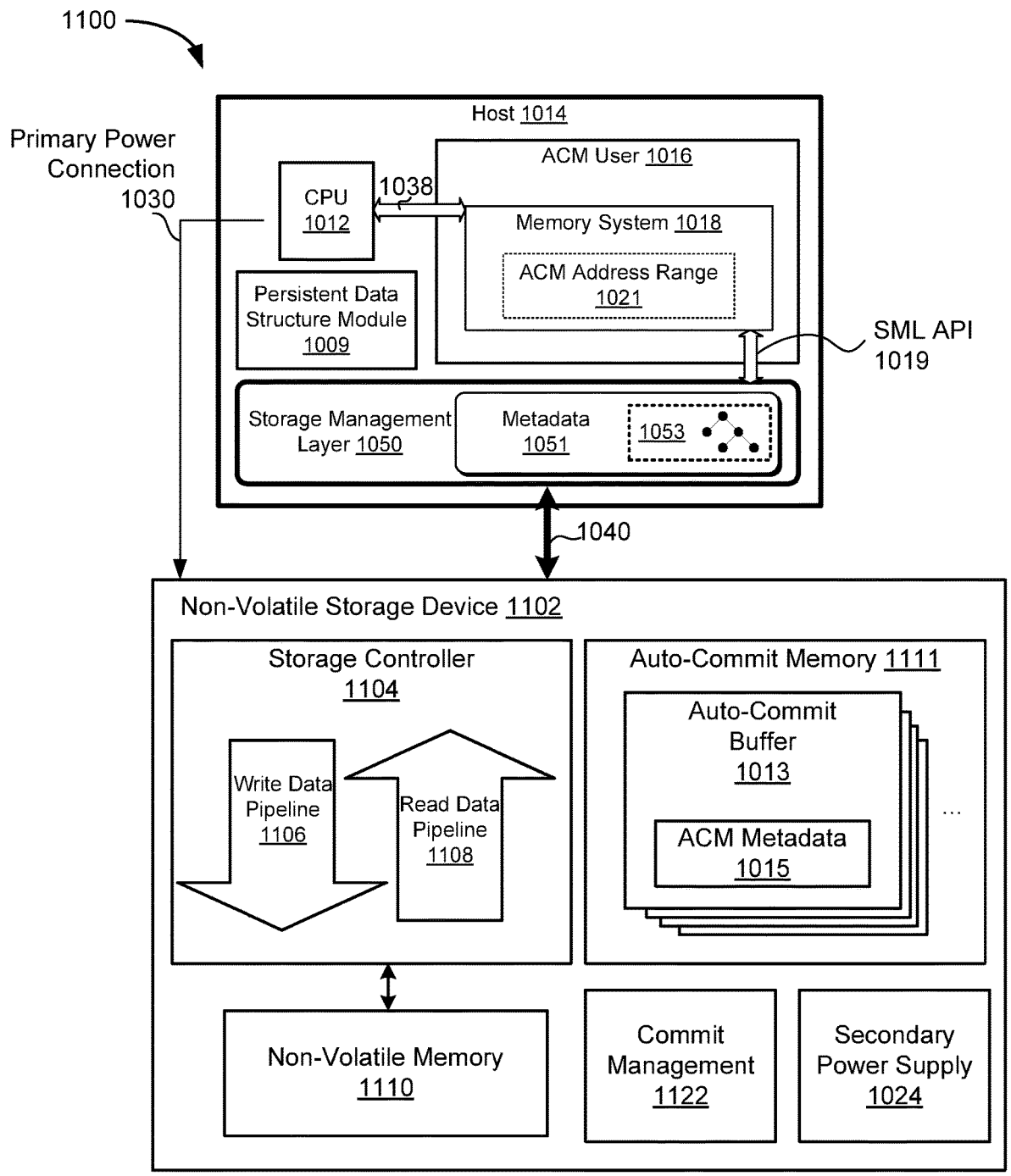
FIG. 3 is a block diagram of a further embodiment of a system for persistent memory management.

The ACM 1111 of the FIG. 3 example may be tightly coupled to the non-volatile storage device 1102, which comprises a controller 1104. The controller 1104 may comprise a write data pipeline 1106 and a read data pipeline 1108, which may operate as described above. The non-volatile storage device 1102 may be capable of persisting data on a non-volatile memory 1110, such as solid-state storage media.

A commit management apparatus 1122 is used to commit data to the non-volatile memory 1110 in response to a trigger event, such as loss of primary power connection, or other pre-determined trigger event. Accordingly, the commit management apparatus 1122 may comprise and/or be configured to perform the functions of the auto-commit memory 1011 described above. The commit management apparatus 1122 may be further configured to commit data on the ACM 1111 (e.g., the contents of the auto-commit buffers 1013) to the non-volatile memory 1110 in response to a restart condition (or on request from the host 1014 and/or ACM users 1016) and in accordance with the ACM metadata 1015. The commit management apparatus 1122 is one embodiment of a commit agent 1020.

The data on the ACM 1111 may be committed to the persistent storage 1110 in accordance with the ACM metadata 1015, such as a logical identifier or the like. The ACM 1111 may commit the data to a temporary location for further processing after a restart event, may commit the data to a final intended location, or the like as, described above. If the non-volatile memory 1110 is sequential storage device, committing the data may comprise storing the logical identifier or other ACM metadata 1015 with the contents of the auto-commit buffer 1013 (e.g., in a packet or container header). If the non-volatile memory 1110 comprises a hard disk having a 1:1 mapping between logical identifier and physical address, the contents of the auto-commit buffer 1013 may be committed to the storage location to which the logical identifier maps. Since the logical identifier or other ACM metadata 1015 associated with the data is pre-configured (e.g., armed), the ACM 1111 implements the triggered commit action independently of the host 1014. The secondary power supply 1024 supplies power to the volatile auto-commit buffers 1013 of the ACM 1111 until the triggered commit actions are completed (and/or confirmed to be completed), or until the triggered commit actions are performed to a point at which the ACM 1111 may complete the triggered commit actions during recovery after a restart event.

In some embodiments, the ACM 1111 commits data in a way that maintains an association between the data and its corresponding logical identifier (per the ACM metadata 1015). If the non-volatile memory 1110 comprises a hard disk, the data may be committed to a storage location corresponding to the logical identifier, which may be outside of the isolation zone 1301 (e.g., using a logical identifier to physical address conversion). In other embodiments in which the non-volatile memory 1110 comprises a sequential media, such as solid-state storage media, the data may be stored sequentially and/or in a log-based format as described in above and/or in U.S. Provisional Patent Application Publication No. 61/373,271, entitled "APPARATUS, SYSTEM, AND METHOD FOR CACHING DATA," and filed 12 Aug. 2010, which is hereby incorporated by reference in its entirety. The sequential storage operation may comprise storing the contents of an auto-commit buffer 1013 with a corresponding logical identifier (as indicated by the ACM metadata 1015). In one embodiment, the data of the auto-commit buffer 1013 and the corresponding logical identifier are stored together on the media according to a predetermined pattern. In certain embodiments, the logical identifier is stored before the contents of the auto-commit buffer 1013. The logical identifier may be included in a header of a packet comprising the data, or in another sequential and/or log-based format. The association between the data and logical identifier may allow a data index to be reconstructed as described above.

As described above, the auto-commit buffers 1013 of the ACM 1011 may be mapped into the memory system 1018 of the host 1014, enabling the ACM users 1016 of access these buffers 1013 using memory access semantics. In some embodiments, the mappings between logical identifiers and auto-commit buffers 1013 may leverage a virtual memory system of the host 1014.

For example, an address range within the memory system 1018 may be associated with a "memory mapped file." As discussed above, a memory mapped file is a virtual memory abstraction in which a file, portion of a file, or block device is mapped into the memory system 1018 address space for more efficient memory semantic operations on data of the non-volatile storage device 1102. An auto-commit buffer 1013 may be mapped into the host memory system 1018 using a similar abstraction. The ACM memory range 1021 may, therefore, be represented by a memory mapped file. The backing file must be stored on the non-volatile memory 1110 within the isolation zone 1301 (See FIG. 5 below) or another network attached non-volatile storage device 1102 also protected by an isolation zone 1301. The auto-commit buffers 1013 may correspond to only a portion of the file (the file itself may be very large, exceeding the capacity of the auto-commit buffers 1013 and/or the non-volatile memory 1110). When a portion of a file is mapped to an auto-commit buffer 1013, the ACM user 1016 (or other entity) may identify a desired offset within the file and the range of blocks in the file that will operate with ACM characteristics (e.g., have ACM semantics). This offset will have a predefined logical identifier and the logical identifier and range may be used to trigger committing the auto-commit buffer(s) 1013 mapped within the file. Alternatively, a separate offset for a block (or range of blocks) into the file may serve as a trigger for committing the auto-commit buffer(s) 1013 mapped to the file. For example, anytime a memory operation (load, store, poke, etc.) is performed on data in the separate offset or range of blocks may result in a trigger event that causes the auto-commit buffer(s) 1013 mapped to the file to be committed.

The underlying logical identifier may change, however (e.g., due to changes to other portions of the file, file size changes, etc.). When a change occurs, the storage management module 1050 (via the SML API 1019, an ACM user 1016, the persistent data structure module 1009, or other entity) may update the ACM metadata 1015 of the corresponding auto-commit buffers 1013. In some embodiments, the storage management module 1050 may be configured to query the host 1014 (operating system, hypervisor, or other application) for updates to the logical identifier of files associated with auto-commit buffers 1013. The queries may be initiated by the SML API 1019 and/or may be provided as a hook (callback mechanism) into the host 1014. When the ACM user 1016 no longer needs the auto-commit buffer 1013, the storage management module 1050 may de-allocate the buffer 1013 as described above. De-allocation may further comprise informing the host 1014 that updates to the logical identifier are no longer needed.

In some embodiments, a file may be mapped across multiple storage devices (e.g., the storage devices may be formed into a RAID group, may comprise a virtual storage device, or the like). Associations between auto-commit buffers 1013 and the file may be updated to reflect the file mapping. This allows the auto-commit buffers 1013 to commit the data to the proper storage device. The ACM metadata 1015 of the auto-commit buffers 1013 may be updated in response to changes to the underlying file mapping and/or partitioning as described above. Alternatively, the file may be "locked" to a particular mapping or partition while the auto-commit buffers 1013 are in use. For example, if a remapping/repartitioning of a file is required, the corresponding auto-commit buffers 1013 may commit data to the file, and then be re-associated with the file under the new mapping/partitioning scheme. The SML API 1019 may comprise interfaces and/or commands for using the storage management module 1050 to lock a file, release a file, and/or update ACM metadata 1015 in accordance with changes to a file.

Committing the data to solid-state, non-volatile storage 1110 may comprise the storage controller 1104 accessing data from the ACM 1111 auto-commit buffers 1013, associating the data with the corresponding logical identifier (e.g., labeling the data), and injecting the labeled data into the write data pipeline 1106 as described above. In some embodiments, to ensure there is a page program command capable of persisting the ACM data, the storage controller 1104 maintains two or more pending page programs during operation. The ACM data may be committed to the non-volatile memory 1110 before writing the power loss identifier (power-cut fill pattern) described above.

Figure 4:
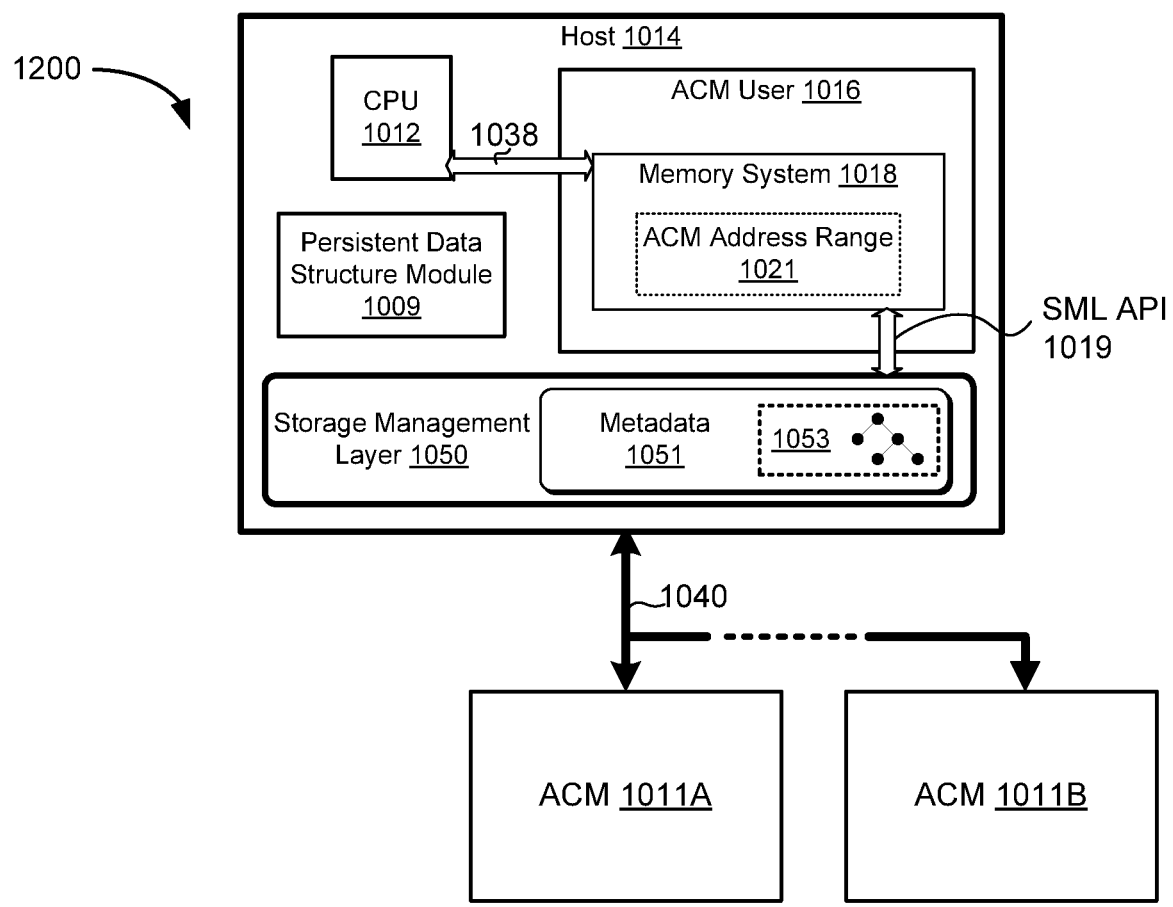
FIG. 4 is a block diagram of a system comprising a plurality of auto-commit memories.

FIG. 4 depicts one embodiment of a system 1200 comprising a persistent data structure module 1009 and a plurality of auto-commit memories 1011. In the FIG. 4 example, memory semantic accesses implemented by the host 1014 may be stored on a plurality of ACMs, including 1011A and 1011B. In some embodiments, host data may be mirrored between the ACMs 1011A and 1011B. The mirroring may be implemented using a multi-cast bus 1040. Alternatively, or in addition, one of the ACMs (AM 1011A) may be configured to rebroadcast data to the ACM 1011B. The ACMs 1011A and 1011B may be local to one another (e.g., on the same local bus). Alternatively, the ACMs 1011A and 1011B may located on different systems, and may be communicatively coupled via a bus that supports remove data access, such as Infiniband, a remote PCI bus, RDMA, or the like.

In some embodiments, the ACMs 1011A and 1011B may implement a striping scheme (e.g., a RAID scheme). In this case, different portions of the host data may be sent to different ACMs 1011A and/or 1011B. Driver level software, such as a volume manager implemented by the storage management module 1050 and/or operating system 1018 may map host data to the proper ACM per the striping pattern.

In some configurations, the memory access semantics provided by the ACMs may be adapted according to a particular storage striping pattern. For example, if host data is mirrored from the ACM 1011A to the ACM 1011B, a memory semantic write may not complete (and/or an acknowledgement may not be returned) until the ACM 1011A verifies that the data was sent to the ACM 1011B (under the "instant commit" semantic). Similar adaptations may be implemented when ACMs are used in a striping pattern (e.g., a memory semantic write may be not return and/or be acknowledged, until the striping pattern for a particular operation is complete). For example, in a copy on write operation, the ACM 1011A may store the data of an auto-commit buffer, and then cause the data to be copied to the ACM 1011B. The ACM 1011A may not return an acknowledgment for the write operation (or allow the data to be read) until the data is copied to the ACM 1011B.

The use of mirrored ACM devices 1011A and 1011B may be used in a high-availability configuration. For example, the ACM devices 1011A and 1011B may be implemented in separate host computing devices. Memory semantic accesses to the devices 1011A and 1011B are mirrored between the devices as described above (e.g., using PCI-e access). The devices may be configured to operate in high-availability mode, such that device proxying may not be required. Accordingly, trigger operations (as well as other memory semantic accesses) may be mirrored across both devices 1011A and 1011B, but the devices 1011A and 1011B may not have to wait for a "acknowledge" from the other before proceeding, which removes the other device from the write-commit latency path.

Figure 5:
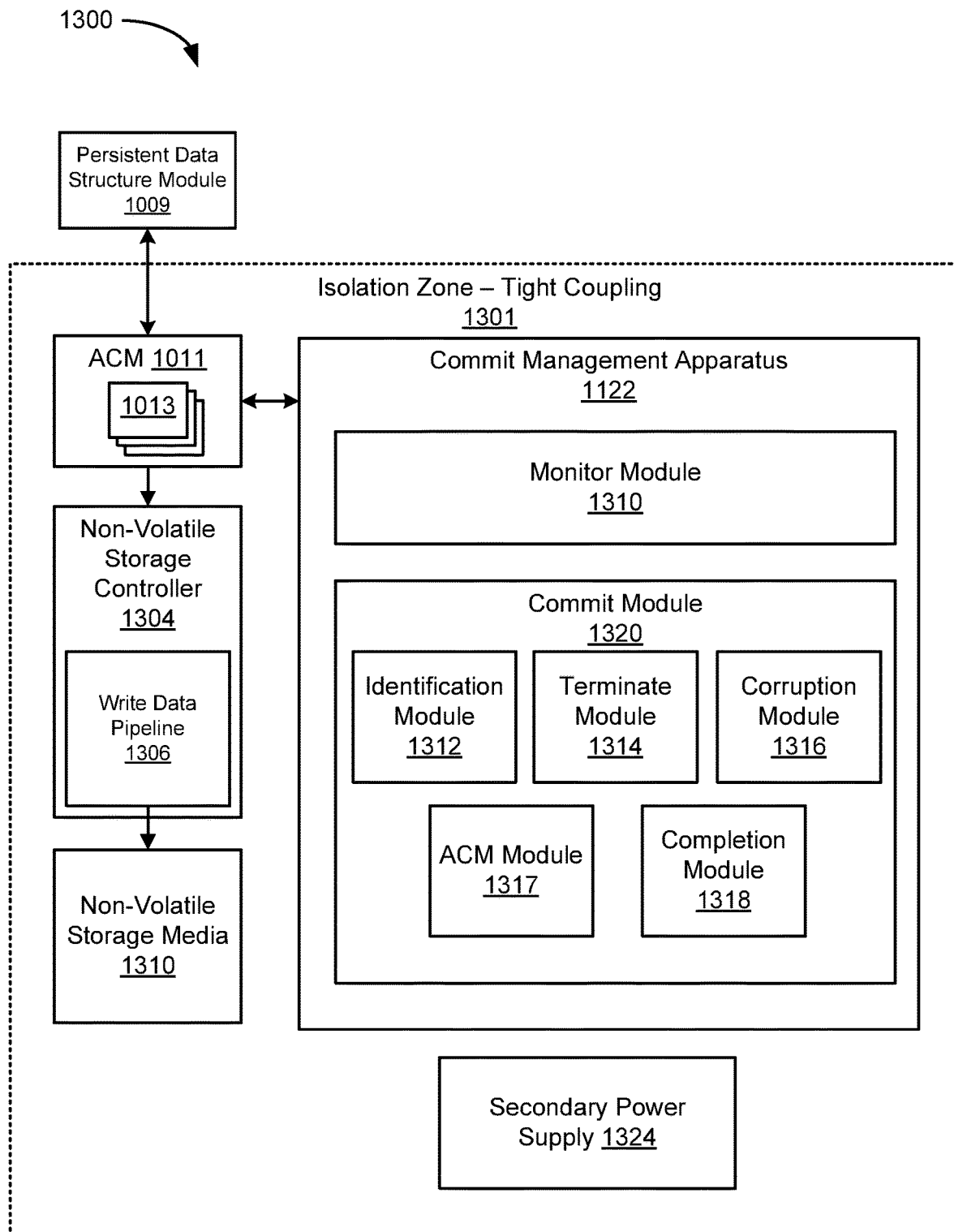
FIG. 5 is a block diagram of an auto-commit memory implemented with a commit management apparatus.

FIG. 5 is a block diagram of a one embodiment 1300 of a commit management apparatus 1122. The commit management apparatus 1122 may be tightly coupled (e.g., within an isolation zone 1301) to the auto-commit memory 1011, the non-volatile storage controller 1304, the non-volatile storage media 1310, and/or the secondary power supply 1324, one or more of which may be in communication with and/or may cooperate with the persistent data structure module 1009 to provide persistent data structures. The tight coupling may comprise implementing these components 132, 1011, 1304, 1310, and/or 1324 on the same die, the same peripheral device, on the same card (e.g., the same PCB), within a pre-defined isolation zone, or the like. The tight coupling may ensure that the triggered commit actions of the ACM buffers 1013 are committed in the event of a restart condition.

The commit management apparatus 1122 includes a monitor module 1310, which may be configured to detect restart conditions, such as power loss or the like. The monitor module 1310 may be configured to sense triggering events, such as restart conditions (e.g., shutdown, restart, power failures, communication failures, host or application failures, and so on) and, in response, to initiate the commit module 1320 to initiate the commit loss mode of the apparatus 1122 (failure loss mode) and/or to trigger the operations of other modules, such as modules 1312, 1314, 1316, 1317, and/or 1318. The commit module 1320 includes an identification module 1312, terminate module 1314, corruption module 1316, and completion module 1318, which may operate as described above.

The identification module 1312 may be further configured to identify triggered commit actions to be performed for each ACM buffer 1013 of the ACM 1011. As discussed above, the identification module 1312 may prioritize operations based on relative importance, with acknowledged operations being given a higher priority than non-acknowledged operations. The contents of auto-commit buffers 1013 that are armed to be committed may be assigned a high priority due to the "instant commit" semantics supported thereby. In some embodiments, the ACM triggered commit actions may be given a higher priority than the acknowledged contents of the write data pipeline 1306. Alternatively, the contents of armed auto-commit buffers 1013 may be assigned the "next-highest" priority. The priority assignment may be user configurable (via an API, IO control (IOCTL), or the like).

The termination module 1314 terminates non-essential operations to allow "essential" to continue as described above. The termination module 1314 may be configured to hold up portions of the ACM 1011 that are "armed" to be committed (e.g., armed auto-commit buffers), and may terminate power to non-armed (unused) portions of the auto-commit memory 1011. The termination module 1314 may be further configured to terminate power to portions of the ACM 1011 (individual auto-commit buffers 1013) as the contents of those buffers are committed.

The corruption module 1316 identifies corrupt (or potentially corrupt) data in the write data pipeline 1306 as described above. The module 1316 may be further configured to identify corrupt ACM data 1011 (data that was written to the ACM 1011 during a power disturbance or other restart condition). The corruption module 1316 may be configured to prevent corrupt data on the ACM 1011 from being committed in a triggered commit action.

An ACM module 1317 is configured to access armed auto-commit buffers in the auto-commit memory 1011, identify the ACM metadata 1015 associated therewith (e.g., label the data with the corresponding logical identifier per the ACM metadata 1015), and inject the data (and metadata) into the write data pipeline of the non-volatile storage controller 1304. In some embodiments, the logical identifier (or other ACM metadata 1015) of the auto-commit buffer 1013 may be stored in the buffer 1013 itself. In this case, the contents of the auto-commit buffer 1013 may be streamed directly into a sequential and/or log-based storage device without first identifying and/or labeling the data. The ACM module 1317 may inject data before or after data currently in the write data pipeline 1306. In some embodiments, data committed from the ACM 1011 is used to "fill out" the remainder of a write buffer of the write data pipeline 1306 (after removing potentially corrupt data). If the remaining capacity of the write buffer is insufficient, the write buffer is written to the non-volatile storage 1310, and a next write buffer is filled with the remaining ACM data.

As discussed above, in some embodiments, the non-volatile storage controller 1304 may maintain an armed write operation (logical page write) to store the contents of the write data pipeline 1306 in the event of power loss. When used with an ACM 1011, two (or more) armed write operations (logical page writes) may be maintained to ensure the contents of both the write data pipeline 1306, and all the armed buffers 1013 of the ACM 1011 can be committed in the event of a restart condition. Because a logical page in a write buffer may be partially filled when a trigger event occurs, the write buffer is sized to hold at least one more logical page of data than the total of all the data stored in all ACM buffers 1013 of the ACM 1011 and the capacity of data in the write data pipeline that has been acknowledged as persisted. In this manner, there will be sufficient capacity in the write buffer to complete the persistence of the ACM 1011 in response to a trigger event. Accordingly, the auto-commit buffers 1013 may be sized according to the amount of data the ACM 1011 is capable of committing. Once this threshold is met, the storage management module 1050 may reject requests to use ACM buffers 1013 until more become available.

The completion module 1318 is configured to flush the write data pipeline regardless of whether the certain buffers, packets, and/or pages are completely filled. The completion module 1318 is configured to perform the flush (and insert the related padding data) after data on the ACM 1011 (if any) has been injected into the write data pipeline 1306. The completion module 1318 may be further configured to inject completion indicator into the write data pipeline, which may be used to indicate that a restart condition occurred (e.g., a restart condition fill pattern). This fill pattern may be included in the write data pipeline 1306 after injecting the triggered data from the ACM 1011.

As discussed above, the secondary power supply 1324 may be configured to provide sufficient power to store the contents of the ACM 1011 as well as data in the write data pipeline 1306. Storing this data may comprise one or more write operations (e.g., page program operations), in which data is persistently stored on the non-volatile storage media 1310. In the event a write operation fails, another write operation, on a different storage location, may be attempted. The attempts may continue until the data is successfully persisted on the non-volatile storage media 1310. The secondary power supply 1324 may be configured to provide sufficient power for each of a plurality of such page program operations to complete. Accordingly, the secondary power supply 1324 may be configured to provide sufficient power to complete double (or more) page program write operations as required to store the data of the ACM 1011 and/or write data pipeline 1306.

Figure 6:
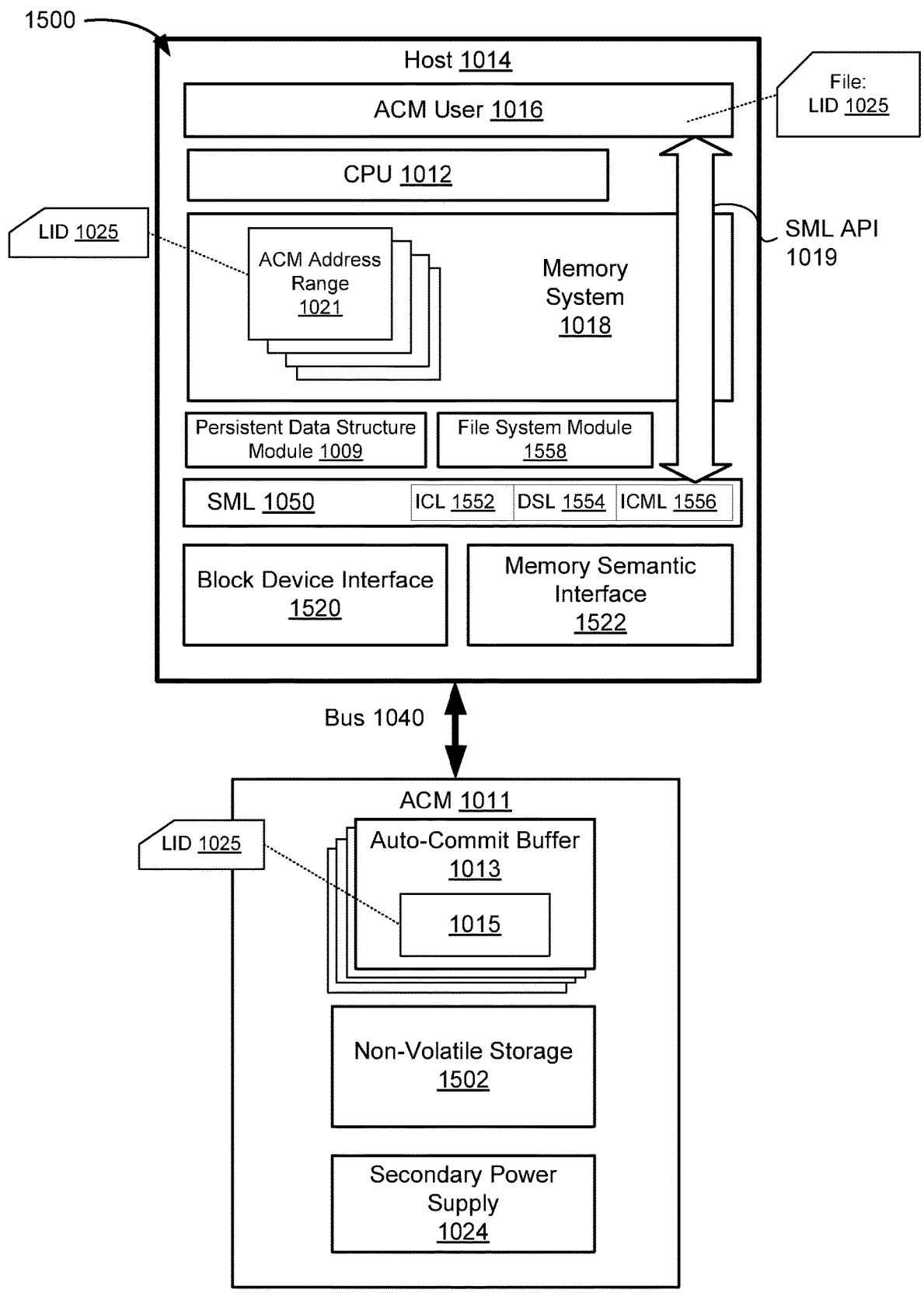
FIG. 6 is a block diagram of another embodiment of a system for persistent memory management.

FIG. 6 is a block diagram 1500 depicting a host computing device 1014 with a persistent data structure module 1009 accessing an ACM 1011 using memory access semantics, providing persistent data structures in cooperation with a file system module 1558 and/or an storage management module 1050 (e.g., the storage management module 1050 described above). The host computing device 1014 may comprise a processor complex/CPU 1012, which may include, but is not limited to, one or more of a general purpose processor, an application-specific processor, a reconfigurable processor (FPGA), a processor core, a combination of processors, a processor cache, a processor cache hierarchy, or the like. In one embodiment, the processor complex 1012 comprises a processor cache, and the processor cache may include one or more of a write combine buffer, an L1 processor cache, an L2 processor cache, an L3 processor cache, a processor cache hierarchy, and other types of processor cache. One or more ACM users 1016 (e.g., operating systems, applications, and so on) operate on the host 1014.

The host 1014 may be communicatively coupled to the ACM 1011 via a bus 1040, which may comprise a PCI-e bus, or the like. Portions of the ACM 1011 are made accessible to the host 1014 may mapping in auto-commit buffers 1013 into the host 1014. In some embodiments, mapping comprises associating an address range within the host memory system 1018 with an auto-commit buffer 1013 of the ACM 1011. These associations may be enabled using the SML API 1019 and/or storage management module 1050 available on the host 1014.

The storage management module 1050 may comprise libraries and/or provide interfaces (e.g., SML API 1019) to implement the memory access semantics described above. The API 1019 may be used to access the ACM 1011 using memory access semantics via a memory semantic access module 1522. Other types of access, such as access to the non-volatile storage 1502, may be provided via a block device interface 1520.

The storage management module 1050 may be configured to memory map auto-commit buffers 1013 of the ACM 1011 into the memory system 1018 (via the SML API 1019). The memory map may use a virtual memory abstraction of the memory system 1018. For example, a memory map may be implemented using a memory mapped file abstraction. In this example, the operating system (or application) 1016 designates a file to be mapped into the memory system 1018. The file is associated with a logical identifier (LID) 1025 (e.g., logical block address), which may be maintained by a file system, an operating system 1016, or the like.

The memory mapped file may be associated with an auto-commit buffer 1013 of the ACM 1013. The association may be implemented by the storage management module 1050 using the bus 1040. The storage management module 1050 associates the address range of the memory mapped file (in the memory system 1018) with a device address of an auto-commit buffer 1013 on the ACM 1011. The association may comprise mapping a PCI-e BAR into the memory system 1018. In the FIG. 6 example, the ACM address range 1021 in the memory system 1018 is associated with the auto-commit buffer 1013.

As discussed above, providing memory access semantics to the ACM 1011 may comprise "arming" the ACM 1011 to commit data stored thereon in the event of failure or other restart. The pre-configured arming ensures that, in the event of a restart, data stored on the ACM 1011 will be committed to the proper logical identifier. The pre-configuration of the trigger condition enables applications 1016 to access the auto-commit buffer 1013 using "instant-commit" memory access semantics. The logical identifier used to arm the auto-commit buffer may be obtained from an operating system, the memory system 1018 (e.g., virtual memory system), or the like.

The storage management module 1050 may be configured to arm the auto-commit buffers 1013 with a logical identifier (e.g., automatically, by callback, and/or via the SML API 1019). Each auto-commit buffer 1013 may be armed to commit data to a different logical identifier (different LBA, persistent identifier, or the like), which may allow the ACM 1011 to provide memory semantic access to a number of different, concurrent ACM users 1016. In some embodiments, arming an auto-commit buffer 1013 comprises setting the ACM metadata 1015 with a logical identifier. In the FIG. 6 example, the ACM address range 1021 is associated with the logical identifier 1025, and the ACM metadata 1015 of the associated auto-commit buffer is armed with the corresponding logical identifier 1025.

The storage management module 1050 may arm an auto-commit buffer using an I/O control (IOCTL) command comprising the ACM address range 1021, the logical identifier 1025, and/or an indicator of which auto-commit buffer 1013 is to be armed. The storage management module 1050 (through the SML API 1019) may provide an interface to disarm or "detach" the auto-commit buffer 1013. The disarm command may cause the contents of the auto-commit buffer 1013 to be committed as described above (e.g., committed to the non-volatile storage device 1502). The detach may further comprise "disarming" the auto-commit buffer 1013 (e.g., clearing the ACM metadata 1015). The storage management module 1050 may be configured to track mappings between address ranges in the memory system 1018 and auto-commit buffers 1013 so that a detach command is performed automatically.

Alternatively, or in addition, the storage management module 1050 may be integrated into the operating system (or virtual operating system, e.g., hypervisor) of the host 1014. This may allow the auto-commit buffers 1013 to be used by a virtual memory demand paging system. The operating system may (through the SML API 1019 or other integration technique) map/arm auto-commit buffers for use by ACM users 1016. The operating system may issue commit commands when requested by an ACM user 1016 and/or its internal demand paging system. Accordingly, the operating system may use the ACM 1011 as another, generally available virtual memory resource.

Once an ACM user 1016 has mapped the ACM address range 1021 to an auto-commit buffer 1013 and has armed the buffer 1013, the ACM user 1016 may access the resource using memory access semantics, and may consider the memory accesses to be "logically" committed as soon as the memory access has completed. The ACM user 1016 may view the memory semantic accesses to the ACM address range 1021 to be "instantly committed" because the ACM 1011 is configured to commit the contents of the auto-commit buffer (to the logical identifier 1025) regardless of experiencing restart conditions. Accordingly, the ACM user 1016 may not be required to perform separate write and commit commands (e.g., a single memory semantic write is sufficient to implement a write-commit). Moreover, the mapping between the auto-commit buffer 1013 and the ACM 1011 disclosed herein removes overhead due to function calls, system calls, and even a hypervisor (if the ACM user 1016 is running in a virtual machine) that typically introduce latency into the write-commit path. The write-commit latency time of the ACM user 1016 may therefore be reduced to the time required to access the ACM 1011 itself.

As described above, in certain embodiments, the host 1014 may map one or more ACM buffers 1013 into an address range of a physical memory address space addressable by a CPU, a kernel, or the like of the host device 1014, such as the memory system 1018, as directly attached physical memory, as MMIO addressable physical memory over a PCI-e bus, or otherwise mapped as one or more pages of physical memory. The host 1014 may further map at least a portion of the physically mapped ACM buffers 1013 into a virtual memory address space, accessible to user-space processes or the like as virtual memory. The host 1014 may map the entire capacity of the physically mapped ACM buffers 1013 into a virtual memory address space, a portion of the physically mapped ACM buffers 1013 into a virtual memory address space, or the like.

In a similar manner, the host 1014 may include a virtual machine hypervisor, host operating system, or the like that maps the physically mapped ACM buffers 1013 into an address space for a virtual machine or guest operating system. The physically mapped ACM buffers 1013 may appear to the virtual machine or guest operating system as physically mapped memory pages, with the virtual machine hypervisor or host operating system spoofing physical memory using the ACM buffers 1013. A resource management agent, as described above, may allocate/arbitrate storage capacity of the ACM buffers 1013 among multiple virtual machines, guest operating systems, or the like.

Because, in certain embodiments, virtual machines, guest operating systems, or the like detect the physically mapped ACM buffers 1013 as if they were simply physically mapped memory, the virtual machines can sub-allocate/arbitrate the ACM buffers 1013 into one or more virtual address spaces for guest processes, or the like. This allows processes within guest operating systems, in one embodiment, to change ACM data and/or ACM metadata 1015 directly, without making guest operating system calls, without making requests to the hypervisor or host operating system, or the like.

In another embodiment, instead of spoofing physical memory for a virtual machine and/or guest operating system, a virtual machine hypervisor, a host operating system, or the like of the host device 1014 may use para-virtualization techniques. For example, a virtual machine and/or guest operating system may be aware of the virtual machine hypervisor or host operating system and may work directly with it to allocate/arbitrate the ACM buffers 1013, or the like. When the ACM 1011 is used in a virtual machine environment, in which one or more ACM users 1016 operate within a virtual machine maintained by a hypervisor, the hypervisor may be configured to provide ACM users 1016 operating within the virtual machine with access to the SML API 1019 and/or storage management module 1050.

The hypervisor may access the SML API 1019 to associate logical identifiers with auto-commit buffers 1013 of the ACM 1011, as described above. The hypervisor may then provide one or more armed auto-commit buffers 1013 to the ACM users 1016 (e.g., by mapping an ACM address range 1021 within the virtual machine memory system to the one or more auto-commit buffers 1013). The ACM user 1016 may then access the ACM 1011 using memory access semantics (e.g., efficient write-commit operations), without incurring overheads due to, inter alia, hypervisor and other system calls. The hypervisor may be further configured to maintain the ACM address range 1021 in association with the auto-commit buffers 1013 until explicitly released by the ACM user 1016 (e.g., the keep the mapping from changing during use). Para-virtualization and cooperation, in certain embodiments, may increase the efficiency of the ACM 1011 in a virtual machine environment.

In some embodiments, the ACM user 1016 may be adapted to operate with the "instant commit" memory access semantics provided by the ACM 1013. For example, since the armed auto-commit buffers 1013 are triggered to commit in the event of a restart (without an explicit commit command), the order in which the ACM user 1016 performs memory access to the ACM 1011 may become a consideration. The ACM user 1016 may employ memory barriers, complier flags, and the like to ensure the proper ordering of memory access operations.

For example, read before write hazards may occur where an ACM user 1016 attempts to read data through the block device interface 1520 that is stored on the ACM 1011 (via the memory semantic interface 1522). In some embodiments, the storage management module 1050 may maintain metadata tracking the associations between logical identifiers and/or address ranges in the memory system 1018 and auto-commit buffers 1013. When an ACM user 1016 (or other entity) attempts to access a logical identifier that is mapped to an auto-commit buffer 1013 (e.g., through the block device interface 1520), the storage management module 1050 directs the request to the ACM 1011 (via the memory semantic interface 1522), preventing a read before write hazard.

The storage management module 1050 may be configured to provide a "consistency" mechanism for obtaining a consistent state of the ACM 1011 (e.g., a barrier, snapshot, or logical copy). The consistency mechanism may be implemented using metadata maintained by the storage management module 1050, which, as described above, may track the triggered auto-commit buffers 1013 in the ACM 1011. A consistency mechanism may comprise the storage management module 1050 committing the contents of all triggered auto-commit buffers 1013, such that the state of the persistent storage is maintained (e.g., store the contents of the auto-commit buffers 1013 on the non-volatile storage 1502, or other persistent storage).

As described above, ACM users 1016 may access the ACM 1011 using memory access semantics, at RAM granularity, with the assurance that the operations will be committed if necessary (in the event of restart, failure, power loss, or the like). This is enabled by, inter alia, a mapping between the memory system 1018 of the host 1014 and corresponding auto-commit buffers 1013; memory semantic operations implemented within an ACM memory range 1021 mapped to an auto-commit buffer 1013 are implemented directly on the buffer 1013. As discussed above, data transfer between the host 1041 and the ACM 1011 may be implemented using any suitable data transfer mechanism including, but not limited to: the host 1014 performing processor IO operations (PIO) with the ACM 1011 via the bus 1040 (e.g., MMIO, PMIO, and the like); the ACM 1011 (or other device) providing one or more DMA engines or agents (data movers) to transfer data between the host 1014 and the ACM 1011; the host 1014 performing processor cache write/flush operations; or the like. Transferring data on the bus 1040 may comprise issuing a bus "write" operation followed by a "read." The subsequent "read" may be required where the bus 1040 (e.g., PCI bus) does not provide an explicit write acknowledgement.

In some embodiments, an ACM user may wish to transfer data to the ACM 1011 in bulk as opposed to a plurality of small transactions. Bulk transfers may be implemented using any suitable bulk transfer mechanism. The bulk transfer mechanism may be predicated on the features of the bus 1040. For example, in embodiments comprising a PCI-e bus 1040, bulk transfer operations may be implemented using bulk register store CPU instructions.

Similarly, certain data intended for the ACM 1011 may be cached in processor cache of the processor complex 1012. Data that is cached in a processor cache may be explicitly flushed to the ACM 1011 (to particular auto-commit buffers 1013) using a CPU cache flush instruction, or the like, such as the serializing instruction described below.

The DMA engines described above may also be used to perform bulk data transfers between an ACM user 1016 and the ACM 1011. In some embodiments, the ACM 1011 may implement one or more of the DMA engines, which may be allocated and/or accessed by ACM users 1016 using the storage management module 1050 (through the SML API 1019). The DMA engines may comprise local DMA transfer engines for transferring data on a local, system bus as well as RDMA transfer engines for transferring data using a network bus, network interface, or the like.

In some embodiments, the ACM 1011 may be used in caching applications. For example, the non-volatile storage device 1502 may be used as cache for other backing store, such as a hard disk, network-attached storage, or the like (not shown). One or more of the ACM 1011 auto-commit buffers 1013 may be used as a front-end to the non-volatile storage 1502 cache (a write-back cache) by configuring one or more of the auto-commit buffers 1013 of the ACM 1011 to commit data to the appropriate logical identifiers in the non-volatile storage 1502. The triggered buffers 1013 are accessible to ACM users 1016 as described above (e.g., by mapping the buffers 1013 into the memory system 1018 of the host 1014). A restart condition causes the contents of the buffers 1013 to be committed to the non-volatile storage 1502 cache. When the restart condition is cleared, the cached data in the non-volatile storage 1502 (committed by the auto-commit buffers 1013 on the restart condition) will be viewed as "dirty" in the write cache and available for use and/or migration to the backing store. The use of the ACM 1011 as a cache front-end may increase performance and/or reduce wear on the cache device.

In some embodiments, auto-commit buffers 1013 of the ACM 1011 may be leveraged as a memory write-back cache by an operating system, virtual memory system, and/or one or more CPUs of the host 1014. Data cached in the auto-commit buffers 1013 as part of a CPU write-back cache may be armed to commit as a group. When committed, the auto-commit buffers 1013 may commit both data and the associated cache tags. In some embodiments, the write-back cache auto-commit buffers 1013 may be armed with an ACM address (or armed with a predetermined write-back cache address). When the data is restored, logical identifier information, such as LBA and the like, may be determined from a log or other data.

In some embodiments, the storage management module 1050 may comprise libraries and/or publish APIs adapted to a particular set of ACM users 1016. For example, the storage management module 1050 may provide or cooperate with the persistent data structure module 1009, which may be adapted for applications whose performance is tied to write-commit latency, such as transaction logs (database, file system, and other transaction logs), store and forward messaging systems, persistent object caching, storage device metadata, and the like. The persistent data structure module 1009 may provide an Instant Committed Log Library or the like for a persistent transaction log, or another interface for a different persistent data structure.

The persistent data structure module 1009 provides mechanisms for mapping auto-commit buffers 1013 of the ACM 1011 into the memory system 1018 of an ACM user 1016 as described above. ACM users 1016 (or the persistent data structure module 1009 itself) may implement an efficient "supplier/consumer" paradigm for auto-commit buffer 1013 allocation, arming, and access. For example, a "supplier" thread or process (in the application space of the ACM users 1016) may be used to allocate and/or arm auto-commit buffers 1013 for the ACM user 1016 (e.g., map auto-commit buffers 1013 to address ranges within the memory system 1018 of the host 1014, arm the auto-commit buffers 1013 with a logical identifier, and so on). A "consumer" thread or process of the ACM user 1016 may then accesses the pre-allocated auto-commit buffers 1013. In this approach, allocation and/or arming steps are taken out of the write-commit latency path of the consumer thread. The consumer thread of the ACM user 1016 may consider memory semantic accesses to the memory range mapped to the triggered auto-commit buffers (the ACM memory range 1021) as being "instantly committed" as described above.

Performance of the consumer thread(s) of the ACM user 1016 may be enhanced by configuring the supplier threads of the persistent data structure module 1009 (or ACM user 1016) to allocate and/or arm auto-commit buffers 1013 in advance. When a next auto-commit buffer 1013 is needed, the ACM user 1016 have access a pre-allocated/armed buffer from a pool maintained by the supplier. The supplier may also perform cleanup and/or commit operations when needed. For example, if data written to an auto-commit buffer is to be committed to persistent storage, a supplier thread (or another thread outside of the write-commit path)

may cause the data to be committed (using the SML API 1019). Committing the data may comprise re-allocating and/or re-arming the auto-commit buffer 1013 for a consumer thread of the ACM user 1016 as described above.

The "supplier/consumer" approach described above may be used to implement a "rolling buffer." An ACM user 1016 may implement an application that uses a pre-determined amount of "rolling" data. For example, an ACM user 1016 may implement a message queue that stores the "last 20 inbound messages" and/or the ACM user 1016 may manage directives for a non-volatile storage device (e.g., persistent trim directives or the like). A supplier thread may allocate auto-commit buffers 1013 having at least enough capacity to hold the "rolling data" needed by the ACM user 1016 (e.g., enough capacity to hold the last 20 inbound messages). A consumer thread may access the buffers using memory access semantics (load and store calls) as described above. The SML API 1019 (or supplier thread of the ACM user 1016) may monitor the use of the auto-commit buffers 1013. When the consumer thread nears the end of its auto-commit buffers 1013, the supplier thread may re-initialize the "head" of the buffers 1013, by causing the data to be committed (if necessary), mapping the data to another range within the memory system 1018, and arming the auto-commit buffer 1013 with a corresponding logical identifier. As the consumer continues to access the buffers 1013, the consumer stores new data at a new location that "rolls over" to the auto-commit buffer 1013 that was re-initialized by the supplier thread, and continues to operate. In some cases, data written to the rolling buffers described above may never be committed to persistent storage (unless a restart condition or other triggering condition occurs). Moreover, if the capacity of the auto-commit buffers 1013 is sufficient to hold the rolling data of the ACM user, the supplier threads may not have to perform re-initialize/re-arming described above. Instead, the supplier threads may simply re-map auto-commit buffers 1013 that comprise data that has "rolled over" (and/or discard the "rolled over" data therein).

In its simplest form, a rolling buffer may comprise two ACM buffers 1013, and the storage management module 1050 may write to one ACM buffer 1013 for an ACM user 1016 while destaging previously written data from the other ACM buffer 1013 to a storage location, such as the non-volatile memory 1110 or the like. In response to filling one ACM buffer 1013 and completing a destaging process of the other ACM buffer 1013, the storage management module 1050 may transparently switch the two ACM buffers such that the ACM user 1016 writes to the other ACM buffer 1013 during destaging of the one ACM buffer 1013, in a ping-pong fashion. The storage management module 1050 may implement a similar rolling process with more than two ACM buffers 1013. The persistent data structure module 1009, in certain embodiments, includes and/or supports one or more transaction log API functions. An ACM user 1016 may use the persistent data structure module 1009, in these embodiments, to declare or initialize a transaction log data structure.

As a parameter to a transaction log API command to create a transaction log data structure, in one embodiment, the persistent data structure module 1009 receives a storage location, such as a location in a namespace and/or address space of the non-volatile storage 1502 or the like, to which the storage management module 1050 may commit, empty, and/or destage data of the transaction log from two or more ACM buffers 1013 in a rolling or circular manner as described above. Once an ACM user 1016 has initialized or declared a transaction log data structure, in one embodiment, the use of two or more ACM buffers 1013 to implement the transaction log data structure is substantially transparent to the ACM user 1016, with the performance and benefits of the ACM 1011. The use of two or more ACM buffers 1013, in certain embodiments, is transparent when the destage rate for the two or more ACM buffers 1013 is greater than or equal to the rate at which the ACM user 1016 writes to the two or more ACM buffers 1013. The persistent data structure module 1009, in one embodiment, provides byte-level writes to a transaction log data structure using two or more ACM buffers 1013.

In another example, a supplier thread may maintain four (4) or more ACM buffers 1013. A first ACM buffer 1013 may be armed and ready to accept data from the consumer, as described above. A second ACM buffer 1013 may be actively accessed (e.g., filled) by a consumer thread, as described above. A third ACM buffer 1013 may be in a pre-arming process (e.g., re-initializing, as described above), and a fourth ACM buffer 1013 may be "emptying" or "destaging" (e.g., committing to persistent storage, as described above).

In some embodiments, the persistent data structure module 1009 and/or rolling log mechanisms described above may be used to implement an Intent Log for Synchronous Writes for a file system (e.g., the ZFS file system). The log data (ZIL) may be fairly small (1 to 4 gigabytes) and is typically "write only." Reads may only be performed for file system recovery. One or more auto-commit buffers 1013 may be used to store file system data using a rolling log and/or demand paging mechanism as described above.

The persistent data structure module 1009 may be configured to operate in a high-availability mode as described above in conjunction with FIG. 4. In a high-availability mode, the storage management module 1050 and/or bus 1040 sends commands pertaining to memory semantic accesses to two or more ACM 1011, each of which may implement the requested operations and/or be triggered to commit data in the event of a restart condition.

In certain embodiments, the persistent data structure module 1009 may provide access to persistent data structures as files in a file system, such as the depicted file system module 1558. The file system module 1558, in one embodiment, may comprise a file system of the host device 1014, and may be provided by an operating system, a storage subsystem, or the like. In a further embodiment, the file system module 1558 may comprise a direct file system (DFS) for the ACM 1011 and/or the non-volatile memory medium 110, 1110, 1502, bypassing one or more operating system or storage subsystem layers or the like to provide efficient, streamlined access to persistent data structures directly.

For example, in one embodiment, the file system module 1558 may lay out files directly in a sparse logical address space provided by the storage management module 1050, which the storage management module 1050, the file system module 1558, the metadata module 1912 described below, or the like may map directly to physical locations in the ACM buffers 1013 and/or the non-volatile memory medium 110, 1110, 1502. The file system module 1558, in a further embodiment, may use or cooperate with the storage management module 1050 and/or the ACM 1011 to perform block allocations, ACM buffer 1013 allocations, and/or atomic data updates, each for the persistent data structure module 1009 or other storage clients. The file system module 1558 may support one or more file system interfaces or APIs such as open, close, read, write, pread, pwrite, lseek, mmap, or other requests or commands. The file system module 1558 may comprise a kernel module in kernel-space, a user module in user-space, or a combination of modules in both kernel-space and user-space. The file system module 1558, in certain embodiments, may be integrated with the storage management module 1050, a storage controller 104, 1004, 1104, or the like, or may be an independent module of computer executable program code and/or logic hardware.

As described above, the auto-commit memory module 1011, an associated commit agent 1020, or the like may be configured to commit, copy, transfer, synchronize, destage, persist, or preserve data from the volatile ACM buffers 1013 to the non-volatile memory medium 110, 1110, 1502, in response to a trigger such as a commit event, a restart event, a synchronize or destage request, a change in state, a change in condition, a change in a factor, a change in an attribute, a region of an auto-commit buffer 1013 becoming full, or the like based on ACM metadata 1015. Committing data, in one embodiment, may comprise copying or transferring the data from an ACM buffer 1013 to a location in the non-volatile memory medium 110, 1110, 1502. In a further embodiment, data is considered committed as soon as an ACM buffer 1013 has been armed or configured with ACM metadata 1015 defining or indicating a commit action for the data, due to the auto-commit memory module 1011's guarantee of persistence.

The persistent data structure module 1009, in one embodiment, may be configured to provide data for a persistent data structure (e.g., input data for a data structure from a client) to the auto-commit memory module 1011 for writing to one or more ACM buffers 1013 so that the persistent data structure is committed and/or ensured to be persisted in the non-volatile memory medium 110, 1110, 1502 of the non-volatile storage device 102, 1102. The persistent data structure module 1009 may use one or more ACM primitive operations to manage persistent data structures using the auto-commit memory module 1011. For example, in various embodiments, the persistent data structure module 1009 may use an ACM populate operation to load data of a persistent data structure into an ACM buffer 1013, may use an ACM destage operation to destage, copy, transfer, and/or move data of a persistent data structure from an ACM buffer 1013 to the non-volatile memory medium 110, 1110, 1502, may use an ACM barrier or ACM checkpoint operation to ensure consistency of data of a persistent data structure stored in an ACM buffer 1013, or the like. In a further embodiment, one or more ACM buffers 1013 may be mapped into virtual memory of the host device 1014 or the like, and the persistent data structure module 1009 may write, store, or load data into an ACM buffer 1013 using memory semantic operations, as described above.

As described above, the storage management module 1050 (e.g., storage management module 1050) may be configured to store data in the non-volatile memory medium 110, 1110, 1502 sequentially, in a sequential or chronological log-based writing structure 2140 as described below with regard to FIG. 11. The storage management module 1050 (e.g., storage management module 1050) may map logical addresses of data to physical locations storing the data in the non-volatile memory medium 110, 1110, 1502 using a logical-to-physical address mapping structure 2000 as described below with regard to FIG. 11. Persistent data structures of the persistent data structure module 1009, in certain embodiments, may be accessible as files of the file system module 1558 using file names. Persistent data structures, files of the file system module 1558, or the like may be associated with logical identifiers (e.g., LBAs) in a logical address space provided by the storage management module 1050 (e.g., storage management module 1050), which may comprise a sparse logical address space that is larger than a physical storage capacity of the non-volatile storage device 102, 1102. The persistent data structure module 1009, the file system module 1558, the storage management module 1050 (e.g., storage management module 1050), and/or the metadata module 1912 described below with regard to FIG. 10B may track which portions of a persistent data structure, a file, or the like are stored in the ACM buffers 1013 and which portions are stored in the non-volatile memory medium 110, 1110, 1502, maintaining such mappings in file system metadata for the file system module 1558 or the like.

In this manner, in certain embodiments, the file system module 1558 may provide access to a plurality of files using filenames, offsets, or the like and the files (e.g., persistent data structures or other files) may be stored in the ACM buffers 1013, the non-volatile memory medium 110, 1110, 1502, and/or in both the ACM buffers 1013 and the non-volatile memory medium 110, 1110, 1502. Such cooperation between the persistent data structure module 1009, the file system module 1558, the storage management module 1050, and/or the auto-commit memory module 1011 may be hidden or masked from applications or other clients, who may receive the access speed of the volatile ACM buffers 1013, the persistence of the non-volatile memory medium 110, 1110, 1502, and the convenience of file system access to persistent data structures without managing or awareness of the underlying complexities.

Because the file system module 1559, in certain embodiments, is configured to provide access to files physically located in the ACM buffers 1013 and/or the non-volatile memory medium 110, 1110, 1502, persistent data structures that are associated with filenames and accessible as files through the file system module 1558, in one embodiment, may be accessed (e.g., written to and/or read from) using the block device interface 1520, the memory semantic interface 1522, and/or file system operations provided by the file system module 1558. In one embodiment, the file system module 1558 opens a file as an ACM container, with each block of data mapped to a location either in the ACM buffers 1013 or the non-volatile memory medium 110, 1110, 1502, and the mapping is updated as new data of the file is written, as data of the file is destaged from an ACM buffer 1013 to the non-volatile memory medium 110, 1110, 1502, or the like.

The ACM 1011 disclosed herein may be used to enable other types of applications, such as durable synchronization primitives. A synchronization primitive may include, but is not limited to: a semaphore, mutex, atomic counter, test and set, or the like.

A synchronization primitive may be implemented on an auto-commit buffer 1013. ACM users 1016 (or other entities) that wish to access the synchronization primitive may map the auto-commit buffer 1013 into the memory system 1018. In some embodiments, each ACM user 1016 may map the synchronization primitive auto-commit buffer 1013 into its own, respective address range in the memory system 1018. Since the different address ranges are all mapped to the same auto-commit buffer 1013, all will show the same state of the synchronization primitive. ACM users 1016 on remote computing devices may map the synchronization primitive auto-commit buffer 1013 into their memory system using an RDMA network or other remote access mechanism (e.g., Infiniband, remote PCI, etc.).

In some embodiments, the storage management module 1050 may comprise a Durable Synchronization Primitive Library (DSL) 1554 to facilitate the creation of and/or access to synchronization primitives on the ACM 1011. The DSL 1554 may be configured to facilitate one-to-many mappings as described above (one auto-commit buffer 1030-to-many address ranges in the memory system 1018).

The ACM users 1016 accessing the semaphore primitive may consider their accesses to be "durable," since if a restart condition occurs while the synchronization primitive is in use, the state of the synchronization primitive will be persisted as described above (the auto-commit buffer 1013 of the synchronization primitive will be committed to the non-volatile storage 1502, or other persistent storage).

As described above, the storage management module 1050 may be used to map a file into the memory system 1018 (virtual address space) of the host 1014. The file may be mapped in an "Instant Committed Memory" (ICM) mode. In this mode, all changes made to the memory mapped file are guaranteed to be reflected in the file, even if a restart condition occurs. This guarantee may be made by configuring the demand paging system to use an auto-commit buffer 1013 of the ACM 1011 for all "dirty" pages of the ICM file. Accordingly, when a restart condition occurs, the dirty page will be committed to the file, and no data will be lost.

In some embodiments, the storage management module 1050 may comprise an ICM Library (ICML) 1556 to implement these features. The ICML 1556 may be integrated with an operating system and/or virtual memory system of the host 1014. When a page of an ICM memory mapped file is to become dirty, the ICML 1556 prepares an auto-commit buffer 1013 to hold the dirty page. The auto-commit buffer 1013 is mapped into the memory system 1018 of the host 1014, and is triggered to commit to a logical identifier associated with the memory mapped file. As described above, changes to the pages in the memory system 1018 are implemented on the auto-commit buffer 1013 (via the memory semantic access module 1522).

The ICML 1556 may be configured to commit the auto-commit buffers 1013 of the memory mapped file when restart conditions occur and/or when the demand paging system of the host 1014 needs to use the auto-commit buffer 1013 for another purpose. The determination of whether to "detach" the auto-commit buffer 1013 from a dirty page may be made by the demand paging system, by the storage management module 1050 (e.g., using a least recently used (LRU) metric, or the like), or by some other entity (e.g., an ACM user 1016). When the auto-commit buffer is detached, the storage management module 1050 may cause its contents to be committed. Alternatively, the contents of the auto-commit buffer 1013 may be transferred to system RAM at which point the virtual memory mapping of the file may transition to use a RAM mapping mechanisms.

In some embodiments, the storage management module 1050 (or ICML 1556) may be configured to provide a mechanism to notify the operating system (virtual memory system or the like) that a page of a memory mapped file is about to become dirty in advance of an ACM user 1016 writing the data. This notification may allow the operating system to prepare an auto-commit buffer 1013 for the dirty page in advance, and prevent stalling when the write actually occurs (while the auto-commit buffer is mapped and armed). The notification and preparation of the auto-commit buffer 1013 may implemented in a separate thread (e.g., a supplier thread as described above).

The storage management module 1050 and/or ICML 1556 may provide an API to notify the operating system that a particular page that is about to be written has no useful contents and should be zero filled. This notification may help the operating system to avoid unnecessary read operations.

The mechanisms for memory mapping a file to the ACM 1011 may be used in log-type applications, or for other persistent data structures provided by the persistent data structure module 1009. For example, the persistent data structure module 1009 may be configured to memory map a log file to one or more auto-commit buffers 1013 as described above. A supplier thread may provide notifications to the operating system regarding which pages are about to become dirty and/or to identify pages that do not comprise valid data.

Alternatively, or in addition, the ICML 1556 may be implemented without integration into an operating system of the host 1014. In these embodiments, the ICML 1556 may be configured to monitor and/or trap system signals, such as mprotect, mmap, and manual segmentation fault signals to emulate the demand paging operations typically performed by an operating system.

Figure 7:
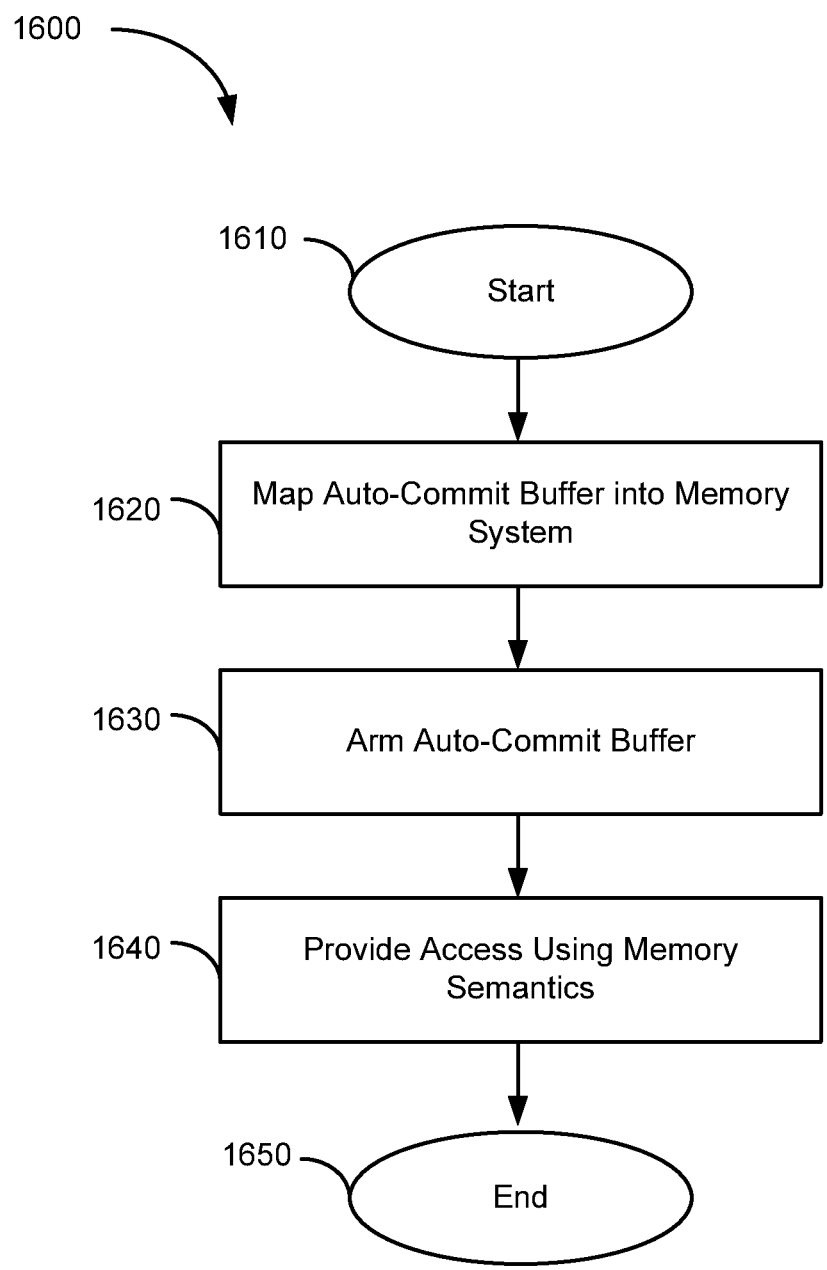
FIG. 7 is a flow diagram of one embodiment of a method for auto-commit memory.

FIG. 7 is a flow diagram of one embodiment of a method 1600 for providing an auto-commit memory. At step 1610 the method 1600 may start and be initialized. Step 1610 may comprise the method 1600 initiating communication with an ACM over a bus (e.g., initiating communication with ACM 1011 via bus 1040).

At step 1620, an auto-commit buffer of the ACM may be mapped into the memory system of a computing device (e.g., the host 1014). The mapping may comprise associating a BAR address of the auto-commit buffer with an address range in the memory system.

At step 1630, the auto-commit buffer may be armed with ACM metadata configured to cause the auto-commit buffer to be committed to a particular persistent storage and/or at a particular location in the persistent storage in the event of a restart condition. In some embodiments, the ACM metadata may comprise a logical identifier such as a LBA, object identifier, or the like. Step 1630 may comprise verifying that the ACM metadata is valid and/or can be used to commit the contents of the auto-commit buffer.

At step 1640, an ACM user, such as an operating system, application, or the like, may access the armed auto-commit buffer using memory access semantics. The ACM user may consider the accesses to be "instantly committed" due to the arming of step 1630. Accordingly, the ACM user may implement "instant committed" writes that omit a separate and/or explicit commit command. Moreover, since the memory semantic accesses are directly mapped to the auto-commit buffer (via the mapping of step 1620), the memory semantic accesses may bypass systems calls typically required in virtual memory systems.

At step 1650 the method 1600 ends until a next auto-commit buffer is mapped and/or armed.

Figure 8:
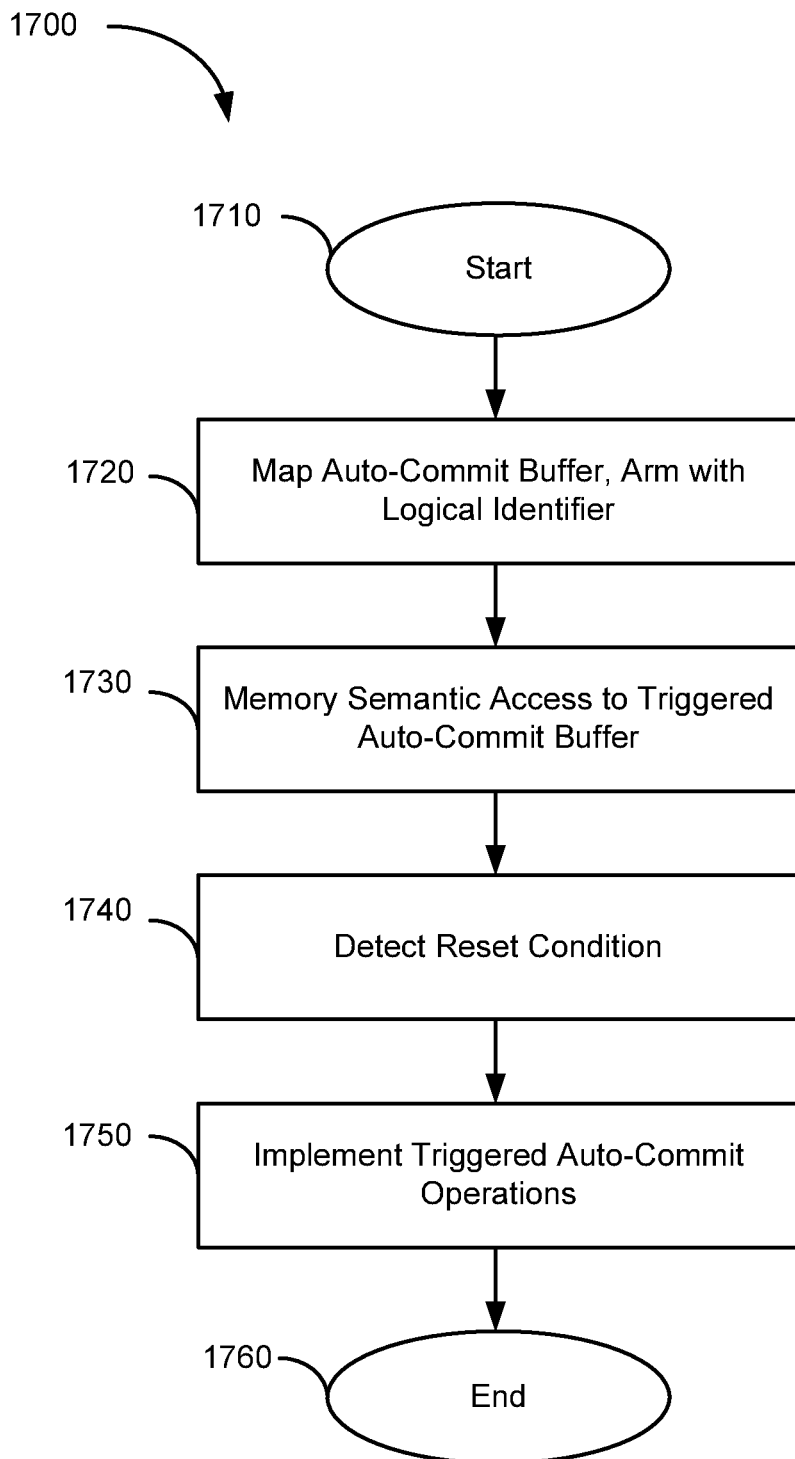
FIG. 8 is a flow diagram of another embodiment of a method for auto-commit memory.

FIG. 8 is a flow diagram of another embodiment of a method 1700 for providing an auto-commit memory. At step 1710 the method 1700 starts and is initialized as described above.

At step 1720, an auto-commit buffer of an ACM is mapped into the memory system of a computing device (e.g., the host 1014), and is armed as described above.

At step 1730, an ACM user accesses the auto-commit buffer using memory access semantics (e.g., by implementing memory semantic operations within the memory range mapped to the auto-commit buffer at step 1720).

At step 1740, a restart condition is detected. As described above, the restart condition may be a system shutdown, a system restart, a loss of power, a loss of communication between the ACM and the host computing device, a software fault, or any other restart condition that precludes continued operation of the ACM and/or the host computing device.

At step 1750, the ACM implements the armed triggered commit actions on the auto-commit buffer. The triggered commit action may comprise committing the contents of the auto-commit buffer to persistent storage, such as a solid-state or other non-volatile storage or the like.

At step 1760, the method 1700 ends until a next auto-commit buffer is mapped and/or armed or a restart condition is detected.

Figure 9:
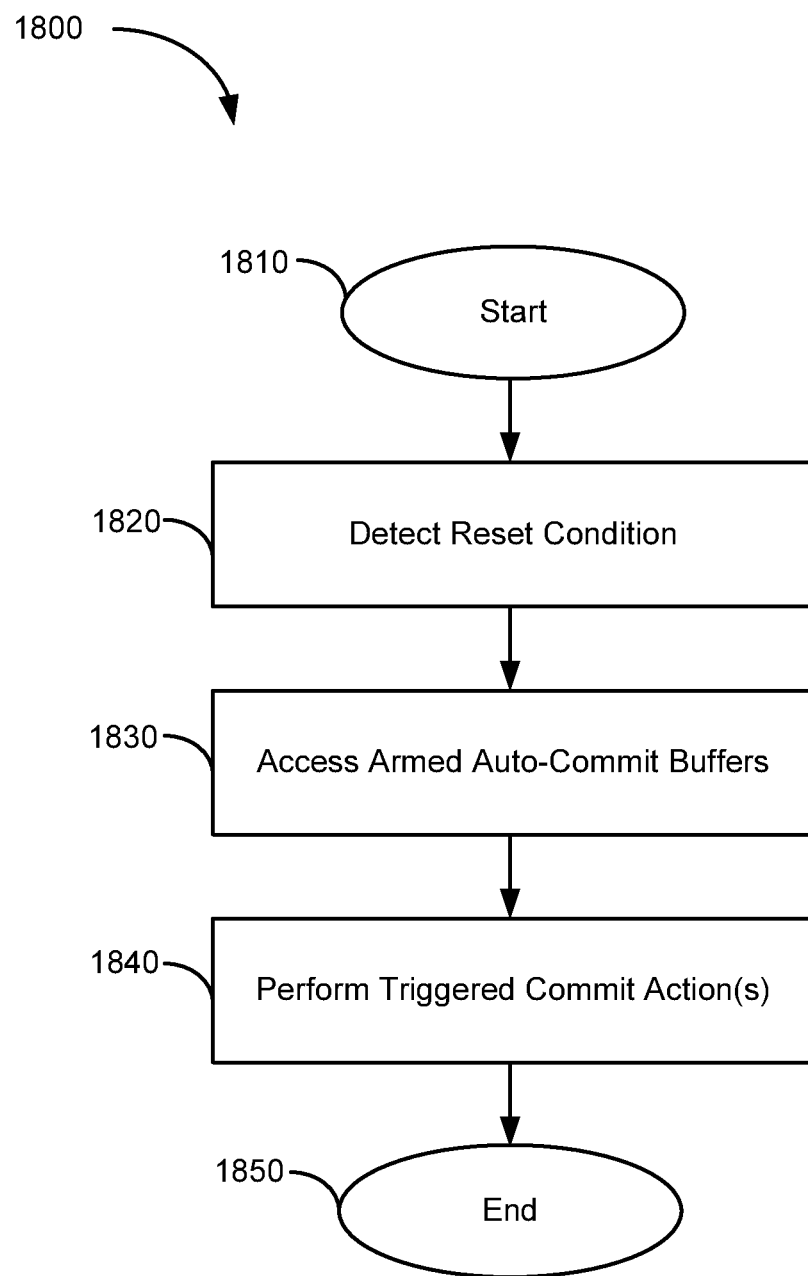
FIG. 9 is a flow diagram of another embodiment of a method for auto-commit memory.

FIG. 9 is a flow diagram of another embodiment for providing an auto-commit memory. At step 1810, the method 1800 starts and is initialized as described above. At step 1820, a restart condition is detected.

At step 1830, the method 1800 accesses armed auto-commit buffers on the ACM (if any). Accessing the armed auto-commit buffer may comprise the method 1800 determining whether an auto-commit buffer has been armed by inspecting the triggered ACM metadata thereof. If no triggered ACM metadata exists, or the ACM metadata is invalid, the method 1800 may determine that the auto-commit buffer is not armed. If valid triggered ACM metadata does exist for a particular auto-commit buffer, the method 1800 identifies the auto-commit buffer as an armed buffer and continues to step 1840.

At step 1840, the triggered commit action for the armed auto-commit buffers is performed. Performing the triggered commit action may comprise persisting the contents of the auto-commit buffer to a sequential and/or log-based storage media, such as a solid-state or other non-volatile storage media. Accordingly, the triggered commit action may comprise accessing a logical identifier of the auto-commit buffer, labeling the data with the logical identifier, and injecting the labeled data into a write data pipeline. Alternatively, the triggered commit action may comprise storing the data on a persistent storage having a one-to-one mapping between logical identifier and physical storage address (e.g., a hard disk). The triggered commit action may comprise storing the contents of the armed auto-commit buffer to the specified physical address.

Performing the triggered commit action at step 1840 may comprise using a secondary power supply to power the ACM, solid-state storage medium, and/or other persistent, non-volatile storage medium, until the triggered commit actions are completed.

In certain embodiments, instead of or in addition to using a volatile memory namespace, such as a physical memory namespace, a virtual memory namespace, or the like and/or instead of or in addition to using a storage namespace, such as a file system namespace, a logical unit number (LUN) namespace, or the like, one or more commit agents 1020, as described above, may implement an independent persistent memory namespace for the ACM 1011. For example, a volatile memory namespace, which is typically accessed using an offset in physical and/or virtual memory, is not persistent or available after a restart event such as a reboot, failure event, or the like and a process that owned the data in physical and/or virtual memory prior to the restart event typically no longer exists after the restart event. Alternatively, a storage namespace is typically accessed using a file name and an offset, a LUN ID and an offset, or the like. While a storage namespace may be available after a restart event, a storage namespace may have too much overhead for use with the ACM 1011. For example, saving a state for each executing process using a file system storage namespace may result in a separate file for each executing process, which may not be an efficient use of the ACM 1011.

The one or more commit agents 1020 and/or the controller 1004, in certain embodiments, provide ACM users 1016 with a new type of persistent memory namespace for the ACM 1011 that is persistent through restart events without the overhead of a storage namespace. One or more processes, such as the ACM user 1016, in one embodiment, may access the persistent memory namespace using a unique identifier, such as a globally unique identifier (GUID), universal unique identifier (UUID), or the like so that data stored by a first process for an ACM user 1016 prior to a restart event is accessible to a second process for the ACM user 1016 after the restart event using a unique identifier, without the overhead of a storage namespace, a file system, or the like.

The unique identifier, in one embodiment, may be assigned to an ACM user 1016 by a commit agent 1020, the controller 1004, or the like. In another embodiment, an ACM user 1016 may determine its own unique identifier. In certain embodiments, the persistent memory namespace is sufficiently large and/or ACM users 1016 determine a unique identifier in a predefined, known manner (e.g., based on a sufficiently unique seed value, nonce, or the like) to reduce, limit, and/or eliminate collisions between unique identifiers. In one embodiment, the ACM metadata 1015 includes a persistent memory namespace unique identifier associated with an owner of an ACM buffer 1013, an owner of one or more pages of an ACM buffer 1013, or the like.

In one embodiment, the one or more commit agents 1020 and/or the controller 1004 provide a persistent memory namespace API to ACM users 1016, over which the ACM users 1016 may access the ACM 1011 using the persistent memory namespace. In various embodiments, the one or more commit agents 1020 and/or the controller 1004 may provide a persistent memory namespace API function to transition, convert, map, and/or copy data from an existing namespace, such as a volatile memory namespace or a storage namespace, to a persistent memory namespace; a persistent memory namespace API function to transition, convert, map, and/or copy data from a persistent memory namespace to an existing namespace, such as a volatile memory namespace or a storage namespace; a persistent memory namespace API function to assign a unique identifier such as a GUID, a UUID, or the like; a persistent memory namespace API function to list or enumerate ACM buffers 1013 associated with a unique identifier; a persistent memory namespace API function to export or migrate data associated with a unique identifier so that an ACM user 1016 such as an application and/or process may take its ACM data to a different host 1014, to a different ACM 1011, or the like; and/or other persistent memory namespace API functions for the ACM 1011.

For example, an ACM user 1016, in one embodiment, may use a persistent memory namespace API function to map one or more ACM buffers 1013 of a persistent memory namespace into virtual memory of an operating system of the host 1014, or the like, and the mapping into the virtual memory may end in response to a restart event while the ACM user 1016 may continue to access the one or more ACM buffers 1013 after the restart event using the persistent memory namespace. In certain embodiments, the storage management module 1050 may provide the persistent memory namespace API in cooperation with the one or more commit agents 1020 and/or the controller 1004.

The persistent memory namespace, in certain embodiments, is a flat non-hierarchical namespace of ACM buffers 1013 (and/or associated ACM pages), indexed by the ACM metadata 1015. The one or more commit agents 1020 and/or the controller 1004, in one embodiment, allow the ACM buffers 1013 to be queried by ACM metadata 1015. In embodiments where the ACM metadata 1015 includes a unique identifier, in certain embodiments, an ACM user 1016 may query or search the ACM buffers 1013 by unique identifier to locate ACM buffers 1013 (and/or stored data) associated with a unique identifier. In a further embodiment, the one or more commit agents 1020 and/or the controller 1004 may provide one or more generic metadata fields in the ACM metadata 1015 such that an ACM user 1016 may define its own ACM metadata 1015 in the generic metadata field, or the like. The one or more commit agents 1020 and/or the controller 1004, in one embodiment, may provide access control for the ACM 1011, based on unique identifier, or the like.

In one embodiment, an ACM buffer 1013 may be a member of a persistent memory namespace and one or more additional namespaces, such as a volatile namespace, a storage namespace or the like. In a further embodiment, the one or more commit agents 1020 and/or the controller 1004 may provide multiple ACM users 1016 with simultaneous access to the same ACM buffers 103. For example, multiple ACM users 1016 of the same type and/or with the same unique identifier, multiple instances of a single type of ACM user 1016, multiple processes of a single ACM user 1016, or the like may share one or more ACM buffers 1013. Multiple ACM users 1016 accessing the same ACM buffers 1013, in one embodiment, may provide their own access control for the shared ACM buffers 1013, such as a locking control, turn-based control, moderator-based control, or the like. In a further embodiment, using a unique identifier, a new ACM user 1016, an updated ACM user 1016, or the like on the host 1014 may access In certain embodiments, the ACM 1011 may comprise a plurality of independent access channels, buses, and/or ports, and may be at least dual ported (e.g., dual ported, triple ported, quadruple ported). In embodiments where the ACM 1011 is at least dual ported, the ACM 1011 is accessible over a plurality of independent buses 1040. For example, the ACM 1011 may be accessible over redundant bus 1040 connections with a single host 1014, may be accessible to a plurality of hosts 1014 over separate buses 104 with the different hosts 1014, or the like. In embodiments where the ACM 1011 is at least dual ported, if one node and/or access channel fails (e.g., a host 1014, a bus 1040), one or more additional nodes and/or access channels to the ACM 1011 remain functional, obviating the need for redundancy, replication, or the like between multiple hosts 1014.

In one embodiment, the ACM 1011 comprises a PCI-e attached dual port device, and the ACM 1011 may be connected to and in communication with two hosts 1014 over independent PCI-e buses 1040. For example, the ACM 1011 may comprise a plurality of PCI-e edge connectors for connecting to a plurality of PCI-e slot connectors, or the like. In a further embodiment, the power connection 1030 may also be redundant, with one power connection 1030 per bus 1040 or the like. At least one of the plurality of connections, in certain embodiments, may comprise a data network connection such as a NIC or the like. For example, the ACM 1011 may comprise one or more PCI-e connections and one or more data network connections.

In one embodiment, the controller 1004 may arbitrate between a plurality of hosts 1014 to which the ACM 1011 is coupled, such that one host 1014 may access the ACM buffers 1013 at a time. The controller 1004, in another embodiment, may accept a reservation request from a host 1014 and may provide the requesting host 1014 with access to the ACM buffers 1013 in response to receiving the reservation request. The ACM 1011 may natively support a reservation request as an atomic operation of the ACM 1011. In other embodiments, the ACM 1011 may divide ACM buffers 1013 between hosts 1014, may divide ACM buffers 1013 between hosts but share backing non-volatile memory 1110 between hosts, or may otherwise divide the ACM buffers 1013, the non-volatile memory 1110, and/or associated address spaces between hosts 1014.

In one embodiment, the controller 1004, the one or more commit agents 1020, and/or other elements of the ACM 1011 may be dual-headed, split-brained, or the like, each head or brain being configured to communicate with a host 1014 and with each other to provide redundant functions for the ACM 1011. By being at least dual ported, in certain embodiments, the ACM 1011 may be redundantly accessible, without the overhead of replication, duplication, or the like which would otherwise reduce I/O speeds of the ACM 1011, especially if such replication, duplication, were performed over a data network or the like.

Figure 10A:
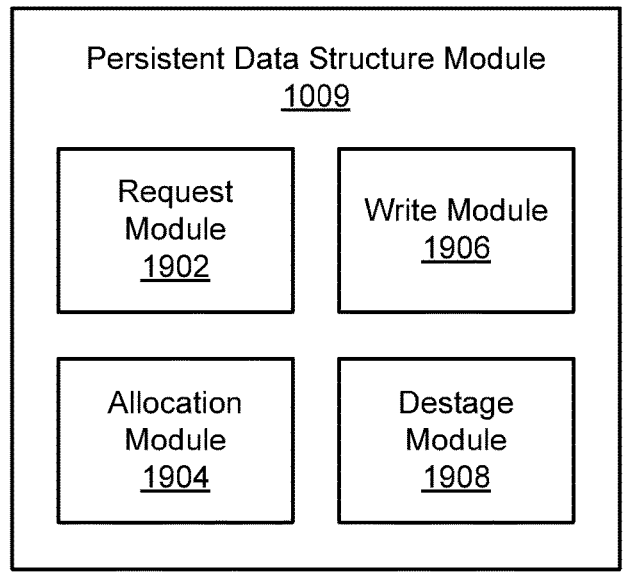
FIG. 10A is a schematic block diagram illustrating one embodiment of a persistent data structure module.

FIG. 10A depicts one embodiment of a persistent data structure module 1009. The persistent data structure module 1009, in certain embodiments, may be substantially similar to the various embodiments of the persistent data structure module 1009 described above. In other embodiments, the persistent data structure module 1009 may include, may be integrated with, and/or may be in communication with the storage management module 1050, the storage controller 1004, 1104, 1304, and/or the commit agent 1020.

In general, the persistent data structure module 1009 services persistent data structure requests from an ACM user 1016 or other client for the ACM 1011, in cooperation with a file system such as the file system module 1558, or the like. As described above with regard to the ACM users 1016, as used herein, a client may comprise one or more of an application, operating system (OS), virtual operating platform (e.g., an OS with a hypervisor), guest OS, database system, process, thread, entity, utility, user, or the like, that is configured to access or use the persistent data structure module 1009 and/or the ACM 1011. In the depicted embodiment, the persistent data structure module 1009 includes a request module 1902, an allocation module 1904, a write module 1906, and a destage module 1908.

The persistent data structure module 1009, in certain embodiments, provides an interface whereby an application or other client may access persistent data structures stored in the byte addressable ACM buffers 1013 and/or the non-volatile memory medium 110, whether the ACM buffers 1013 are natively volatile or non-volatile, regardless of the type of media used for the ACM buffers 1013, regardless of whether the data structures are stored in the ACM buffers 1013, the non-volatile memory medium 110, or a combination of both the ACM buffers 1013 and the non-volatile memory medium 110. As described above, the volatile memory modules (e.g., the ACM buffers 1013) of the ACM 1011 may be byte addressable, write-in-place, volatile memory modules or devices, while the non-volatile memory medium 110, 1110, 1502 may be block addressable, using the block device interface 1520 described above or the like.

Instead of or in addition to the above methods of accessing the ACM 1011, such as using a memory map (e.g., mmap) interface, in certain embodiments, the persistent data structure module 1009 may use the ACM 1011 to expose persistent data structures to applications or other clients using an API, shared library, file system namespace or other persistent logical identifiers, or the like as described above.

The persistent data structure module 1009, in certain embodiments, may bypass one or more operating system and/or kernel layers, which may otherwise reduce performance of the ACM 1011, complicate access to persistent data structures, or the like, increasing access times, introducing delays, or the like. The persistent data structure module 1009 may provide access to persistent data structures using an existing I/O interface or namespace, such as a standard read/write API, a file system namespace, a LUN namespace, or the like or may provide a custom persistent data structure interface.

As described above, in certain embodiments, the persistent data structure module 1009 and/or the ACM 1011 enable clients such as the ACM users 1016 to access persistent data structures using fast, byte-addressable, persistent memory, combining benefits of volatile memory and non-volatile storage for persisting data structures. Auto-commit logic inside the hardware of the storage device 102, such as the auto-commit memory 1011 described above with regard to FIG. 1, in certain embodiments, provides power-cut protection for data structures written to the auto-commit buffers 1013 of the ACM 1011. The persistent data structure module 1009 and/or its sub-modules, in various embodiments, may at least partially be integrated with a device driver executing on the processor 1012 of the host computing device 1014 such as the storage management module 1050, may at least partially be integrated with a hardware controller 1004, 1104 of the ACM 1011 and/or non-volatile storage device 1102, as microcode, firmware, logic circuits, or the like, or may be divided between a device driver and a hardware controller 1004, 1104, or the like.

In one embodiment, the request module 1902 is configured to monitor, detect, intercept, or otherwise receive requests for persistent data structures from applications or other clients, such as the ACM users 1016 described above, another module, a host computing device 1014, or the like. The request module 1902 may receive data requests over an API, a shared library, a communications bus, the SML interface 1019, or another interface. As used herein, a data request may comprise a storage request, a memory request, a file request, a persistent data structure request, an auto-commit request, or the like to access a data structure, such as the open, write/append, synchronize, close, map, and allocation persistent data structure requests described below.

The request module 1902 may receive data requests using an existing or standard I/O interface, such as read and write requests over the block device interface 1520, load and store commands over the memory semantic interface 1522, file system requests from the file system module 1558, a custom persistent data structure interface, or the like. By using the auto-commit buffers 1013 to support persistent data structure requests or commands, in certain embodiments, the request module 1902 may allow applications or other clients to access the ACM 1011 for persistent data structures transparently, with little or no knowledge of the underlying tiers of ACM 1011, non-volatile memory medium 110, or the like. For example, an application or other client may send persistent data structure requests to the request module 1902 with little or no knowledge of whether the persistent data structure module 1009 services or satisfies the request using the auto-commit buffers 1013 or the non-volatile memory media 1110, while receiving the benefit of both. The request module 1902 may intercept or otherwise receive data requests using an existing or standard interface, using a filter driver, overloading an interface, using LD PRELOAD, intercepting or trapping a segmentation fault, using an IOCTL command, using a custom persistent data structure interface, or the like.

As described below with regard to the allocation module 1904, in certain embodiments, a persistent data structure may be associated with a persistent logical identifier. Accordingly, a persistent data structure request may include a persistent logical identifier of the associated persistent data structure. A logical identifier, in one embodiment, is a member of a namespace. As used herein, a namespace comprises a container or range of logical or physical identifiers that index or identify data, data locations, data structures, or the like. As described above, examples of namespaces may include a file system namespace, a LUN namespace, a logical address space, a storage namespace, a virtual memory namespace, a persistent ACM namespace, a volatile memory namespace, an object namespace, a network namespace, a global or universal namespace, a BAR namespace, or the like.

A logical identifier may indicate a namespace to which a data structure belongs. In one embodiment, a logical identifier may comprise a file name or other file identifier and/or an offset from a file system namespace, a LUN ID and an offset from a LUN namespace, an LBA or LBA range from a storage namespace, one or more virtual memory addresses from a virtual memory namespace, an ACM address from a persistent ACM namespace, a volatile memory address from a volatile memory namespace of the host device 1014, an object identifier, a network address, a GUID, UUID, or the like, a BAR address or address range from a BAR namespace, or another logical identifier. In a further embodiment, a logical identifier may comprise a label or a name for a namespace, such as a directory, a file path, a device identifier, or the like. In another embodiment, a logical identifier may comprise a physical address or location for a data structure. As described above, certain namespaces, and therefore namespace identifiers, may be temporary or volatile, and may not be available to an ACM user 1016 or other client after a restart event. Other namespaces, and associated logical identifiers, may be persistent, such as a file system namespace, a LUN namespace, a persistent ACM namespace, or the like, and data structures associated with the persistent namespace may be accessible to an ACM user 1016 or other client after a restart event using the persistent logical identifier.

The request module 1902, in one embodiment, may receive an open request from a client to open or initialize a persistent data structure. In a further embodiment, the request module 1902 may receive a write request (e.g., for a transaction log data structure, an append request) from a client to write and/or append data to a persistent data structure, using the ACM buffers 1013 or the like. The request module 1902, in another embodiment, may receive a synchronize request, a destage request, or the like to trigger copying, destaging, transferring, migrating, or synchronization of a data structure from an ACM buffer 1013 to the non-volatile memory medium 110. The request module 1902, in one embodiment, may receive a close request from a client to close, lock, delete, clear, or otherwise finish a data structure. In a further embodiment, the request module 1902 may receive a map request to map a region of ACM 1011 (e.g., one or more ACM buffers 1013, pages, cache lines, memory locations, ranges of memory locations, or the like) into virtual memory of the client on the host device 1014. The request module 1902, in another embodiment, may receive an allocation request to allocate one or more regions of the ACM 1011 for storing a data structure, a portion of a data structure, or the like.

The request module 1902, in certain embodiments, may receive persistent data structure requests in user-space. As used herein, kernel-space may comprise an area of memory (e.g., volatile memory, virtual memory, main memory) of the host computing device 1014; a set of privileges, libraries, or functions; a level of execution; or the like reserved for a kernel, operating system, or other privileged or trusted processes or applications. User-space, as used herein, may comprise an area of memory (e.g., volatile memory, virtual memory, main memory) of the host computing device 1014; a set of privileges, libraries, or functions; a level of execution; or the like available to untrusted, unprivileged processes or applications.

Due to access control restrictions, privilege requirements, or the like for kernel-space, providing a device driver, library, API, or the like for the ACM 1011 in kernel-space may have greater delays than in user-space. Further, use of a storage stack of a kernel or operating system, in certain embodiments, may introduce additional delays. An operating system or kernel storage stack, as used herein, may comprise one or more layers of device drivers, translation layers, file systems, caches, and/or interfaces provided in kernel-space, for accessing a data storage device. The persistent data structure module 1009, in certain embodiments, may provide direct access to persistent data structures and/or to the ACM 1011 by bypassing and/or replacing one or more layers of an operating system or kernel storage stack, reading and writing data structures directly between the ACM buffers 1013 and/or the non-volatile memory medium 110 and user-space or the like. In a further embodiment, the request module 1902 may receive persistent data structure requests in user-space from user-space applications or other clients and in kernel-space from kernel-space applications or other clients.

In one embodiment, the allocation module 1904 is configured to initialize or open a new persistent data structure (e.g., a persistent transaction log). For example, the allocation module 1904 may initialize or open a persistent data structure in response to a request received by the request module 1902, such as an open request or the like. The allocation module 1904, in certain embodiments, may associate a logical identifier with an opened or initialized persistent data structure. For example, the allocation module 1904 may cooperate with the file system module 1558 to assign a filename to a persistent data structure, may cooperate with the storage management module 1050 to assign a range of logical identifiers such as LBAs to a persistent data structure, may cooperate with the auto-commit memory module 1011 to assign a persistent ACM identifier to a persistent data structure, or the like. In certain embodiments, the request module 1902 may receive a logical identifier, such as a filename, a range of LBAs, a LUN ID, or the like for a persistent data structure as a parameter of an open request, or the like. In a further embodiment, the allocation module 1904, the file system module 1558, the storage management module 1050, the auto-commit memory module 1011, or the like may assign a next available logical identifier to a persistent data structure or may use another predetermined or known method to assign a logical identifier.

The allocation module 1904, in one embodiment, may allocate a region of memory of the auto-commit memory module 1011 for storing a persistent data structure. As used herein, a region of memory may comprise a memory page, a memory buffer, a range of memory addresses, a memory element, a memory module, and/or another subset of one or more ACM buffers 1013 available to the auto-commit memory module 1011. In one embodiment, the allocation module 1904 may allocate a region of memory of the ACM buffers 1013 for each requested persistent data structure. In a further embodiment, the allocation module 1904 may cooperate with the auto-commit memory module 1011 to dynamically allocate available memory of the ACM buffers 1013, allocating memory to persistent data structures as they are accessed, based on a frequency of access, a most recent access, an access history, an input rate or write rate, or the like for the different persistent data structures.

In one embodiment, the write module 1906 is configured to receive, retrieve, transfer, or otherwise process input data from a client for writing, updating, or appending to a persistent data structure. For example, a write request or append request received by the request module 1902 may include or reference data to be written or appended to a persistent data structure identified by the request, which the write module 1906 may use to write the data to the ACM buffers 1013. In one embodiment, the write module 1906 may write data of write requests to the ACM buffers 1013 itself. In another embodiment, the write module 1906 may monitor one or more regions of the ACM buffers 1013 or may receive an alert/notification that a client has written data to the one or more regions of the ACM buffers 1013, or the like.

Depending on the type of persistent data structure, different data operations may be acceptable or supported. For example, in certain embodiments, a persistent transaction log may be strictly append only, while entries in a persistent linked-list may be overwritten, or the like. In one embodiment, a write request may indicate where in a persistent data structure the associated data is to be written (e.g., to which node, field, row, column, entry, or the like). In other embodiments, a location for data may be defined by a rule, definition, or schema for a type of persistent data structure, such as an append-only persistent transaction log or the like. A write request, append request, or the like, in one embodiment, may include data structure metadata to be written with the associated write data (e.g., a timestamp, a sequence number, a label, an identifier, a pointer, or the like. In another embodiment, the write module 1906 may determine data structure metadata to be written with associated write data based on a state of a persistent data structure, based on metadata for a persistent data structure from the metadata module 1912, by incrementing a pointer, a sequence number, or an identifier for a persistent data structure, or the like.

The write module 1906, in certain embodiments, may write data to a data structure, store data in a data structure, append data to a data structure, or the like by writing or storing the data into a region of the ACM buffers 1013, which may guarantee or ensure persistence of the data should a failure condition or restart event occur. In certain embodiments, if a persistent data structure has not been allocated a memory region in the ACM buffers 1013 or the like, the write module 1906 may write data of a persistent data structure to the non-volatile memory medium 110, 1110, 1502. In other embodiments, the write module 1906 may cooperate with the allocation module 1904 and/or the auto-commit memory module 1011 to allocate a memory region of the ACM buffers 1013 to a persistent data structure in response to a write request, an append request, or the like for the persistent data structure.

The write module 1906 may cooperate with the metadata module 1912, the file system module 1558, the storage management module 1050, and/or the auto-commit memory module 1011 to update logical-to-physical mappings, file system metadata, or the like for one or more logical identifiers of an updated persistent data structure, as described below with regard to the metadata module 1912. For example, in response to an append request for a persistent transaction log, the write module 1906 and/or the metadata module 1912 may extend a file length associated with a file of the persistent transaction log by the file system module 1558, add an entry in a logical-to-physical mapping structure mapping a range of LBAs for the updated data to a location in the ACM buffers 1013 storing the data, increment a pointer identifying an append point of the persistent transaction log, or the like.

To provide the fast write times of the ACM buffers 1013 to applications or other clients writing to persistent data structures, even with relatively small amounts or capacities of ACM buffers 1013, in one embodiment, the write module 1906 may cooperate with the destage module 1908 described below to use memory regions of the ACM buffers 1013 as a ring buffer, a ping-pong buffer, a rolling buffer, a sliding window, or the like, alternating between different memory regions of the ACM buffers 1013 for writing data of a persistent data structure, while the destage module 1908 destages, copies, or transfers data from a memory region not being written to. In this manner, the write module 1906 may reuse or overwrite a region of memory of the ACM buffers 1013 only after the destage module 1908 has already destaged, copied, transferred, committed, or otherwise persisted the previously written data, providing efficient use of the ACM buffers 1013 while still ensuring persistence.

In certain embodiments, the write module 1906 may receive data from a client and/or may write data at a different rate than the destage module 1908 destages, copies, or transfers data to the non-volatile memory media 110, 1110, 1502. As used herein, an input rate comprises a rate at which the write module 1906 receives and/or writes data for one or more persistent data structures. A transfer rate, as used herein, comprises a rate at which the destage module 1908 transfers, copies, cleans, moves, synchronizes, or otherwise destages data of one or more persistent data structures to the non-volatile memory medium 110, 1110, 1502. The write module 1906, in one embodiment, may cooperate with the destage module 1908 to limit the input rate for a persistent data structure based on the transfer rate for the persistent data structure, so that the write module 1906 does not overrun a region of memory allocated to the persistent data structure.

Because the input rate and the transfer rate may not be constant, in certain embodiments, the write module 1906 may limit the input rate so that over a predefined period of time, the input rate for a persistent data structure is at or below the transfer rate. The input rate, however, in certain embodiments, may exceed the transfer rate at a given moment in time, so long as the write module 1906 does not overrun a region of memory allocated to a persistent data structure. For example, the write module 1906 may limit an input rate based on an instantaneous transfer rate, a moving average of sampled transfer rates, an amount of memory remaining in an allocated memory region, or the like. The write module 1906, in various embodiments, may limit an input rate by blocking, delaying, throttling, governing, sleeping, or otherwise limiting a client process writing the data, or the like.

In one embodiment, the destage module 1908 is configured to destage data from the ACM buffers 1013 to the non-volatile memory medium 110, 1110, 1502, such as persistent data structure data that the write module 1906 has written to the ACM buffers 1013 as described above. The destage module 1908, in certain embodiments, cleans or destages data of the ACM buffers 1013 that the non-volatile memory medium 110, 1110, 1502 does not yet store, such as new data, updated data, or the like. A location for the data in the non-volatile memory medium 110, 1110, 1502, such as an LBA, a physical address, or the like, may be indicated by ACM metadata 1015 or other triggered commit metadata as described above. The destage module 1908, in certain embodiments, copies, transfers, destages, moves, or writes data from the ACM buffers 1013 to the non-volatile memory medium 110, 1110, 1502 itself, based on ACM metadata 1015, a dirty data bitmap, persistent data structure metadata from the metadata module 1912, or the like.

In a further embodiment, the destage module 1908 may cause data to be copied, transferred, destaged, moved, or written from the ACM buffers 1013 to the non-volatile memory medium 110, 1110, 1502, by triggering the auto-commit memory module 1011, a commit management apparatus 1122, a commit agent 1020, or the like to perform a commit action for the data identified or defined by ACM metadata 1015 for the data. For example, as described above, the auto-commit buffers 1013 may be armed with ACM metadata 1015 to perform a commit action for preserving or persisting stored data. The destage module 1908 may utilize this pre-arming for destaging, committing, or transferring data from the auto-commit buffers 1013 to the non-volatile memory medium 110, 1110, 1502. The destage module 1908, in certain embodiments, may comprise, be in cooperation with, or be integrated with the auto-commit memory module 1011, a commit management apparatus 1122, a commit agent 1020, or the like.

While the write module 1906, in certain embodiments, may operate as a foreground process, writing data or allowing data to be written to the ACM buffers 1013 in the foreground, the destage module 1908, in certain embodiments, may operate as a background process. For example, in one embodiment, the destage module 1908 may destage, copy, transfer, move, or synchronize data periodically, lazily, during system downtime, during a period of low traffic, or the like. In one embodiment, the destage module 1908 may destage, copy, transfer, move, or synchronize data in response to a trigger. The trigger may be the same or substantially similar to the trigger for a commit action described above with regard to the ACM metadata 1015. In a further embodiment, the write module 1906 may trigger the destage module 1908 based on an input rate, thereby controlling a transfer rate of the destage module 1908.

The destage module 1908, in another embodiment, may be triggered in response to an amount of data of a persistent data structure stored in a region of the ACM buffers 1013 exceeding a predefined threshold. For example, if the ACM buffers 1013 are organized into 4 KB pages, the destage module 1908 may be triggered in response to the write module 1906 filling a 4 KB page to destage, copy, transfer, or move the data from the 4 KB page to the non-volatile memory medium 110, 1110, 1502. In another embodiment, the destage module 1908 may be triggered in response to the write module 1906 writing an amount of data equal to a page size or other region size of the non-volatile memory medium 1906, based on an architecture of the non-volatile memory medium 1906 or the like. In a further embodiment, the destage module 1908 may be triggered periodically, in response to an elapsed time period since a previous trigger or the like. In one embodiment, the destage module 1908 may be triggered by a monitoring device or monitoring module associated with the memory of the ACM buffers 1013, such as the write module 1906, the auto-commit memory module 1011, or another module. In a further embodiment, the destage module 1908 may be triggered by a synchronization request, a destage request, or the like that the request module 1902 receives from a client. The destage module 1908, in further embodiments, may be triggered by another determined change in state, change in condition, factor, or attribute of memory of the one or more ACM buffers 1013.

The destage module 1908, in one embodiment, copies, transfers, moves, or destages data of a persistent data structure from the ACM buffers 1013 in a manner whereby the data is no longer stored in the ACM buffers 1013. For example, the destage module 1908 may erase or delete the data from the ACM buffers 1013 in response to storing the data in the non-volatile memory media 110, 1110, 1502. In another embodiment, the destage module 1908 may copy the data from the ACM buffers 1013 in a manner whereby a copy of the data remains in the ACM buffers 1013. For example, the destage module 1908 may allow the write module 1906 to overwrite the data in the ACM buffers 1013 once the destage module 1908 has stored the data in the non-volatile memory media 110, 1110, 1502, at a later time, as capacity of the ACM buffers 1013 is needed.

In one embodiment, the destage module 1908 may copy, destage, transfer, or write data from a memory region of the ACM buffers 1013 to the non-volatile memory medium 110, 1110, 1502 in a manner that preserves an association of the data with a logical identifier of the persistent data structure. For example, the destage module 1908 may write a filename, a range of logical addresses, or another logical identifier to the non-volatile memory medium 110, 1110, 1502 with the data, may update a logical-to-physical mapping structure with a new physical location for the data, may provide a new physical location for the data to the metadata module 1912, may update file system metadata indicating that the data is stored in the non-volatile memory medium 110, 1110, 1502, or the like. By ensuring that data remains associated with a persistent logical identifier, in certain embodiments, the destage module 1908 ensures that the persistent data structure remains accessible to a client using the persistent logical identifier.

In certain embodiments, the destage module 1908 transfers or destages an entire range or region of data regardless of whether a portion of the data may already be stored in the non-volatile memory medium 110, 1110, 1502. In another embodiment, the destage module 1908 may transfer or destage just dirty data, data that is not yet stored in the non-volatile memory medium 110, 1110, 1502, without transferring or destaging clean data that the non-volatile memory medium 110, 1110, 1502 already stores. In certain embodiments, the destage module 1908 transfers, copies, or destages data from one or more auto-commit buffers 1013 to another location, such as the non-volatile memory medium 110, 1110, 1502 or the like, that may have a larger capacity, a slower response time, or the like than the one or more auto-commit buffers 1013.

The destage module 1908 may determine, based on a synchronization or destage request, based on ACM metadata 1015, or the like whether the destination for data of a persistent data structure is within the non-volatile storage device 1102, in the non-volatile memory medium 110, 1110, 1502 or the like, and may transfer or destage the data internally within the non-volatile storage device 1102. For example, the destage module 1908 may determine whether a destination namespace or address space of the data of a synchronization or destage request is associated with the non-volatile storage device 1102, such as the non-volatile memory medium 110, 1110, 1502, based on a destination logical identifier for the data of the synchronization or destage request, and transfer or destage the data from the ACM buffers 1013 internally within the non-volatile storage device 1102 if the destination namespace or address space is associated with the non-volatile storage device 1102 (e.g., the data is being transferred, copied, or moved within the non-volatile storage device 1102, to another location in the ACM 1011, 1111, to the non-volatile memory media 110, 1110, 1502, or the like).

If the destination for data of a synchronization or destage request, a commit location indicated by ACM metadata 1015, or the like is not located in the non-volatile storage device 1102, the destage module 1908 may transfer or destage the data from the ACM 1011, 1111 to a location external to the non-volatile storage device 1102, using a PIO operation, a DMA operation, a $3^{rd}$ party DMA operation, an RDMA operation, a block device interface, an operating system storage stack, or the like, transferring the data over a system communications bus 1040, using a processor 1012 of the host device 1014, or the like. In response to transferring or destaging data of a destage request from one or more auto-commit buffers 1013 of the ACM 1011, 1111, the destage module 1908 may delete, remove, trim, invalidate, erase, or otherwise clear the data from the ACM 1011 and reuse the storage capacity associated with the data in the one or more auto-commit buffers 1013.

In one embodiment, prior to transferring or destaging data from the ACM 1011, the destage module 1908 may ensure consistency of the data (e.g., that data is flushed from a processor complex 1012 of the host device 1014 to the one or more auto-commit buffers 1013). For example, the destage module 1908 may issue a serializing instruction that flushes data from the processor complex 1012 to the one or more auto-commit buffers 1013, may place a destage identifier or other marker in the processor complex 1012 associated with the non-volatile storage device 1102 (e.g., storing the destage identifier or other marker to a virtual memory address mapped to a control status register or other predefined location within the non-volatile storage device 1102), may issuing a second serializing instruction to flush the destage identifier or other marker from the processor complex 1012, or the like. The destage module 1908 may transfer, destage, or otherwise write data from the ACM buffers 1013 to a destination location in response to receiving a destage identifier or other marker in the non-volatile storage device 1102, indicating successful completion of the first serializing instruction and consistency of the data to be destaged.

As described above with regard to the write module 1906, the destage module 1908 and the write module 1906 may cooperate to use two or more regions of the ACM buffers 1013 as a ring buffer, a ping-pong buffer, a rolling buffer, a sliding window, or the like, alternating between different memory regions of the ACM buffers 1013 for destaging data of a persistent data structure, while the write module 1906 writes data to a memory region from which the destage module 1908 is not currently destaging data, making efficient use of the ACM buffers 1013 while still ensuring persistence.

The destage module 1908 may cooperate with the write module 1906, as described above, to ensure that a transfer rate for a persistent data structure, for the ACM buffers 1013, or the like, at least on average or over time, matches or exceeds an input rate for the persistent data structure, for the ACM buffers 1013, or the like. The write module 1906, in various embodiments, may limit an input rate as described above. In certain embodiments, in addition to or instead of the write module 1906 limiting an input rate, the destage module 1908 may increase the transfer rate for a persistent data structure, in response to an increase in the input rate for the persistent data structure, or the like. The write module 1906 and/or the destage module 1908 may manage an input rate and/or a transfer rate for an individual persistent data structure, for a set of persistent data structures, for one or more regions of the ACM buffers 1013, for the entire ACM 1011, or at another granularity.

In one embodiment, the destage module 1908 may increase a transfer rate by increasing a quantity or size of data copied, transferred, or destaged from the ACM buffers 1013 to the non-volatile memory medium 110, 1110, 1502 at a time, in a single transaction, or the like. For example, the destage module 1908 may initially copy, transfer, or destage data a page at a time, and may increase a quantity or size of data to two pages, three pages, four pages, or the like over time in response to an increasing input rate. In a further embodiment, the destage module 1908 may increase a transfer rate by increasing a number of parallel destage processes or threads executing at a time to copy, transfer, or destage data. In certain embodiments, the destage module 1908 may increase both a transfer size and a number of parallel destage processes or threads to increase a transfer rate.

The manner in which the destage module 1908 increases a transfer rate, in certain embodiments, may depend on a magnitude of the input rate that the destage module 1908 is trying to track or match. For example, increasing a size quantity of data copied to the non-volatile memory medium 110, 1110, 1502 per transfer operation may be more effective for the destage module 1908 below a threshold input rate, transfer rate, or destage size but increasing a number of parallel transfer processes copying data may be more effective for the destage module 1908 above the threshold input rate, transfer rate, or destage size.

In certain embodiments, the destage module 1908 and/or the write module 1906 may manage an input rate and/or a transfer rate so that at least a predefined amount of extra or spare memory capacity remains for a persistent data structure, acting as padding or a buffer between the write module 1906 and the destage module 1908. For example, the write module 1906 and/or the destage module 1908 may manage an input rate and a transfer rate so that about one third of the allocated memory capacity remains as padding or a buffer, while about one third of the allocated memory capacity is used by the write module 1906 and one third of the allocated memory capacity is used by the destage module 1908, or the like. Depending on the architecture and transfer speeds of the ACM buffers 1013, of the non-volatile memory medium 110, 1110, 1502, or the like, other ratios may be more or less optimal and the write module 1906 and/or the destage module 1908 may manage the input rate and/or the transfer rate accordingly.

In certain embodiments, instead of managing the input rate and/or transfer rate for a persistent data structure, the destage module 1908 may allow the persistent data structure to become out of synchronization or transactionally inconsistent, until an owner or other client issues a synchronization request to the request module 1902. In such embodiments, the destage module 1908 may further destage, copy, or transfer data to manage an available storage capacity for the ACM buffers 1013, even if an owner or client of a persistent data structure has not sent a synchronization request. In this manner, in certain embodiments, an application or other client can write data to a persistent data structure as fast as they desire, up to architectural or physical constraints of the ACM buffers 1013, without the write module 1906 limiting the input rate, and may simply issue a synchronization request to the request module 1902 to synchronize or checkpoint the persistent data structure as desired.

Figure 10B:
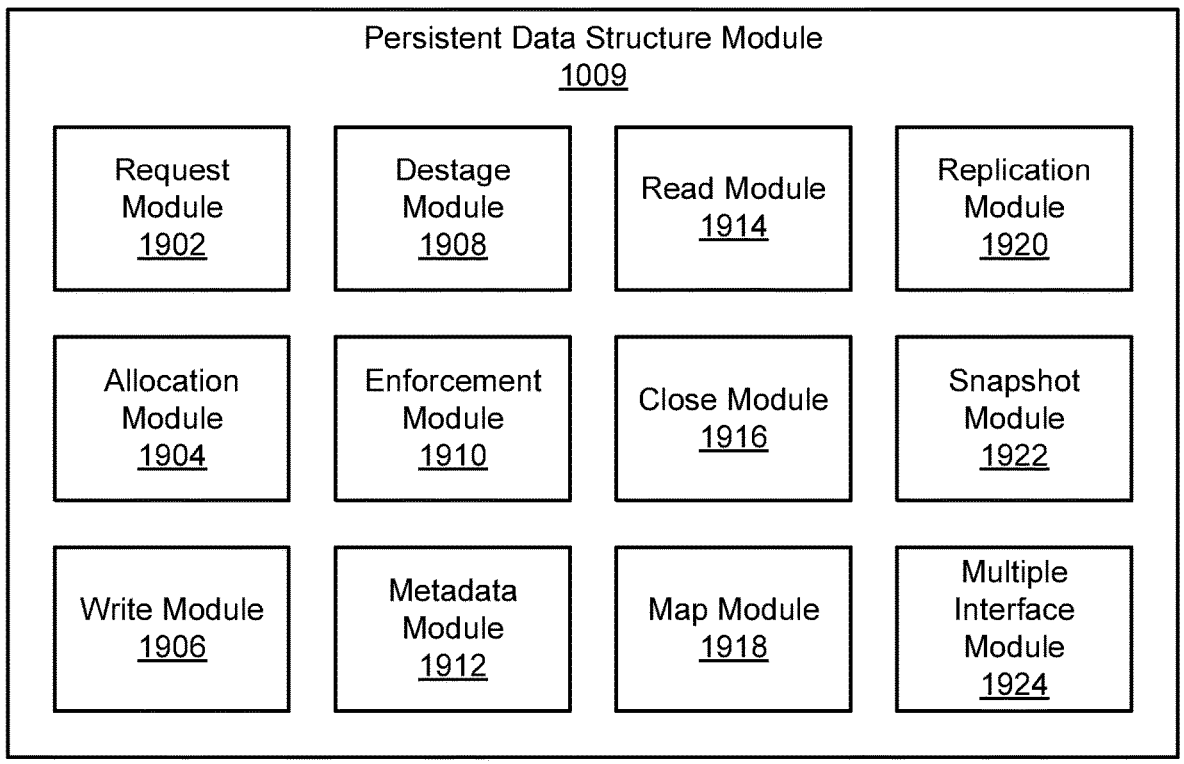
FIG. 10B is a schematic block diagram illustrating another embodiment of a persistent data structure module.

FIG. 10B depicts another embodiment of a persistent data structure module 1009. In one embodiment, the persistent data structure module 1009 may be substantially similar to one or more of the persistent data structure modules 1009 described above. In the depicted embodiment, the persistent data structure module 1009 of FIG. 10B includes a request module 1902, a write module 1906, a destage module 1908 and further includes an enforcement module 1910, a metadata module 1912, a read module 1914, a close module 1916, a map module 1918, a replication module 1920, a snapshot module 1922, and a multiple interface module 1924.

In one embodiment, the enforcement module 1910 is configured to enforce one or more rules for a persistent data structure and/or a persistent data structure type. For example, each different type of data structure may be defined or structured by a set of one or more rules, restrictions, definitions, or the like. The rules may define one or more allowed or acceptable data operations for a data structure. For a transaction log, the enforcement module 1910 may enforce one or more rules such as that entries must be sequential, that data entries may not be overwritten or updated once written, or the like. The enforcement module 1910 may enforce different rules for different types of data structures. For example, the enforcement module 1910 may enforce a strict FIFO rule for a persistent queue data structure, may enforce a strict LIFO rule for a persistent stack data structure, may enforce a strict order or hierarchy for data entries or nodes for a persistent tree data structure, may enforce a rule requiring certain data types or required fields or entries for a certain persistent data structure, or the like.

The enforcement module 1910, in one embodiment, cooperates with the request module 1902 to provide an interface, such as an API, a shared library, a communications protocol, or the like that enforces or requires satisfaction of one or more rules for a persistent data structure. For example, the enforcement module 1910 and the request module 1902, instead of supporting a write request with parameters for a logical identifier and an offset to which data is to be written relative to the logical identifier, may support an append request for a persistent transaction log with a logical identifier parameter but without an offset or address parameter, so that the write module 1906 appends the data to the identified persistent transaction log, and no offset or address within the persistent transaction log may be specified, enforcing the rules of the persistent transaction log. In this manner, the enforcement module 1910 may enforce one or more rules for a persistent data structure passively, by way of an interface.

In embodiments where the persistent data structure comprises a persistent queue and/or persistent stack, the write module 1906 may write data for a first end of the persistent data structure (e.g., a back or tail for a queue, a front or head for a stack, or the like) to volatile memory of one or more ACM buffers 1013. The destage module 1908 may destage, copy, or transfer data of the persistent data structure to the non-volatile memory medium 110, 1110, 1510. For example, for a persistent queue, a middle section between the ends of the persistent queue may be stored in the non-volatile memory medium 110, 1110, 1510. For a persistent stack, all but one or more data elements toward the head or front of the stack may be stored in the non-volatile memory medium 110, 1110, 1510. The read module 1914 may load or copy the next data to be accessed from the non-volatile memory medium 110, 1110, 1510 into volatile memory (e.g., an ACM buffer 1013, host memory of the host device 1014) in anticipation for access of the data structure by an ACM user 1016.

For example, for a persistent queue, the read module 1914 may read data of the front or head of the queue from the non-volatile memory medium 110, 1110, 1510 and load or store the data in an ACM buffer 1013, in volatile memory of the host device 1014, or the like. For a persistent stack, the destage module 1908 may leave one or more most recent data elements (e.g., a front or head of the stack) in the ACM buffers 1013, or the read module 1914 may load the front or head of the stack from the non-volatile memory medium 110, 1110, 1510 if the destage module 1908 has already destaged the one or more most recent data elements. In this manner, in certain embodiments, the one or more ACM buffers 1013 may be used to store data written to and read from a persistent queue, persistent stack, or other persistent data structure, while other data of the persistent data structure is stored in the non-volatile memory medium 110, 1110, 1510.

For a persistent queue data structure, the enforcement module 1910, as described below, may enforce one or more rules for the persistent queue, such as enforcing that the queue be sequential and append-only, requiring that data be written only to a first end (e.g., a back or tail) of the queue data structure, that data be read only from a second end (e.g., a front or head) of the queue data structure, so that the persistent queue remains a FIFO data structure. For a persistent stack data structure, the enforcement module 1910 may enforce a rule requiring that data be written to and read from the same end (e.g., a front or head) of the stack, so that the persistent stack remains a LIFO data structure.

In certain embodiments, each data element or node of a persistent data structure may be associated with a priority, which may be assigned by an ACM user 1016 or the like, so that the persistent data structure comprises a priority queue, a priority stack, or the like. For a persistent priority queue, the read module 1914 may load data for access by an ACM user 1016 or other client in a highest-to-lowest priority order. The read module 1914 may load data for access by an ACM user 1016 or other client in a lowest-to-highest priority order. The enforcement module 1910 may enforce a highest-to-lowest access order for a persistent priority queue, may enforce a lowest-to-highest priority order for a persistent priority stack, or the like.

In certain embodiments, the enforcement module 1910 may enforce one or more rules for a persistent data structure by actively blocking, intercepting, or stopping execution of requests or operations that violate the one or more rules. For example, the enforcement module 1910 may actively monitor a region of memory allocated to a persistent transaction log, and may actively block or otherwise prevent writes to anywhere but a location of an append point, so that data may not be overwritten. In one embodiment, the enforcement module 1910 may enforce one or more rules or definitions for a persistent data structure using a combination of both passive interface definitions and active blocking. For example, the enforcement module 1910 may cooperate with the request module 1902 to provide an append-only interface for a persistent transaction log, and may actively block or prevent overwriting data of the persistent transaction log using a different interface, such as the block device interface 1520, the memory semantic interface 1522, or the like. In this manner, the enforcement module 1910 may prevent an application or other client from inadvertently or accidentally overwriting or otherwise violating the integrity of a persistent data structure, ensuring that the persistent data structure satisfies the data structure's strict definition, rules, or the like.

In one embodiment, the metadata module 1912 maintains and/or provides access to metadata tracking which data of one or more persistent data structures is stored in or resides in volatile memory of the ACM buffers 1013 and which data is stored in or resides in the non-volatile memory medium 110, 1110, 1502. For example, the metadata module 1912 may maintain a clean/dirty bitmap, table, or other data structure indicating which data is stored in the ACM buffers 1013 but not yet stored by the non-volatile memory medium 110, 1110, 1502, using flags or other indicators representing a state of the associated data. In a further embodiment, the metadata module 1912 may track which data is stored in the ACM buffers 1013 and which data is stored in the non-volatile memory medium 110, 1110, 1502 using one or more logical-to-physical mapping structures, mapping logical identifiers for persistent data structures to physical locations in either the ACM buffers 1013 or the non-volatile memory medium 110, 1110, 1502. For example, the metadata module 1912 may cooperate with the file system module 1558 to maintain file system metadata tracking or mapping file names and offsets to locations in one or more of the ACM buffers 1013 and the non-volatile memory medium 110, 1110, 1502, may cooperate with the storage management module 1050 to maintain a logical-to-physical mapping structure tracking or mapping logical addresses such as LBAs to physical locations in one or more of the ACM buffers 1013 and the non-volatile memory medium 110, 1110, 1502, or the like.

The metadata module 1912 may update the metadata in response to the write module 1906, a client, or the like writing data to the ACM buffers 1013, in response to the destage module 1908 destaging, cleaning, copying, writing, or otherwise storing data from the ACM buffers 1013 to the non-volatile memory medium 110, 1110, 1502, or the like. The metadata module 1912, in certain embodiments, may scan or process data in the non-volatile memory medium 110, 1110, 1502 during recovery from a restart event, a failure condition, or the like to reconstruct lost metadata, repair damaged metadata, or the like, so that logical-to-physical mappings are accurate and so that the request module 1902, the write module 1906, the read module 1914, the file system module 1558, and/or the storage management module 1050, may provide access to persistent data structures after the restart event, using data the ACM 1011 committed or flushed to the non-volatile memory medium 110, 1110, 1502 in response to detecting the restart event, the failure condition, or another trigger.

The allocation module 1904, the write module 1906, the destage module 1908, the read module 1914, the close module 1916, the map module 1918, the file system module 1558, and/or the storage management module 1050 may be configured to satisfy or fulfil one or more requests for a persistent data structure, even if the persistent data structure includes data stored both in volatile memory of the ACM buffers 1013 and in the non-volatile memory medium 110, 1110, 1502, based on metadata from the metadata module 1912 indicating one or more locations for the persistent data structure based on a logical identifier associated with the data.

In one embodiment, the read module 1914 provides data of a persistent data structure to a requesting client. The read module 1914 may copy or load a persistent data structure or a requested portion of the persistent data structure into an ACM buffer 1013 mapped into virtual memory of a client on the host device 1014, directly into volatile memory of the host device 1014 itself, may provide a persistent data structure or portion thereof over the block device interface 1520, the memory semantic interface 1522, the SML API 1019, a persistent data structure interface, or the like. The read module 1914, in certain embodiments, may provide access to a persistent data structure residing in both volatile memory of the ACM buffers 1013 and in the non-volatile memory medium 110, 1110, 1502 by looking up a logical identifier for the persistent data structure in metadata from the metadata module 1912, and retrieving the different portions of the persistent data structure to provide to a requesting client.

In one embodiment, the close module 1916 is configured to close a persistent data structure in response to the request module 1902 receiving a close request for the persistent data structure from a client. Closing a persistent data structure, in one embodiment, comprises locking the persistent data structure, rendering it read-only. In another embodiment, the close module 1916 may close a persistent data structure by invalidating, deleting, erasing, trimming, removing, or otherwise clearing the data of a persistent data structure from the ACM buffers 1013 and/or the non-volatile memory medium 110, 1110, 1502. The close module 1916 may check metadata maintained by the metadata module 1912, using a logical identifier from a close request for a persistent data structure, to determine locations for the persistent data structure being closed in the ACM buffers 1013 and/or the non-volatile memory medium 110, 1110, 1502. In embodiments where the close module 1916 invalidates or marks data of a closed persistent data structure for deletion, a separate garbage collection or storage capacity recovery process may reclaim storage capacity of the closed persistent data structure at a later time.

In one embodiment, the map module 1918 is configured to map one or more regions of the ACM buffers 1013 into virtual memory of a client on the host device 1014, in response to the request module 1902 receiving a map request from the client. In certain embodiments, the map module 1918 may map a region of the ACM buffers 1013 associated with a persistent data structure into virtual memory to provide access to the persistent data structure. In certain embodiments, the map module 1918 may map a file of a persistent data structure into virtual memory, in cooperation with the file system module 1558 or the like, using memory mapped file I/O in response to a map request from a client with a file name or other logical identifier for the persistent data structure. A variety of memory mapping technologies, such as MMIO, port I/O, PMIO, memory mapped file I/O, and the like are described above whereby the ACM 1011 may be accessed. The map module 1918 may use one or more of these or other memory mapping technologies to provide memory semantic access to a persistent data structure.

In one embodiment, the replication module 1920 copies or replicates data, such as a persistent data structure, from one ACM 1011 device to another ACM 1011 device, such as the ACM 1011A and ACM 1011B described above with regard to FIG. 4. The replication module 1920 may copy or replicate data between ACM 1011 devices over an internal and/or external network interface 1040.

For example, in one embodiment, the replication module 1920 may transfer, copy, or replicate data between ACM 1011 devices installed on or in communication with the same host computing device 1014, over a system bus 1040 network interface, such as a serial bus, a parallel bus, a peripheral component interconnect (PCI) interface, a PCI express (PCIe) interface, a universal serial bus (USB), a small computer system interface (SCSI), an advance technology attachment (ATA) interface (e.g., serial ATA (SATA), parallel ATA (PATA)), or the like. In another embodiment, the replication module 1920 may transfer, copy, or replicate data between ACM 1011 devices installed on or in communication with different host computing devices 1014, over an external network interface 1040, such as a local area network (LAN), a wide area network (WAN), a storage area network (SAN), an Ethernet protocol network interface, a fibre channel network interface, or the like.

In certain embodiments, each ACM 1011 comprises a host adapter or network interface controller (NIC) for communicating data over a network interface 1040, so that the replication module 1920 may replicate or copy data between the ACM 1011 devices directly, independently of a CPU 1012 and volatile memory of a host computing device 1014, so that the replicated or copied data does not pass through the CPU 1012 or volatile memory of the host computing device 1014. Replicating or copying data directly between ACM 1011 devices directly, in certain embodiments, may have lower system overhead for the CPU 1012 and/or volatile host memory of the host computing device 1014 than a data transfer using the CPU 1012 and/or volatile host memory.

As described above, the ACM 1011 may support byte level, memory semantic access to the ACM buffers 1013. The replication module 1920, in one embodiment, replicates or copies data at a byte level granularity from one or more volatile ACM buffers 1013 of a first ACM 1011 device to one or more volatile ACM buffers 1013 of a second ACM 1011 device. In a further embodiment, the replication module 1920 may copy or replicate data at a page level granularity from one or more volatile ACM buffers 1013 of a first ACM 1011 device to one or more volatile ACM buffers 1013 of a second ACM 1011 device. In other embodiments, the replication module 1920 may replicate or copy data between ACM buffers 1013 of different ACM 1011 devices at one or more other granularities, such as a bit level, a byte level, an ECC codeword level, a page level, a file level, a full ACM buffer 1013 level, or other level of granularity.

In certain embodiments, the replication module 1920 replicates or copies one or more persistent data structures, mirroring the one or more persistent data structures between two ACM 1011 devices. In this manner, the replication module 1920 may make a persistent data structure available and accessible to different applications or other ACM users 1016 on different host computing devices 1014 or the like. For example, as described above with regard to the file system module 1558, a persistent data structure may be available to ACM users 1016 as a file, which may be stored in a combination of one or more ACM buffers 1013 and/or the non-volatile storage media 110, 1110, 1310, 1502. A persistent data structure or other data copied or replicated by the replication module 1920 may, in cooperation with the file system module 1558, be available as a file in a file system from multiple ACM 1011 devices on multiple host computing devices 1014.

Each ACM device 1011 that stores a replicated copy of a persistent data structure or other data may independently ensure persistence of the persistent data structure or other data as described above (e.g., maintain ACM metadata 1015, perform a triggered commit action, copy or destage data to a non-volatile memory medium 110, 1110, 1310, 1502 in response to a trigger, or the like). The replication module 1920, in one embodiment, may copy or replicate data synchronously, in response to a write request or other update for the data. For example, the replication module 1920 may copy or replicate each byte of data written to a persistent data structure, or the like, from a first ACM 1011 device to a second ACM 1011 device. In a further embodiment, the replication module 1920 may copy or replicate data asynchronously, at predefined intervals, in response to receiving a predefined amount of data (e.g., filling an ACM buffer 1013 or the like), during a low-peak or low-load time, in response to a restart event, or in response to another trigger or at another granularity. Each of the different ACM 1011 devices may be within a different isolation zone 1301 for each associated non-volatile storage device 102, 1102, 1502 to independently preserve separate copies of replicated data.

In one embodiment, the snapshot module 1922 preserves a snapshot copy, checkpoint, or state of data in association with a barrier operation, so that a consistent, synchronous state is preserved for an ACM user 1016 to access at a later time, such as after recovery from a restart event or the like. The snapshot module 1922 is described in greater detail below with regard to FIG. 14.

As described above, a CPU or processor complex 1012 may lazily flush or destage data from a processor cache to the underlying memory or storage media, and may not guarantee or enforce an order for data, data operations, or the like. This means that the ACM 1011 may receive data or data operations in a different order than an order in which the data was originally written. The snapshot module 1922, in response to a request from an ACM user 1016 or other client, may perform a barrier operation, synchronization operation, or the like to flush data from the processor complex 1012 to the ACM 1011. Once the barrier operation is complete, the snapshot module 1922 may preserve a snapshot copy or checkpoint of data (e.g., a page of data, an ACM buffer 1013 of data, a file, all data of the ACM 1011, or another segment or region of data) before the CPU or processor complex 1012 may destage or copy any subsequent data to the ACM 1011 causing it to become un-synchronized. The snapshot module 1922 may operate in hardware, as part of a hardware controller 104, 1004, 1104, 1304 for the ACM 1011 or the like, so that it may preserve a snapshot copy or checkpoint with minimal delay or impact on subsequent data operations for the ACM 1011.

For example, in one embodiment, the snapshot module 1922 may dynamically switch which page or which ACM buffer 1013 is being used for data operations in response to completion of a barrier operation. In certain embodiments, the snapshot module 1922 may maintain or create a second, spare, "hot" copy of a page of data of the ACM buffers 1013 and may switch data operations to the second page of data in response to completion of a barrier operation for the first page of data, preserving the first page of data as a snapshot copy or checkpoint until the first page of data may be destaged or copied from the ACM buffers 1013 to the non-volatile memory medium 110, 1110, 1502. In a further embodiment, the snapshot module 1922 may switch data operations to a blank or empty page of the ACM buffers 1013 in response to completion of a barrier operation for a first page of data, writing or storing updates to the first page of data in the blank or empty page after completion of the barrier operation. By switching pages, ACM buffers 1013, or the like dynamically within hardware, in certain embodiments, the snapshot module 1922 may create a snapshot copy or checkpoint very quickly, under a microsecond or the like, instead of using a longer, more complicated backup process.

The snapshot module 1922, in certain embodiments, may cooperate with a commit agent 1020 to make a most recent snapshot copy or checkpoint of data available to an ACM user 1016 after a restart event, so that the ACM user 1016 has a consistent, synchronized version of the data, even if certain inconsistent updates or changes to the data performed after the most recent snapshot copy was created, may be lost. In other embodiments, a commit agent 1020 may provide an ACM user 1016 with a most recent or current version of data, even if the version may be inconsistent or unsynchronized. An ACM user 1016, in certain embodiments, may selectively determine which version, which snapshot copy or checkpoint, or the like to access after a restart event, based on a request to a commit agent 1020, a request parameter, or another interface.

In one embodiment, the multiple interface module 1924 is configured to manage write ordering or barrier functionality (e.g., serialization) for two or more different write ordering interfaces, such as the memory bus interface 1038 and the peripheral bus interface 1040 or the like. As described above, in various embodiments, the ACM 1011 (e.g., volatile ACM buffers 1013 and/or a non-volatile memory medium 110, 1110, 1510) may be disposed or located on a peripheral bus 1040, such as a PCI bus, a PCIe bus, or another peripheral bus, or the ACM 1011 may be disposed or located on a memory bus 1038 for a processor complex 1012 or the like. In other embodiments, the ACM 1011 may use a block device interface 1520, a memory semantic interface 1522, or another type of interface. The ACM buffers 1013, as described above, whether disposed on a peripheral bus 1040 or a memory bus 1038, may comprise volatile memory, non-volatile memory, or both.

In order to support barrier operations for ACM 1011 which may be disposed on multiple types of interfaces, a device driver, a storage controller 104, 1004, 1104, 1304, the SML 1050, or the like may support barrier operations, synchronization operations, or the like for multiple types of interfaces (e.g., a memory bus interface 1038, a peripheral bus interface 1040, a block device interface 1520, a memory semantic interface 1522). In this manner, the same device driver, storage controller 104, 1004, 1104, 1304, and/or SML 1050 may be used for ACM 1011 which may be configured differently, installed in different locations relative to the CPU 1012, or the like, with little or no modification.

For example, one make, model, or type of ACM 1011 may be installed on a memory bus 1038 which connects the main memory to the memory controller while another make, model, or type of ACM 1011 may be installed on a storage or peripheral bus 1040 and the multiple interface module 1924 may support barrier, synchronization, or serialization operations over either a memory bus 1038 or a peripheral bus 1040. One interface may be a synchronous interface while another interface may be an asynchronous interface, and the multiple interface module 1924 may support both synchronous and asynchronous interfaces. In a further embodiment, a processor complex 1012 may use different commands or operations for serializing or flushing data over different interfaces, such as the memory bus interface 1038 and the peripheral bus interface 1040.

As used herein, a different command or operation may include commands or operations with different identifiers, codes, and/or names or similar command or operations using different parameters. For example, in one embodiment, the multiple interface module 1924 may use one command or operation for a first interface 1038 and a second command or operation for a second interface 1040, such as a cache line flush (CLFLUSH) instruction, an MFENCE instruction, an SFENCE instruction, an LFENCE instruction, an xchg instruction (e.g., compare and swap, compare and swap double, CMPXCHG, CMPXCHNG8B, CMPXCHNG16B, and/or CMP8XCHG16), or the like. In a further embodiment, the multiple interface module 1924 may use the same command or operation for serializing or flushing data over both the memory bus 1038 and the peripheral bus 1040, but with different addresses or identifiers for the different busses 1038, 1040. The multiple interface module 1924 is described in greater detail below with regard to FIG. 15.

As described above, once data has been stored in the auto-commit buffers 1013, the ACM 1011 preserves or persists the data in non-volatile memory media 110, 1110, 1110, 1502 and provides the data from the non-volatile memory media 110, 1110, 1502 to clients, such as ACM users 1016, after recovery from the restart event. The persistent data structure module 1009 and its various sub-modules 1902, 1904, 1906, 1908, 1910, 1912, 1914, 1916, 1918, 1920, 1922 as described above, may be disposed in a device driver for the ACM 1011 executing on a processor 1012 of the host device 1014, such as the storage management module 1050, may be disposed in a storage controller 104, 1004, 1104, 1304 for the ACM 1011, and/or may comprise portions in each of a device driver and a storage controller 104, 1004, 1104, 1304, or the like.

Figure 11:
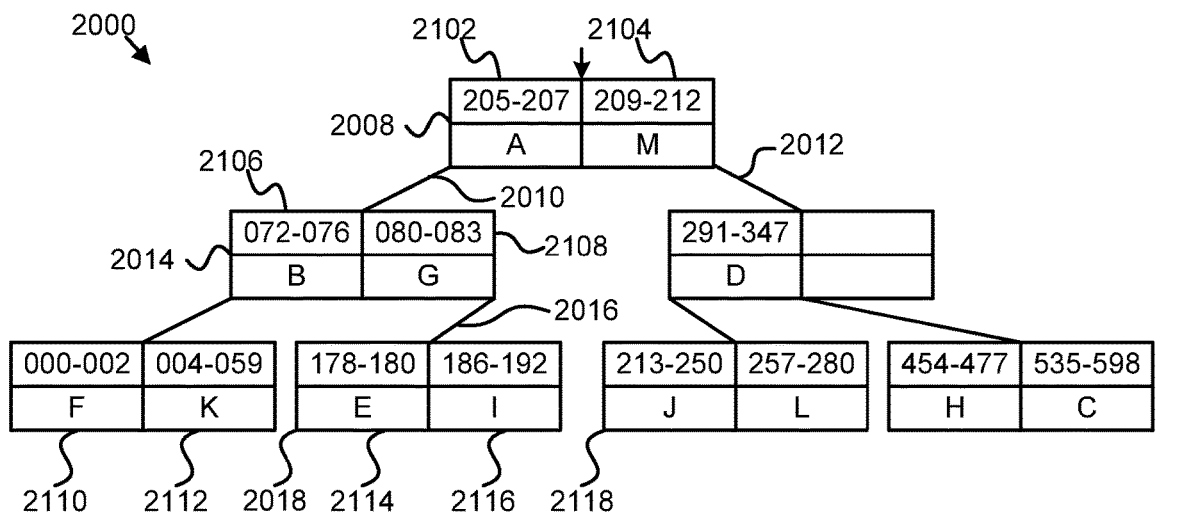
FIG. 11 is a schematic block diagram illustrating one embodiment of a mapping structure, a sparse logical address space, and a log-based writing structure.
Figure 11:
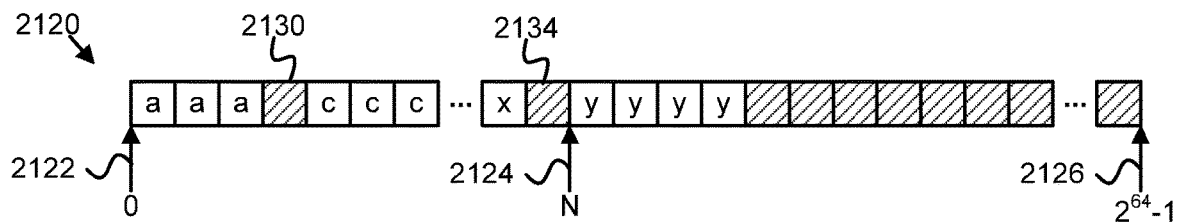
Figure 11:
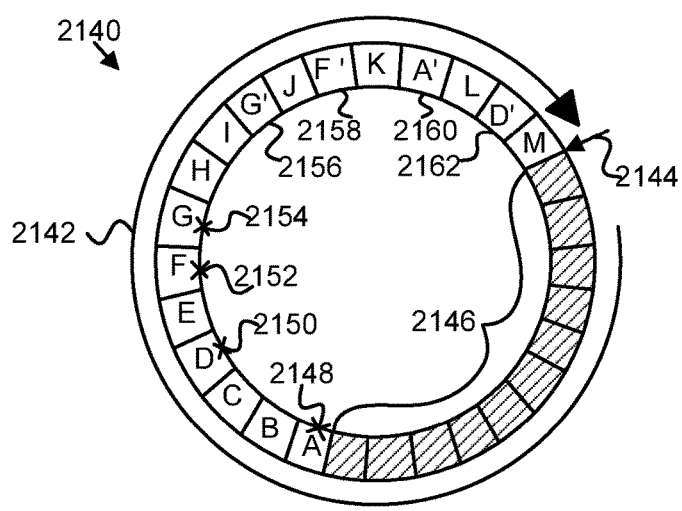

FIG. 11 depicts one embodiment of an address mapping structure 2000, a logical address space 2120, and a sequential, log-based, append-only writing structure 2140. The address mapping structure 2000, in one embodiment, is maintained by the metadata module 1912, the storage controller 104, 1004, 1104, 1304, the storage management layer 1050, a logical-to-physical translation layer or address mapping structure, or the like to map LBAs or other logical addresses to physical locations on the non-volatile storage media 1110, in the ACM 1011, or the like. For example, in one embodiment, the metadata module 1912 may use the address mapping structure 2000 to determine and track which portions of persistent data structures are stored in volatile ACM buffers 1013 and which portions of persistent data structures are stored in the non-volatile memory medium 1110, with each discrete portion of a persistent data structure associated with a range of logical addresses.

While the depicted embodiment is described primarily with regard to the non-volatile storage media 1110, in other embodiments, the address mapping structure 2000 may map other logical identifiers of persistent data structures to locations in the auto-commit buffers 1013 and/or the non-volatile storage media 110, or the like. The address mapping structure 2000, in the depicted embodiment, is a B-tree with several entries. In the depicted embodiment, the nodes of the address mapping structure 2000 include direct references to physical locations in the non-volatile storage device 1102. In other embodiments, the address mapping structure 2000 may include links that map to entries in a reverse map, or the like. The address mapping structure 2000, in various embodiments, may be used either with or without a reverse map. In other embodiments, the references in the address mapping structure 2000 may include alpha-numerical characters, hexadecimal characters, pointers, links, and the like.

The address mapping structure 2000, in the depicted embodiment, includes a plurality of nodes. Each node, in the depicted embodiment, is capable of storing two entries. In other embodiments, each node may be capable of storing a greater number of entries, the number of entries at each level may change as the address mapping structure 2000 grows or shrinks through use, or the like.

Each entry, in the depicted embodiment, maps a variable length range of LBAs of the non-volatile storage device 1102 to a physical location in the storage media 1110 for the non-volatile storage device 1102. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block in the physical storage media 1110 of the non-volatile storage device 1102 that stores the data of the corresponding range of LBAs. In other embodiments, the capital letters may represent other physical addresses or locations of the non-volatile storage device 1102. In the depicted embodiment, the capital letters 'A' through 'M' are also depicted in the log-based writing structure 2140 which represents the physical storage media 1110 of the non-volatile storage device 1102.

In the depicted embodiment, membership in the address mapping structure 2000 denotes membership (or storage) in the non-volatile storage device 1102. In another embodiment, an entry may further include an indicator of whether the non-volatile storage device 1102 stores data corresponding to a logical block within the range of LBAs, data of a reverse map, and/or other data.

In the depicted embodiment, the root node 2008 includes entries 2102, 2104 with noncontiguous ranges of LBAs. A "hole" exists at LBA "208" between the two entries 2102, 2104 of the root node. In one embodiment, a "hole" indicates that the non-volatile storage device 1102 does not store data corresponding to one or more LBAs corresponding to the "hole." In one embodiment, the non-volatile storage device 1102 supports block I/O requests (read, write, trim, etc.) with multiple contiguous and/or noncontiguous ranges of LBAs (e.g., ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 2106, 2108 of the node 2014, between the entries 2110, 2112 of the left child node of the node 2014, between entries 2114, 2116 of the node 2018, and between entries of the node 2118. In one embodiment, similar "holes" may also exist between entries in parent nodes and child nodes. For example, in the depicted embodiment, a "hole" of LBAs "060-071" exists between the left entry 2106 of the node 2014 and the right entry 2112 of the left child node of the node 2014.

The "hole" at LBA "003," in the depicted embodiment, can also be seen in the logical address space 2120 of the non-volatile storage device 1102 at logical address "003" 2130. The hash marks at LBA "003" 2140 represent an empty location, or a location for which the non-volatile storage device 1102 does not store data. The "hole" at LBA 2134 in the logical address space 2120, is due to one or more block I/O requests with noncontiguous ranges, a trim or other deallocation command to the non-volatile storage device 1102, or the like. The address mapping structure 2000 supports "holes," noncontiguous ranges of LBAs, and the like due to the sparse and/or thinly provisioned nature of the logical address space 2120.

The logical address space 2120 of the non-volatile storage device 1102, in the depicted embodiment, is sparse and/or thinly provisioned, and is larger than the physical storage capacity and corresponding storage device address space of the non-volatile storage device 1102. In the depicted embodiment, the non-volatile storage device 1102 has a 64 bit logical address space 2120 beginning at logical address "0" 2122 and extending to logical address "264-1" 2126. Because the storage device address space corresponds to only a subset of the logical address space 2120 of the non-volatile storage device 1102, the rest of the logical address space 2120 may be allocated, mapped, and used for other functions of the non-volatile storage device 1102.

The sequential, log-based, append-only writing structure 2140, in the depicted embodiment, is a logical representation of the physical storage media 1110 of the non-volatile storage device 1102. In certain embodiments, the non-volatile storage device 1102 stores data sequentially, appending data to the log-based writing structure 2140 at an append point 2144. The non-volatile storage device 1102, in a further embodiment, uses a storage space recovery process, such as a garbage collection module or other storage space recovery module that re-uses non-volatile storage media 1110 storing deallocated/unused logical blocks. Non-volatile storage media 1110 storing deallocated/unused logical blocks, in the depicted embodiment, is added to an available storage pool 2146 for the non-volatile storage device 1102. By clearing invalid data from the non-volatile storage device 1102, as described above, and adding the physical storage capacity corresponding to the cleared data back to the available storage pool 2146, in one embodiment, the log-based writing structure 2140 is cyclic, ring-like, and has a theoretically infinite capacity.

In the depicted embodiment, the append point 2144 progresses around the log-based, append-only writing structure 2140 in a circular pattern 2142. In one embodiment, the circular pattern 2142 wear balances the non-volatile storage media 122, increasing a usable life of the non-volatile storage media 1110. In the depicted embodiment, a garbage collection module or other storage capacity recovery process has marked several blocks 2148, 2150, 2152, 2154 as invalid, represented by an "X" marking on the blocks 2148, 2150, 2152, 2154. The garbage collection module, in one embodiment, will recover the physical storage capacity of the invalid blocks 2148, 2150, 2152, 2154 and add the recovered capacity to the available storage pool 2146. In the depicted embodiment, modified versions of the blocks 2148, 2150, 2152, 2154 have been appended to the log-based writing structure 2140 as new blocks 2156, 2158, 2160, 2162 in a read, modify, write operation or the like, allowing the original blocks 2148, 2150, 2152, 2154 to be recovered.

Figure 12:
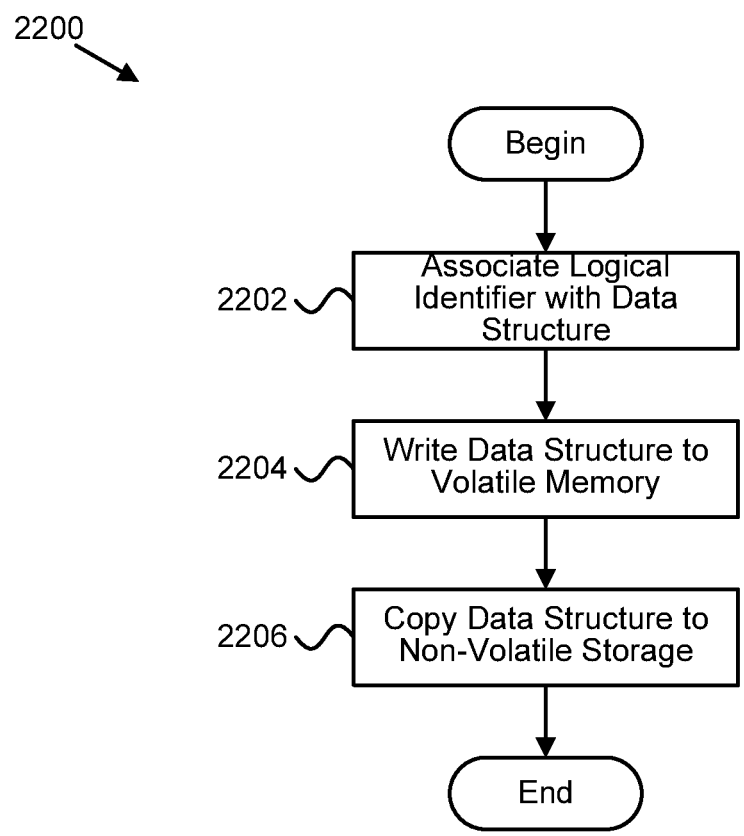
FIG. 12 is a schematic flow chart diagram illustrating one embodiment of a method for a persistent data structure.

FIG. 12 depicts one embodiment of a method 2200 for persistent data structures. The method 2200 begins, and the allocation module 1904 associates 2202 a logical identifier with a data structure. The write module 1906 writes 2204 data of the data structure to a first region of a volatile memory module 1013, which is configured to ensure that the data is preserved in response to a trigger, as described above. The destage module 1908 copies 2206 the data of the data structure from the volatile memory module 1013 to a non-volatile storage medium 110, 1110, 1502 so that the data of the data structure remains associated 2202 with the logical identifier and the method 2200 ends.

Figure 13:
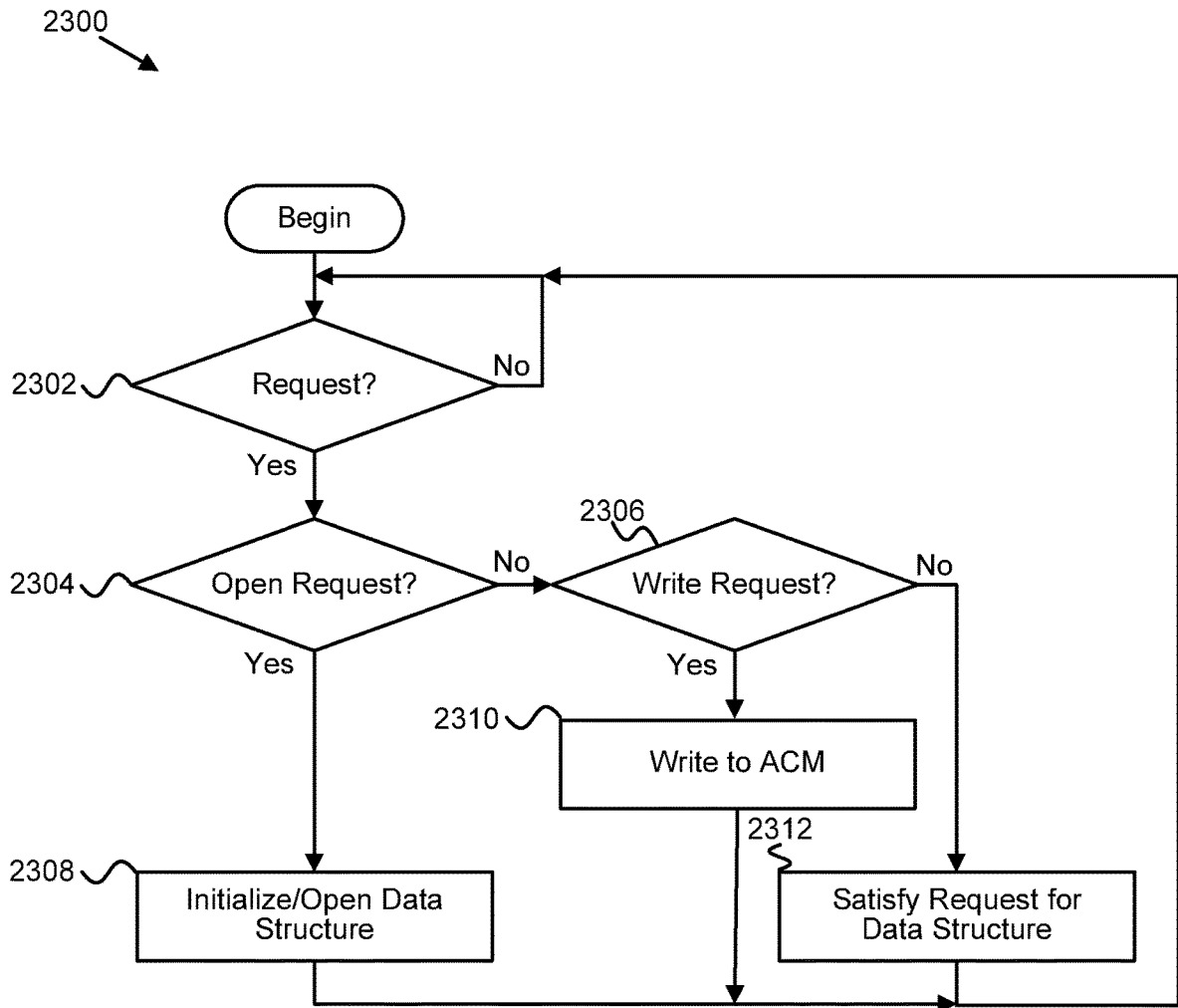
FIG. 13 is a schematic flow chart diagram illustrating another embodiment of a method for a persistent data structure.

FIG. 13 depicts another embodiment of a method 2300 for persistent data structures. The method 2300 begins, and the request module 1902 determines 2302 whether a persistent data structure request has been received. If no persistent data structure request has been received, the request module 1902 continues to monitor 2302 requests. If the request module 1902 has received 2304 an open request, the allocation module 1904 initializes and/or opens a persistent data structure, associating the initialized 2308 persistent data structure with a logical identifier or the like. If the request module 1902 has received 2306 a write request, the write module 1906 writes data of the received write request 2306 to an allocated region of the ACM buffers 1013, where the destage module 1908 may copy the data to the non-volatile memory medium 110, 1110, 1502. If the request module 1902 received 2302 a different type of request, an associated module satisfies 2312 the received 2302 persistent data structure request (e.g., the destage module 1908 destages data to satisfy 2312 a synchronization or destage request, the read module 1914 provides data of a persistent data structure to satisfy 2312 a read request, the close module 1916 closes a persistent data structure to satisfy a close request, the map module 1918 maps a region of the ACM 1013, a persistent data structure, or the like into virtual memory of a client on the host device 1014 to satisfy a map request, or the like) and the method 2300 continues.

Figure 14:
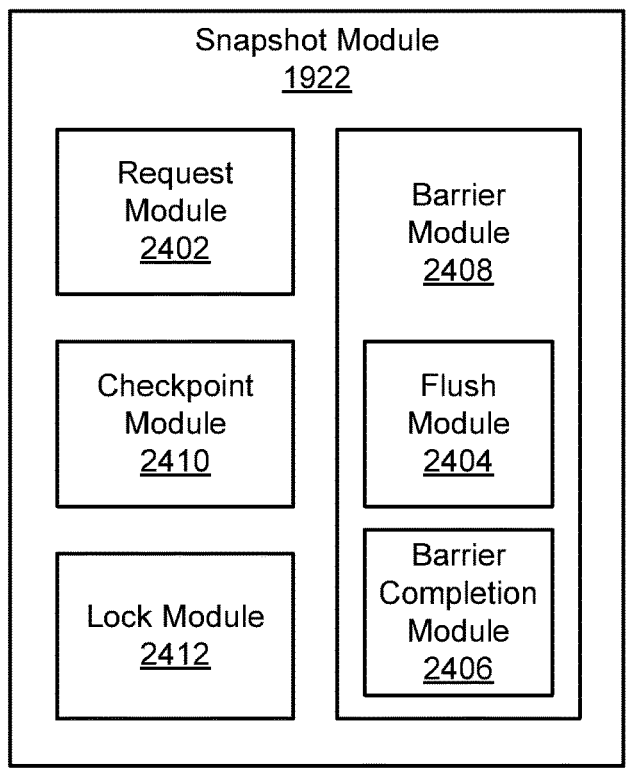
FIG. 14 is a schematic block diagram illustrating one embodiment of a snapshot module.

FIG. 14 depicts one embodiment of a snapshot module 1922. In one embodiment, the snapshot module 1922 is substantially similar to the snapshot module 1922 described above with regard to FIG. 10B, and may be configured to make a snapshot copy or checkpoint of data in association with completing a barrier operation for the data. The snapshot module 1922, in the depicted embodiment, includes a request module 2402, a barrier module 2408, a checkpoint module 2410, and a lock module 2412. The barrier module 2408, in the depicted embodiment, includes a flush module 2404 and a barrier completion module 2406.

The snapshot module 1922, in certain embodiments, may be part of or may cooperate with a hardware controller 104, 1004, 1104, 1304 for the volatile ACM buffers 1013 and/or the non-volatile storage medium 110, 1110, 1310, 1510. For example, the hardware storage controller 104, 1004, 1104, 1304 may include one or more of the request module 2402, the checkpoint module 2410, the lock module 2412, the barrier module 2408, the flush module 2404, the barrier completion module 2406, or the like.

As described in greater detail below, in one embodiment, the barrier completion module 2406 may be configured to determine completion of a barrier operation for a first page of the volatile memory 1013 and the checkpoint module 2410 may be configured to preserve a snapshot copy or checkpoint of data of the first page in response to the barrier completion module determining completion of the barrier operation, so that a consistent, synchronous state is preserved for an ACM user 1016 to access at a later time, such as after recovery from a restart event or the like. The barrier module 2408, in response to a request from an ACM user 1016 or other client, may perform a barrier operation, synchronization operation, or the like to flush data from the processor complex 1012 to the ACM 1011. Once the barrier operation is complete, the checkpoint module 2410 may preserve a snapshot copy or checkpoint of data (e.g., a page of data, an ACM buffer 1013 of data, a file, all data of the ACM 1011, or another segment or region of data) before the CPU or processor complex 1012 may destage or copy any subsequent data to the ACM 1011 causing it to become un-synchronized.

For example, in one embodiment, the checkpoint module 2410 may dynamically switch which page or which ACM buffer 1013 is being used for data operations in response to completion of a barrier operation. In certain embodiments, the checkpoint module 2410 may maintain or create a second, spare, "hot" copy of a page of data of the ACM buffers 1013 and may switch data operations to the second page of data in response to completion of a barrier operation for the first page of data, preserving the first page of data as a snapshot copy or checkpoint until the first page of data may be destaged or copied from the ACM buffers 1013 to the non-volatile memory medium 110, 1110, 1502. In a further embodiment, the checkpoint module 2410 may switch data operations to a blank or empty page of the ACM buffers 1013 in response to completion of a barrier operation for a first page of data, writing or storing updates to the first page of data in the blank or empty page after completion of the barrier operation. By switching pages, ACM buffers 1013, or the like dynamically within hardware, in certain embodiments, the checkpoint module 2410 may create a snapshot copy or checkpoint very quickly, under a microsecond or the like, instead of using a longer, more complicated backup process.

The checkpoint module 2410, in certain embodiments, may cooperate with a commit agent 1020 to make a most recent snapshot copy or checkpoint of data available to an ACM user 1016 after a restart event, so that the ACM user 1016 has a consistent, synchronized version of the data, even if certain inconsistent updates or changes to the data performed after the most recent snapshot copy was created, may be lost. In other embodiments, a commit agent 1020 may provide an ACM user 1016 with a most recent or current version of data, even if the version may be inconsistent or unsynchronized. An ACM user 1016, in certain embodiments, may selectively determine which version, which snapshot copy or checkpoint, or the like to access after a restart event, based on a request to a commit agent 1020, a request parameter, or another interface.

In certain embodiments, the snapshot module 1922 supports one or more auto-commit memory synchronization operations, such as a barrier operation, a checkpoint operation or the like. The snapshot module 1922, in various embodiments, may support a barrier operation, a snapshot operation and/or checkpoint operation, both a barrier operation and a snapshot/checkpoint operation, and/or other auto-commit memory synchronization operations. By supporting a barrier and/or snapshot/checkpoint operation, in certain embodiments, the snapshot module 1922 provides an interface whereby an ACM user 1016 or other client may manage or ensure persistence and consistency for the byte addressable ACM buffers 1013, whether the ACM buffers 1013 are natively volatile or non-volatile, regardless of the type of media used for the ACM buffers 1013.

As described above, in certain embodiments, the ACM module 1317 and/or the ACM 1011 enable clients such as the ACM users 1016 to access fast, byte-addressable, persistent memory, combining benefits of volatile memory and non-volatile storage. Auto-commit logic inside the hardware of the storage device 102, such as the power management apparatus 123 described above, in certain embodiments, provides power-cut protection for data written to the auto-commit buffers 1013 of the ACM 1011.

The ACM 1011 may be accessible to applications, operating system components, and/or other ACM users 1016 as byte-addressable memory mapped to a virtual address space of a memory system 1018 of a processor complex 1012. Updates to data of the ACM 1011 by ACM users 1016 may be stored in one or more processor caches of the processor complex 1012 and/or the memory system 1018, from which the data may be written back lazily to the underlying ACM buffers 1013. A processor cache may include a write combine buffer, an L1 processor cache, an L2 processor cache, an L3 processor cache, a processor cache hierarchy, and/or another type of processor cache.

Caching data of the ACM buffers 1013 in a processor cache may improve performance (e.g. decrease an amount of time it takes for the processor complex 1012 to access data of the ACM buffers 1013). However, in certain embodiments, caching data of the ACM buffers 1013 may increase a risk of losing updates to the data in response to a restart event such as a power failure of the host 1014. For example, a processor cache may be weakly ordered, not guaranteeing or ensuring that the processor cache will maintain an order of operations for cached data, but instead trickling data down to the auto-commit buffers 1013 arbitrarily, without a guaranteed order or timeframe.

In certain embodiments, the ACM module 1317, in cooperation with the SML 1050 or the like, makes the ACM 1011 available to one or more ACM users 1016 using an API, such as the SML API 1019 described above. The ACM module 1317 and/or the SML 1050 may provide the SML API 1019 and/or another ACM API to ACM users 1016 at a user-level and/or a kernel-level.

To make the ACM 1011 usable for ACM users 1016, even across restart events, the snapshot module 1922 may provide persistence and/or consistency for data of the auto-commit buffers 1013, despite the weak ordering of a processor cache of the processor complex 1012. The snapshot module 1922, in certain embodiments, may guarantee or ensure that application data residing in processor caches of the processor complex 1012 has been flushed or destaged to the ACM 1011 and will be persisted across restart events as described above.

The snapshot module 1922 may provide consistency of data of the auto-commit buffers 103 to ensure that the data is meaningful to the ACM user 1016 after a restart event, (e.g., the data may be accessed, recovered, interpreted by an ACM user 1016 to recover application data and/or state). As described above, the memory system 1018 may flush, destage, or otherwise move data from the one or more processor caches of the processor complex 1012 to the auto-commit buffers 1013 at arbitrary times without strict ordering.

Further, ACM users 1016 may perceive consistency across multiple updates to data of the auto-commit buffers 1013. For example, a transaction of an ACM user 1016 may change multiple attributes within a data structure, and the snapshot module 1922 may atomically update each change to preserve application consistency for the ACM user 1016. By managing consistency for data of the auto-commit buffers 1013 for the ACM users 1016, in certain embodiments, the snapshot module 1922 may obviate the need for ACM users 1016 to manage consistency themselves, thereby simplifying application development, use of the ACM 1011, and the like.

The snapshot module 1922 may provide, guarantee, or otherwise manage persistence and/or consistency using one or more synchronization operations, such as a barrier operation, a snapshot/checkpoint operation, or the like. As used herein, a barrier operation comprises an ACM operation that synchronizes, flushes, and/or destages dirty data from one or more processor caches to one or more auto-commit buffers 1013 of the ACM 1011. A snapshot or checkpoint operation, as used herein, comprises an ACM operation that creates a copy or snapshot of the data contents of one or more pages of the auto-commit buffers 1013. In one embodiment, a snapshot/checkpoint operation synchronizes, flushes, and/or destages dirty data from one or more processor caches to the auto-commit buffers 1013 (e.g. performs a barrier operation) prior to copying the data contents of the pages of the auto-commit buffers 1013 to create a snapshot. The snapshot module 1922, in various embodiments, may use the request module 2402, the flush module 2404, and/or the barrier completion module 2406 to execute barrier operations, snapshot/checkpoint operations, and/or other synchronization operations for the ACM 1011.

In one embodiment, the request module 2402 is configured to monitor, detect, or otherwise receive auto-commit requests from clients, such as the ACM users 1016 described above, another module, a host computing device 1014, or the like. The request module 2402, in one embodiment, receives auto-commit requests from clients over an ACM API, such as the SML API 1019 described above.

An auto-commit request, in certain embodiments, may comprise a barrier request, a snapshot/checkpoint request, or another synchronization request. The request module 2402, in certain embodiments, determines a request type for a received auto-commit request, for example, determining whether a received auto-commit request is a barrier request or a snapshot/checkpoint request, so that the ACM module 1317 and/or the snapshot module 1922 can service the received auto-commit request.

In one embodiment, the flush module 2404, to service a barrier request, a snapshot/checkpoint request, or the like, is configured to issue, perform, or otherwise execute a serializing instruction for a processor cache in response to the request module 2402 receiving an auto-commit request. A serializing instruction flushes, destages, or otherwise synchronizes data from a processor cache of the processor complex 1012 and/or the memory system 1018 to underlying memory, such as an auto-commit buffer 1013. One or more auto-commit buffers 1013 receive data that the flush module 2404 flushes or destages from the processor complex 1012. An auto-commit buffer 1013, or other underlying memory device, to which data is flushed or destaged from the processor complex 1012 in response to a serializing instruction, in one embodiment, is selected by a memory manager for the processor complex 1012 or the like, based on which underlying memory device is mapped into a logical address range for the data in virtual memory of the processor complex 1012.

Examples of serializing instructions include a CLFLUSH instruction, an MFENCE instruction, an SFENCE instruction, an LFENCE instruction, an xchg instruction (e.g., compare and swap, compare and swap double, CMPXCHG, CMPXCHNG8B, CMPXCHNG16B, and/or CMP8XCHG16), or the like. In certain embodiments, a serializing instruction ensures and/or guarantees that operations, such as memory semantic load and store operations, that precede the serializing instruction, are flushed, destaged, or otherwise synchronized prior to operations that follow the serializing instruction.

In one embodiment, the flush module 2404 issues, performs, or otherwise executes a serializing instruction for an entire processor cache or set of processor caches in response to an auto-commit request. In another embodiment, the flush module 2404 may issue, perform, or otherwise execute a serializing instruction just for data of one or more auto-commit buffers 1013 stored in a processor cache or set of processor caches, so that data associated with other memory devices is not necessarily flushed, destaged, and/or synchronized. For example, the flush module 2404 may include a memory address range 1021 for pages of one or more auto-commit buffers 1013 in the serializing instruction, so that the processor cache or set of caches flushes, destages, or otherwise synchronizes just the indicated memory address range 1021.

In one embodiment, the barrier completion module 2406 is configured to determine completion of the serializing instruction flushing, destaging, or otherwise synchronizing data to one or more auto-commit buffers 1013. The barrier completion module 2406, in certain embodiments, determines that a serializing instruction has completed by placing a predefined completion identifier in the processor cache after the flush module 2404 issues the serializing instruction, issuing a second serializing instruction, and determining that the serializing instruction is complete once the completion identifier is received at the non-volatile storage device 102 of the ACM 1011. Because a serializing instruction ensures or guarantees that operations performed prior to the serializing instruction are synchronized prior to operations performed after the serializing instruction, the synchronization of the completion identifier to the ACM 1011 in response to the second serializing instruction indicates that the first serializing instruction has completed. In other embodiments, the barrier completion module 2406 may determine completion of the serializing instruction without issuing a second serializing instruction. For example, the processor complex 1012 may notify the barrier completion module 2406 of completion of the serializing instruction by sending an interrupt, writing a completion identifier to a control status register which the barrier completion module 2406 may poll, or the like.

The barrier completion module 2406, in certain embodiments, may place a completion identifier in the processor cache by writing or storing the completion identifier to a virtual memory address of the host device 1014 mapped to a control status register of the ACM 1011. In another embodiment, the barrier completion module 2406 may place a completion identifier in the processor cache by writing or storing the completion identifier to a virtual memory address mapped to a page of an auto-commit buffer 1013, or the like. The barrier completion module 2406, in various embodiments, may detect arrival of a completion identifier in the ACM 1011 by polling a control status register of the ACM 1011, by polling a predefined location in the auto-commit buffers 1013, by receiving an interrupt from the ACM 1011, or the like.

The barrier completion module 2406, in certain embodiments, may use different completion identifiers depending on the type of the auto-commit request. For example, the barrier completion module 2406 may write a BARRIER COMPLETE completion identifier for a barrier request, may write a CHECKPOINT BEGIN completion identifier for a snapshot/checkpoint request, or the like. A completion identifier, in one embodiment, comprises a predefined sequence, string, pattern, flag, or other indicator that the barrier completion module 2406 may write or store to a processor cache, to the ACM 1011, or the like.

For snapshot/checkpoint requests, as described below with regard to the checkpoint module 2410, in response to a CHECKPOINT BEGIN completion identifier or another checkpoint indicator, the checkpoint module 2410 may create a snapshot copy of one or more pages of the auto-commit buffers 1013. The barrier completion module 2406 and/or the checkpoint module 2410, in certain embodiments, may write a CHECKPOINT COMPLETE completion identifier to a control status register of the ACM 1011 in response to the checkpoint module 2410 completing the snapshot copy.

In one embodiment, the barrier completion module 2406 indicates, to a requesting client, completion of an auto-commit request. The barrier completion module 2406, in various embodiments, may indicate or notify a client of completion of an auto-commit request by returning execution control to the client, by sending a return value to the client, by sending an interrupt to the client, by writing a completion identifier to a control status register polled or poked by the client, or the like.

The snapshot module 1922, in certain embodiments, may guarantee or ensure persistence of data flushed to one or more auto-commit buffers 1013 in response to the barrier completion module 2406 determining that a serializing instruction for the flushed data has completed. In a further embodiment, the snapshot module 1922 may guarantee or ensure persistence of operations received for one or more auto-commit buffers 1013 prior to a received auto-commit request in response to the barrier completion module 2406 determining completion of a serializing instruction for the auto-commit request. As described above, once data has been synchronized or stored in the auto-commit buffers 1013, the ACM 1011 preserves or persists the data in non-volatile memory media 110, 1110 and provides the data from the non-volatile memory media 110, 1110 to clients, such as ACM users 1016, after recovery from the restart event. In this manner, in certain embodiments, the snapshot module 1922 can provide persistence and consistency of data for ACM users 1016 even if a processor cache does not guarantee an order of data, an order of operations, or the like.

As described above, in certain embodiments, the ACM 1011 is coupled to the host device 1014 using a communications bus 1040 such as a PCI-e bus 1040 or the like. In one embodiment, the communications bus 1040 supports strong operation ordering, at least for transactions within a similar traffic class or the like, so that the communications bus 1040 maintains an order in which data is flushed from the processor cache to one or more auto-commit buffers 1013. For example, PCI-e 2.0, PCI-e 3.0, and the like support strong ordering semantics for transactions within the same traffic class. By flushing or destaging data from a processor cache to an auto-commit buffer 1011 over a communications bus 1040 that supports strong operation ordering, in certain embodiments, the barrier completion module 2406 may ensure that a serializing instruction has actually completed in response to receiving a completion identifier at the ACM 1011 because the data of the serializing instruction and the completion identifier are received in operation order. In embodiments where the communications bus 1040 does not support operation ordering, the flush module 2404 may act as an intermediary between the processor complex 1012 and the communications bus 1040, coordinating with the controller 1004 to provide strong operation ordering over the communications bus 1040 or the like. For example, the flush module 2404 may queue commands in a FIFO queue and manage and confirm the exchange of each command with the controller 1004, or the like to enforce strong or strict operation ordering. The communications bus 1040 may be in communication with the processor complex 1012 through a Northbridge device, a root complex, or the like of the processor complex 1012.

The barrier module 2408, in certain embodiments, services barrier auto-commit requests using the flush module 2404 and the barrier completion module 2406. In one embodiment, the checkpoint module 2410 cooperates with the barrier module 2408 to service snapshot/checkpoint requests for one or more pages of the auto-commit buffers 1013. A snapshot/checkpoint operation, in certain embodiments, comprises a barrier operation to ensure that pending writes residing in processor caches for the auto-commit buffers 1013 are written back to the auto-commit buffers 1013, followed by a snapshot operation to create a copy of one or more pages of data.

In one embodiment, the checkpoint module 2410 sends, to the ACM 1011, a checkpoint indicator identifying one or more pages of the auto-commit buffers 1013 to be checkpointed (e.g. the one or more pages that are to comprise the requested snapshot copy). The request module 2402 may receive a checkpoint indicator with a snapshot/checkpoint request from a client, or the like, and may provide the checkpoint indicator to the checkpoint module 2410. A checkpoint indicator, in various embodiments, may comprise a set, a list, a bitmap, an array, an address range, a page index, or another data structure indicating which pages of the one or more auto-commit buffers 1013 the checkpoint module 2410 is to checkpoint.

The checkpoint module 2410, in certain embodiments, sends a checkpoint indicator to the ACM 1011 by writing, storing, or otherwise placing the checkpoint indicator in a processor cache of the processor complex 1012 prior to the flush module 2404 issuing a first serializing instruction, so that the first serializing instruction flushes or destages the checkpoint indicator to the ACM 1011. For example, the checkpoint module 2410 may store a checkpoint indicator to a virtual memory address that is mapped to a predefined control status register of the ACM 1011, that is mapped to a predefined location within an auto-commit buffer 1013, or the like. In certain embodiments, the checkpoint module 2410 comprises a driver checkpoint module 2410 disposed in a device driver on the host computing device 1014, such as the SML 1050, which places a checkpoint indicator in a processor cache of the processor complex 1012, and a cooperating controller checkpoint module 2410 disposed in a storage controller 104, 1004, 1104, 1304 to receive, directly or indirectly, the checkpoint indicator at the ACM 1011. By placing a checkpoint indicator in a processor cache prior to a first serializing instruction, in certain embodiments, the checkpoint module 2410 may ensure that the checkpoint indicator reaches the ACM 1011 prior to a completion identifier from the barrier completion module 2406.

In response to the barrier completion module 2406 determining that the first serializing instruction has completed, in one embodiment, the checkpoint module 2410 copies one or more pages of the auto-commit buffers 1013, creating a snapshot of the one or more pages or the like. For example, the checkpoint module 2410 may copy the one or more pages in response to a completion identifier from the barrier completion module 2406 comprising a checkpoint indicator, such as CHECKPOINT BEGIN or the like. In one embodiment, the checkpoint module 2410 copies the one or more pages to a second location within the auto-commit buffers 1013, so that the snapshot copy is separately preserved in response to a restart event. In another embodiment, the checkpoint module 2410 copies the one or more pages directly to non-volatile memory media 110, 1110 of the ACM 1011, creating the snapshot in the non-volatile memory media 110, 1110. In a further embodiment, the checkpoint module 2410 may copy the one or more pages to a separate non-volatile memory device, to a separate ACM 1011B, or the like that is independent from the ACM 1011, copying the one or more pages over a communications bus 1040, over a data network, or the like.

A commit agent 1020 of the ACM 1011, in certain embodiments, makes the snapshot copy of the one or more pages available to an ACM user 1016 after recovery from a restart event. In one embodiment, the ACM 1011 only makes snapshot copies of checkpointed data available to ACM users 1016 after recovery from a restart event, to provide the ACM users 1016 with a consistent, known state or the like. Writes or other changes to ACM data that occur between a snapshot/checkpoint operation and a restart event, in certain embodiments, may be lost and unavailable after the restart event. In another embodiment, a commit agent 1020 of the ACM 1011 may make a raw, un-checkpointed version of data available to ACM users 1016 in addition to one or more snapshot copies or checkpointed versions of the data after a restart event.

In one embodiment, the lock module 2412 is configured to stall operations for one or more auto-commit buffers 1013 during execution of an auto-commit request, so that the snapshot module 1922 can guarantee or ensure persistence and/or consistency of data after the auto-commit request or the like. For example, the lock module 2412 may stall operations between the flush module 2404 issuing a serializing instruction and the barrier completion module 2406 determining completion of the serializing instruction. The lock module 2412, in certain embodiments, may stall operations by unmapping one or more auto-commit buffers 1013 from the virtual address space of an ACM user 1016 in response to an auto-commit request, and remapping the one or more auto-commit buffers 1013 into the virtual address space in response to completion of the auto-commit request.

In certain embodiments, the checkpoint module 2410 may track the progress of a snapshot/checkpoint operation and the lock module 2412 may allow operations on portions of auto-commit buffers 1013 that have already been copied. The checkpoint module 2410, in a further embodiment, may cooperate with the lock module 2412 to copy or move existing data from an auto-commit buffer 1013 to a snapshot, so that the lock module 2412 can allow a pending operation for the auto-commit buffer 1013 to execute.

The snapshot module 1922 and its various sub-modules 1902, 1904, 1906, 1908, 1910, 1912, as described above, may be disposed in a device driver for the ACM 1011 executing on a processor 1012 of the host device 1014, such as the SML 1050, may be disposed in a storage controller 104, 1004, 1104, 1304 for the ACM 1011, and/or may comprise portions in each of a device driver and a storage controller 104, 1004, 1104, 1304, or the like. In one embodiment, a device driver for a non-volatile storage device 102, 1102 comprises the request module 2402 and the flush module 2404 and a storage controller 104, 1004, 1104, 1304 of the non-volatile storage device 102, 1102 comprises at least a portion of the barrier completion module 2406 and/or the checkpoint module 2410, or the like.

For example, in one embodiment, the barrier completion module 2406 comprises two portions, a driver barrier completion module 2406 disposed in a device driver on the host device 1014 and a controller barrier completion module 2406 disposed in a storage controller 104, 1004, 1104, 1304. The driver barrier completion module 2406 may store a completion identifier to a processor cache and issue a second serializing instruction from the host 1014, while the controller barrier completion module 2406 may determine completion of the serializing instruction in response to receiving the completion identifier flushed or destaged from the processor cache to the non-volatile storage device 102, 1011, 1102, or the like, in response to a second serializing instruction.

Figure 15:
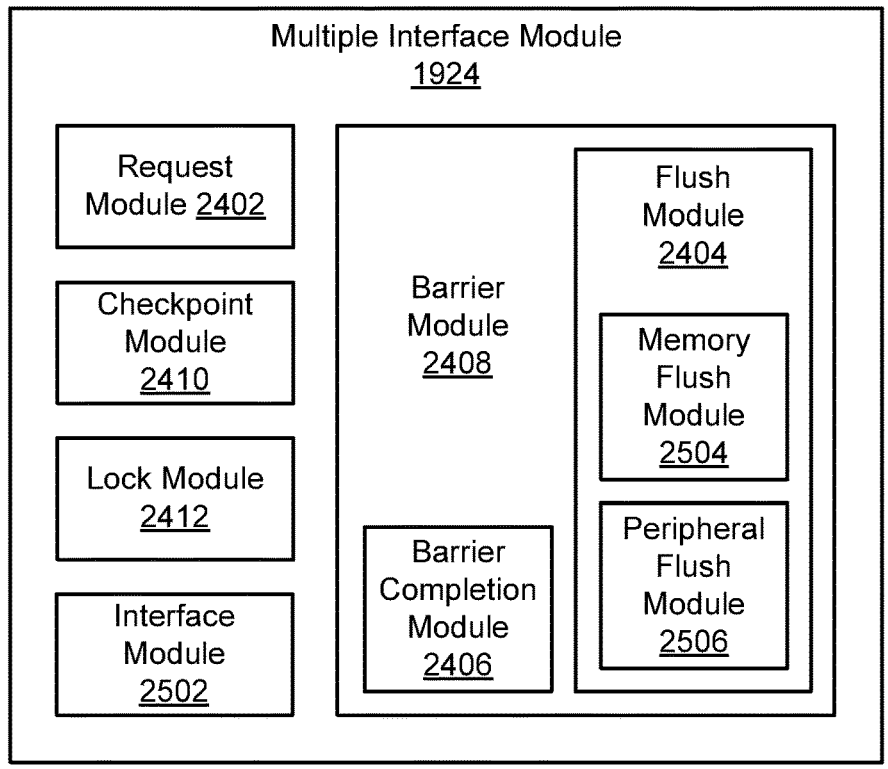
FIG. 15 is a schematic block diagram illustrating one embodiment of a multiple interface module.

FIG. 15 depicts one embodiment of a multiple interface module 1924. The multiple interface module 1924, in certain embodiments, is substantially similar to the multiple interface module 1924 described above with regard to FIG. 10B. The multiple interface module 1924, in the depicted embodiment, is substantially similar to the snapshot module 1922 of FIG. 14, but further includes an interface module 2502 and the flush module 1404 further includes a memory flush module 2504 and a peripheral flush module 2506.

In one embodiment, the multiple interface module 1924 is configured to manage write ordering or barrier functionality (e.g., serialization) for two or more different write ordering interfaces, such as the memory bus interface 1038, the peripheral bus interface 1040, the block device interface 1520, the memory semantic interface 1522, or the like. As described above, in various embodiments, the ACM 1011 (e.g., volatile ACM buffers 1013 and/or a non-volatile memory medium 110, 1110, 1510) may be disposed or located on a peripheral bus 1040, such as a PCI bus, a PCIe bus, or another peripheral bus, or the ACM 1011 may be disposed or located on a memory bus 1038 for a processor complex 1012 or the like. The ACM buffers 1013, as described above, whether disposed on a peripheral bus 1040 or a memory bus 1038, may comprise volatile memory, non-volatile memory, or both.

In order to support barrier operations for ACM 1011 which may be disposed on multiple types of interfaces, a device driver, a storage controller 104, 1004, 1104, 1304, the SML 1050, or the like may support barrier operations, synchronization operations, or the like for multiple types of interfaces (e.g., a memory bus interface 1038, a peripheral bus interface 1040, a block device interface 1520, a memory semantic interface 1522) using the multiple interface module 1924. In this manner, the same device driver, storage controller 104, 1004, 1104, 1304, and/or SML 1050 may be used for ACM 1011 which may be configured differently, installed in different locations relative to the CPU 1012, or the like, with little or no modification.

For example, one make, model, or type of ACM 1011 may be installed on a memory bus 1038 which connects the main memory to the memory controller while another make, model, or type of ACM 1011 may be installed on a storage or peripheral bus 1040 and the multiple interface module 1924 may support barrier, synchronization, or serialization operations over either a memory bus 1038 or a peripheral bus 1040. One interface may be a synchronous interface while another interface may be an asynchronous interface, and the multiple interface module 1924 may support both synchronous and asynchronous interfaces. In a further embodiment, a processor complex 1012 may use different commands or operations for serializing or flushing data over different interfaces, such as the memory bus interface 1038 and the peripheral bus interface 1040.

As used herein, a different command or operation may include commands or operations with different identifiers, codes, and/or names or similar command or operations using different parameters. For example, in one embodiment, the memory flush module 2504 may use one command or operation for a first interface 1038 and the peripheral flush module 2506 may use a second command or operation for a second interface 1040, each using a different one of a CLFLUSH instruction, an MFENCE instruction, an SFENCE instruction, an LFENCE instruction, an xchg instruction (e.g., compare and swap, compare and swap double, CMPXCHG, CMPXCHNG8B, CMPXCHNG16B, and/or CMP8XCHG16), or the like. In a further embodiment, the memory flush module 2504 and the peripheral flush module 2506 may use the same command or operation for serializing or flushing data over both the memory bus 1038 and the peripheral bus 1040, but with different addresses or identifiers for the different busses 1038, 1040.

In one embodiment, the interface module 2502 is configured to determine which interface of a plurality of supported interfaces (e.g., a memory bus interface 1038, a peripheral bus interface 1040, a block device interface 1520, and/or a memory semantic interface 1522) is to be used to flush data from a processor complex 1012 to one or more ACM buffers 1013. The interface module 2502 may determine which interface is associated with an ACM 1011 device by polling the ACM 1011 device over one or more interfaces, based on a model number or identifier for the ACM 1011 device, using a look-up table or other index of supported ACM 1011 devices, or the like. In a further embodiment, a barrier request for an ACM 1011 device may specify an interface to be used for the barrier operation, an address or other location of the ACM 1011 device, or the like.

The memory flush module 2504 may be configured to issue a memory serializing instruction, such as a CLFLUSH instruction, an MFENCE instruction, an SFENCE instruction, an LFENCE instruction, an xchg instruction (e.g., compare and swap, compare and swap double, CMPXCHG, CMPXCHNG8B, CMPXCHNG16B, and/or CMP8XCHG16), or the like, that flushes the data from the processor complex 1012 using the memory interface 1038 in response to the interface module 2502 determining that the memory interface 1038 is to be used to flush the data.

The peripheral flush module 2506 may be configured to issue a peripheral serializing instruction, such as a CLFLUSH instruction, an MFENCE instruction, an SFENCE instruction, an LFENCE instruction, an xchg instruction (e.g., compare and swap, compare and swap double, CMPXCHG, CMPXCHNG8B, CMPXCHNG16B, and/or CMP8XCHG16), or the like, that flushes the data from the processor complex 1012 using the peripheral interface 1040 in response to the interface module 2502 determining that the peripheral interface 1040 is to be used to flush the data. While the depicted embodiment includes a memory flush module 2504 and a peripheral flush module 2506 by way of example, in further embodiments, the flush module 2404 may be configured to perform barrier operations to flush data over different types of interfaces, such as a block device interface 1520 and a memory semantic interface 1522, a synchronous interface and an asynchronous interface, or the like.

In certain embodiments, the interface module 2502, the memory flush module 2504, and/or the peripheral flush module 2506 may comprise at least a portion of a device driver executing on a host computing device 1014 (e.g., the SML 1050 or the like) which supports multiple interfaces for performing barrier operations to flush data, such as the memory interface 1038, the peripheral interface 1040, the block device interface 1520, and/or the memory semantic interface 1522.

Figure 16:
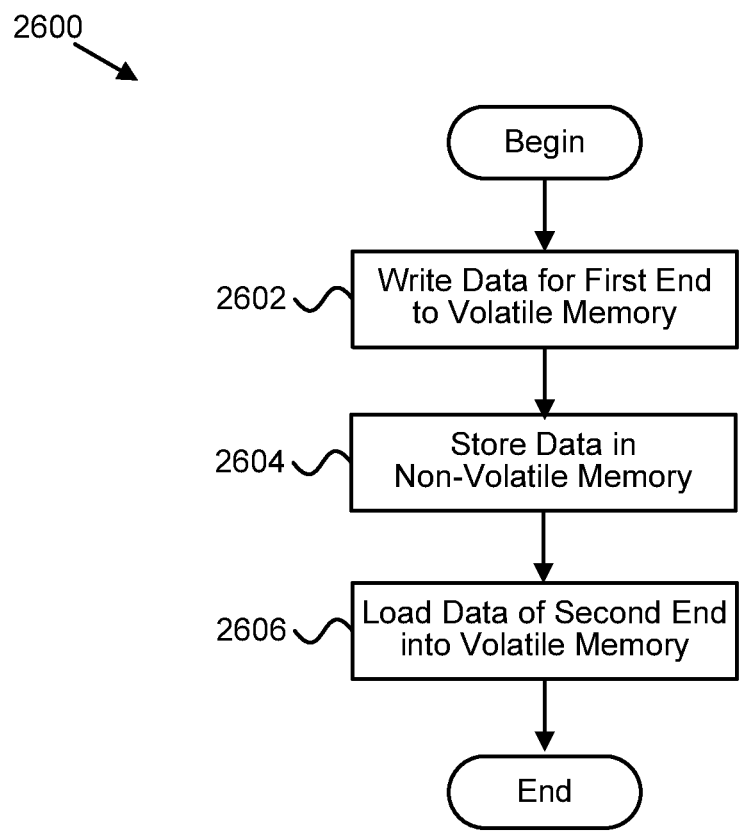
FIG. 16 is a schematic flow chart diagram illustrating one embodiment of a method for a persistent queue data structure.

FIG. 16 depicts one embodiment of a method 2600 for a persistent queue data structure. The method 2600 begins and the write module 1906 writes 2602 data for a first end of a data structure to a volatile memory module 1013, which may be configured to ensure that the data is preserved in a non-volatile memory medium 110, 1110, 1310, 1502, in response to a trigger as described above. The destage module 1908 stores 2604 at least a portion of the data of the data structure in the non-volatile memory medium 110, 1110, 1310, 1502. The read module 1914 loads 2606 data of a second end of the data structure from the non-volatile memory medium 110, 1110, 1310, 1502, into volatile memory 1013, 1018 for access by a client 1016 and the method 2600 ends.

Figure 17:
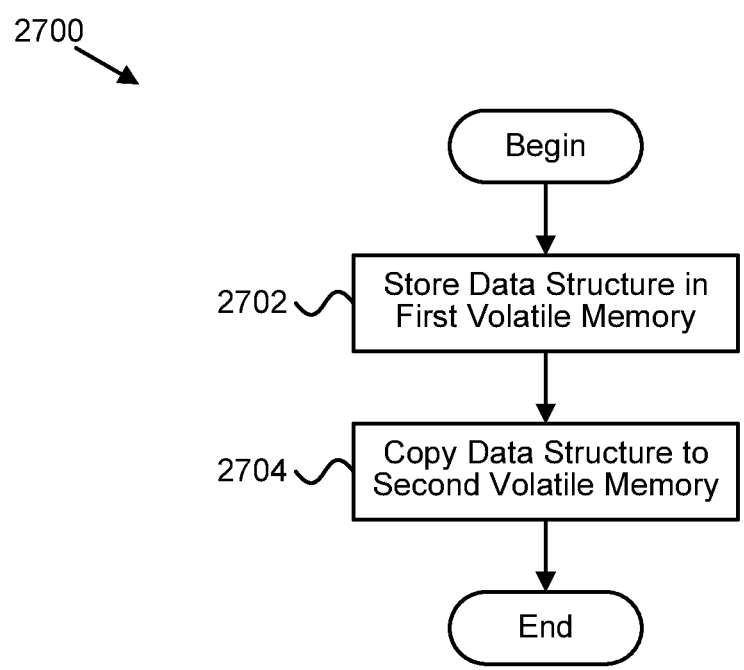
FIG. 17 is a schematic flow chart diagram illustrating one embodiment of a method for replicating a persistent data structure.

FIG. 17 depicts one embodiment of a method 2700 for replicating a persistent data structure. The method 2700 begins and a persistent data structure module 1009 stores 2702 at least a portion of a data structure in a first volatile memory buffer 1013 within an isolation zone 1301 of a first non-volatile storage device 102, 1102. A replication module 1920 copies 2704 data of the data structure to a second volatile memory buffer 1013 within an isolation zone 1301 of a second non-volatile storage device 102, 1102 so that both the first and second non-volatile storage devices 102, 1102 ensure persistence of the data structure and the method 2700 ends.

Figure 18:
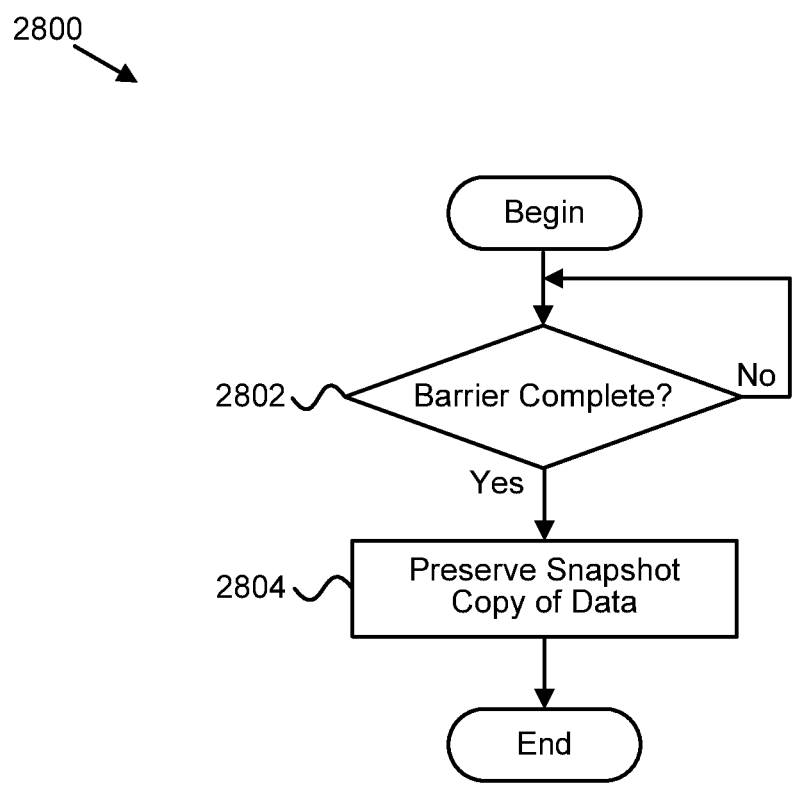
FIG. 18 is a schematic flow chart diagram illustrating one embodiment of a method for a barrier operation.

FIG. 18 depicts one embodiment of a method 2800 for a barrier operation. The method 2800 begins and a barrier completion module 2406, as part of a hardware controller 104, 1004, 1104, 1304 for a volatile memory 1013 associated with a non-volatile storage medium 110, 1110, 1310, 1502 or the like, determines 2802 completion of a barrier operation for a first page of the volatile memory 1013. If the barrier completion module 2406 determines 2802 that the barrier operation has not yet completed, the barrier completion module 2406 continues to monitor 2802 the barrier operation. In response to the barrier completion module 2406 determining 2802 that the barrier operation has completed, a checkpoint module 2410, as part of the hardware controller 104, 1004, 1104, 1304 or the like, preserves 2804 a snapshot copy of data of the first page and the method 2800 ends.

Figure 19:
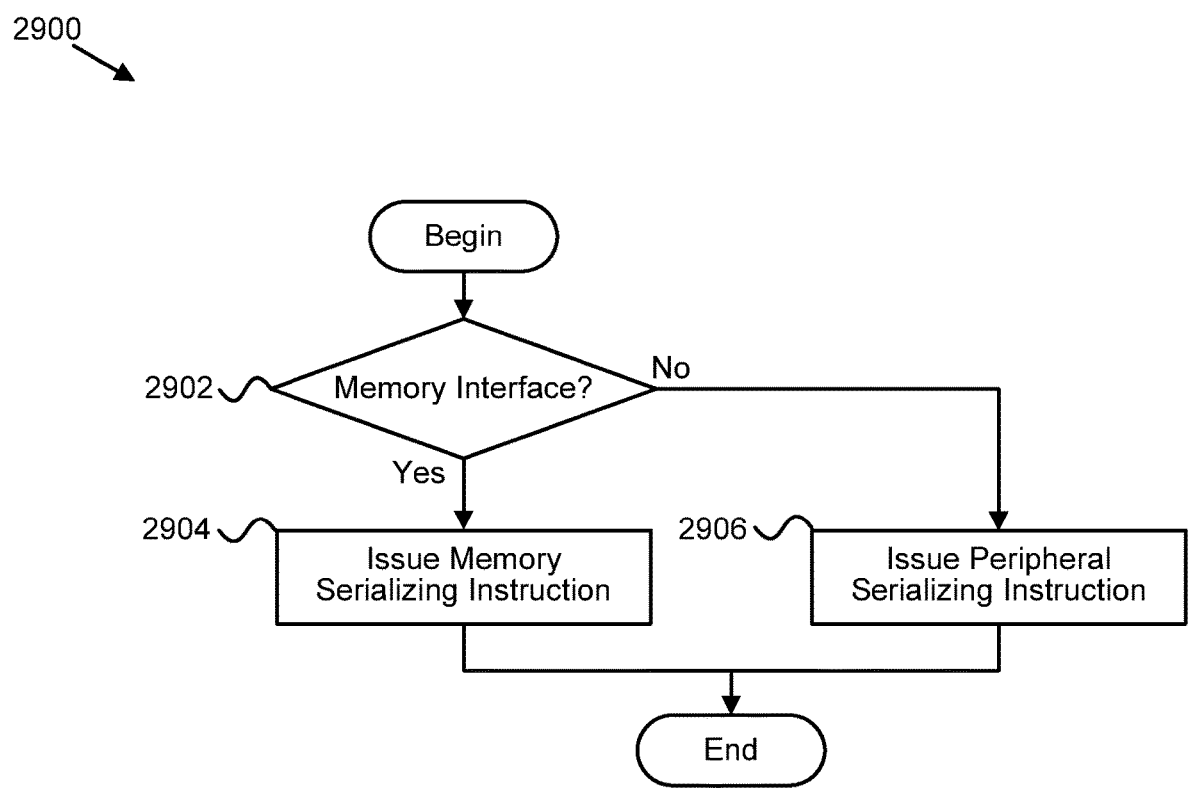
FIG. 19 is a schematic flow chart diagram illustrating one embodiment of a method for multiple serializing interfaces.

FIG. 19 depicts one embodiment of a method 2900 for multiple serializing interfaces. The method 2900 begins and an interface module 2502 determines 2902 which of a memory interface 1038 and a peripheral interface 1040 is to be used to flush data from a processor complex 1012. A memory flush module 2504 issues 2904 a memory serializing instruction to flush the data from the processor complex 1012 using the memory interface 1038 in response to the interface module 2502 determining 2902 that the memory interface 1038 is to be used to flush the data. A peripheral flush module 2506 issues 2906 a peripheral serializing instruction to flush the data from the processor complex 1012 using the peripheral interface 1040 in response to the interface module 2502 determining that the peripheral interface 1040 is to be used to flush the data. The method 2900 ends.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:
1. A method comprising:
  allocating a plurality of auto-commit memory buffers for storing a persistent data structure, in response to receiving a request from a client, the request comprising a logical identifier in a namespace for persistent data structures, wherein:

an auto-commit memory comprises a controller, a non-volatile memory medium, and the allocated auto-commit memory buffers,
a host is a computing device comprising a bus,
the auto-commit memory is a hardware device with a single connection to the bus, and
the auto-commit memory buffers comprise uniformly sized regions of a volatile memory;
arming the allocated auto-commit memory buffers by storing metadata in the allocated auto-commit memory buffers such that the metadata specifies addresses of the non-volatile memory medium for storing data of the persistent data structure, and such that individual auto-commit memory buffers store their own per-buffer portions of the metadata specifying where to store their own per-buffer portions of the data;
writing data for a first end of the persistent data structure from the host to the allocated auto-commit memory buffers, the persistent data structure comprising a queue data structure wherein the first end of the persistent data structure differs from a second end of the persistent data structure;
storing at least a portion of the data of the persistent data structure in the non-volatile memory medium;
loading data of the second end of the persistent data structure from the non-volatile memory medium into the volatile memory for access by the client; and
in response to a trigger, using the controller to store data of the first end of the persistent data structure from the allocated auto-commit memory buffers to the addresses specified by the metadata, wherein storing the data of the first end of the persistent data structure is internal to the hardware device without communicating via the single connection.

2. The method of claim 1, further comprising enforcing one or more rules for the persistent data structure.

3. The method of claim 2, wherein:
the one or more rules define the queue data structure as sequential and append-only; and
enforcing the one or more rules comprises requiring that data be written only to the first end of the queue data structure and that data be read only from the second end of the queue data structure.

4. The method of claim 1, wherein the portion of the data stored in the non-volatile memory medium is between the first end and the second end of the persistent data structure.

5. The method of claim 1, further comprising tracking which data of the persistent data structure resides in the volatile memory and which data of the persistent data structure resides in the non-volatile memory medium.

6. The method of claim 1, further comprising limiting a rate at which the data for the first end of the persistent data structure is written to the volatile memory such that the rate is at, or below, a rate at which data of the persistent data structure is copied to the non-volatile memory medium.

7. The method of claim 1, wherein an isolation zone of the auto-commit memory comprises the controller, the non-volatile storage medium, the auto-commit memory buffers, and a secondary power source configured to power the controller and the auto-commit memory buffers despite failure of the host.

8. An apparatus comprising:
means for allocating a plurality of auto-commit memory buffers for storing a persistent data structure, in response to receiving a request from a client, the request comprising a logical identifier in a namespace for persistent data structures, wherein:
an auto-commit memory comprises a controller, a non-volatile memory medium, and the allocated auto-commit memory buffers,
a host is a computing device comprising a bus,
the auto-commit memory is a hardware device with a single connection to the bus, and
the auto-commit memory buffers comprise uniformly sized regions of a volatile memory;
means for arming the allocated auto-commit memory buffers by storing metadata in the allocated auto-commit memory buffers such that the metadata specifies addresses of the non-volatile memory medium for storing data of the persistent data structure, and such that individual auto-commit memory buffers store their own per-buffer portions of the metadata specifying where to store their own per-buffer portions of the data;
means for writing data for a first end of the persistent data structure from the host to the allocated auto-commit memory buffers, the persistent data structure comprising a queue data structure wherein the first end of the persistent data structure differs from a second end of the persistent data structure;
means for storing at least a portion of the data of the persistent data structure in the non-volatile memory medium;
means for loading data of the second end of the persistent data structure from the non-volatile memory medium into the volatile memory for access by the client; and
means for using the controller, in response to a trigger, to store data of the first end of the persistent data structure from the allocated auto-commit memory buffers to the addresses specified by the metadata, wherein storing the data of the first end of the persistent data structure is internal to the hardware device without communicating via the single connection.

9. The apparatus of claim 8, further comprising means for enforcing one or more rules for the persistent data structure.

10. The apparatus of claim 9, wherein:
the one or more rules define the queue data structure as sequential and append-only; and
enforcing the one or more rules comprises requiring that data be written only to the first end of the queue data structure and that data be read only from the second end of the queue data structure.

11. The apparatus of claim 8, wherein the portion of the data stored in the non-volatile memory medium is between the first end and the second end of the persistent data structure.

12. The apparatus of claim 8, further comprising means for maintaining an address mapping structure, the address mapping structure tracking which data of the persistent data structure resides in the volatile memory and which data of the persistent data structure resides in the non-volatile memory medium.

13. The apparatus of claim 8, further comprising means for limiting a rate at which the data for the first end of the persistent data structure is written to the volatile memory such that the rate is at, or below, a rate at which data of the persistent data structure is copied to the non-volatile memory medium.

14. A computer program product comprising a non-transitory computer readable medium storing computer usable program code executable to perform operations, the operations comprising:
allocating a plurality of auto-commit memory buffers for storing a persistent data structure, in response to receiving a request from a client, the request comprising a logical identifier in a namespace for persistent data structures, wherein:
- an auto-commit memory comprises a controller, a non-volatile memory medium, and the allocated auto-commit memory buffers,
- a host is a computing device comprising a bus,
- the auto-commit memory is a hardware device with a single connection to the bus, and
- the auto-commit memory buffers comprise uniformly sized regions of a volatile memory;

arming the allocated auto-commit memory buffers by storing metadata in the allocated auto-commit memory buffers such that the metadata specifies addresses of the non-volatile memory medium for storing data of the persistent data structure, and such that individual auto-commit memory buffers store their own per-buffer portions of the metadata specifying where to store their own per-buffer portions of the data;

writing data for a first end of the persistent data structure from the host to the allocated auto-commit memory buffers, the persistent data structure comprising a queue data structure wherein the first end of the persistent data structure differs from a second end of the persistent data structure;

storing at least a portion of the data of the persistent data structure in the non-volatile memory medium;

loading data of the second end of the persistent data structure from the non-volatile memory medium into the volatile memory for access by the client; and in response to a trigger, using the controller to store data of the first end of the persistent data structure from the allocated auto-commit memory buffers to the addresses specified by the metadata, wherein storing the data of the first end of the persistent data structure is internal to the hardware device without communicating via the single connection.

15. The computer program product of claim 14, the operations further comprising enforcing one or more rules for the persistent data structure.

16. The computer program product of claim 15, wherein:
the one or more rules define the queue data structure as sequential and append-only; and
enforcing the one or more rules comprises requiring that data be written only to the first end of the queue data structure and that data be read only from the second end of the queue data structure.

17. The computer program product of claim 14, wherein the portion of the data stored in the non-volatile memory medium is between the first end and the second end of the persistent data structure.

18. The computer program product of claim 14, the operations further comprising tracking which data of the persistent data structure resides in the volatile memory and which data of the persistent data structure resides in the non-volatile memory medium.

19. The computer program product of claim 14, the operations further comprising limiting a rate at which the data for the first end of the persistent data structure is written to the volatile memory such that the rate is at, or below, a rate at which data of the persistent data structure is copied to the non-volatile memory medium.

20. The computer program product of claim 14, the operations further comprising receiving a barrier request for the volatile memory.

21. A system comprising:
a host device comprising a peripheral bus, wherein the host device is a computing device;
a data storage device having a single connection to the peripheral bus, the data storage device comprising a volatile memory, a non-volatile storage medium, and a secondary power supply; and
a controller comprising:
- an allocation module configured to allocate a plurality of auto-commit memory buffers for storing a persistent data structure, in response to receiving a request from a client, the request comprising a logical identifier in a namespace for persistent data structures, the auto-commit memory buffers comprising uniformly sized regions of the volatile memory,
- a storage management module configured to arm the allocated auto-commit memory buffers by storing metadata in the allocated auto-commit memory buffers such that the metadata specifies addresses of the non-volatile storage medium for storing data of the persistent data structure, and such that individual auto-commit memory buffers store their own per-buffer portions of the metadata specifying where to store their own per-buffer portions of the data,
- a write module configured to write data for a first end of the persistent data structure from the host device to the allocated auto-commit memory buffers, the persistent data structure comprising a queue data structure wherein the first end of the persistent data structure differs from a second end of the persistent data structure,
- a destage module configured to store at least a portion of the data of the persistent data structure in the non-volatile storage medium,
- a read module configured to load data of the second end of the persistent data structure from the non-volatile storage medium into the volatile memory for access by the client, and
- a commit module configured to store data of the first end of the persistent data structure from the allocated auto-commit memory buffers to the addresses specified by the metadata, in response to a trigger, wherein storing the data of the first end of the persistent data structure is internal to the data storage device without communicating via the single connection to the peripheral bus,
wherein the allocation module, the storage management module, the write module, the destage module, the read module, and the commit module comprise one or more of logic hardware and executable code, the executable code stored on a non-transitory computer readable medium.

22. The system of claim 21, wherein the controller comprises a hardware controller for the data storage device.

\* \* \* \* \*